(12) United States Patent
Bennett et al.

(10) Patent No.: US 8,463,851 B2
(45) Date of Patent: Jun. 11, 2013

(54) PROMOTION INFRASTRUCTURE SUPPORTING SELECTED AND EMAILED PROMOTION DELIVERY

(75) Inventors: James D. Bennett, Hroznetin (CS); Christopher C. Winslade, Chicago, IL (US)

(73) Assignee: Enpulz, LLC, Chicago, IL (US)

( * ) Notice: Subject to any disclaimer, the term of this patent is extended or adjusted under 35 U.S.C. 154(b) by 0 days.

(21) Appl. No.: 13/449,980

(22) Filed: Apr. 18, 2012

(65) Prior Publication Data

US 2012/0209692 A1 Aug. 16, 2012

Related U.S. Application Data

(63) Continuation of application No. 13/109,093, filed on May 17, 2011, now Pat. No. 8,181,851, which is a continuation of application No. 12/467,557, filed on May 18, 2009, now Pat. No. 7,942,316, which is a continuation of application No. 09/808,717, filed on Mar. 14, 2001, now Pat. No. 7,539,628, application No. 13/449,980, which is a continuation of application No. 13/224,052, filed on Sep. 1, 2011, now Pat. No. 8,256,668, which is a continuation of application No. 09/808,722, filed on Mar. 14, 2001, now Pat. No. 8,036,941, application No. 13/449,980, which is a continuation of application No. 13/104,311, filed on May 10, 2011, now Pat. No. 8,177,124, which is a continuation of application No. 12/467,664, filed on May 18, 2009, now Pat. No. 7,938,316, which is a continuation of application No. 09/808,723, filed on Mar. 14, 2001, now Pat. No. 7,542,922, application No. 13/449,980, which is a continuation of application No. 09/687,499, filed on Oct. 13, 2000, which is a continuation-in-part of application No. 09/547,162, filed on Apr. 11, 2000, now abandoned.

(60) Provisional application No. 60/214,136, filed on Jun. 26, 2000, provisional application No. 60/214,183, filed on Jun. 26, 2000, provisional application No. 60/190,825, filed on Mar. 21, 2000, provisional application No. 60/213,912, filed on Jun. 26, 2000, provisional application No. 60/214,188, filed on Jun. 26, 2000, provisional application No. 60/130,082, filed on Apr. 19, 1999, provisional application No. 60/130,083, filed on Apr. 19, 1999, provisional application No. 60/130,084, filed on Apr. 19, 1999, provisional application No. 60/131,008, filed on Apr. 23, 1999, provisional application No. 60/144,584, filed on Jul. 19, 1999, provisional application No. 60/146,208, filed on Jul. 28, 1999, provisional application No. 60/147,062, filed on Aug. 4, 1999, provisional application No. 60/159,388, filed on Oct. 14, 1999.

(51) Int. Cl.
*G06F 15/16* (2006.01)

(52) U.S. Cl.
USPC .................. 709/203; 707/732; 705/14.39

(58) Field of Classification Search
USPC ............... 709/203, 217, 223, 224; 235/375, 235/376, 383; 705/14.1, 14.39; 707/705, 707/732, 736, 769
See application file for complete search history.

(56) References Cited

U.S. PATENT DOCUMENTS

| | | |
|---|---|---|
| 4,882,675 A | 11/1989 | Nichtberger et al. |
| 5,239,462 A | 8/1993 | Jones et al. |
| 5,339,392 A | 8/1994 | Risberg et al. |
| 5,729,693 A | 3/1998 | Holda-Fleck |
| 5,732,400 A | 3/1998 | Mandler et al. |
| 5,765,144 A | 6/1998 | Larche et al. |
| 5,797,133 A | 8/1998 | Jones et al. |
| 5,903,721 A | 5/1999 | Sixtus |
| 5,937,391 A | 8/1999 | Ikeda et al. |
| 5,940,811 A | 8/1999 | Norris |
| 5,943,424 A | 8/1999 | Berger |
| 5,963,915 A | 10/1999 | Kirsch |
| 5,984,180 A | 11/1999 | Albrecht |
| 6,009,412 A | 12/1999 | Storey |
| 6,014,645 A | 1/2000 | Cunningham |

| | | |
|---|---|---|
| 6,029,149 A | 2/2000 | Dykstra et al. |
| 6,052,674 A | 4/2000 | Zervides et al. |
| 6,055,513 A | 4/2000 | Katz |
| 6,055,514 A | 4/2000 | Wren |
| 6,088,686 A | 7/2000 | Walker et al. |
| 6,141,006 A | 10/2000 | Knowlton et al. |
| 6,141,915 A | 11/2000 | Anderson et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,370,514 B1 | 4/2002 | Messner |
| 6,385,591 B1 | 5/2002 | Mankoff |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,505,773 B1 | 1/2003 | Palmer |
| 6,507,823 B1 | 1/2003 | Nel |
| 6,530,880 B2 | 3/2003 | Pagliuca |
| 6,567,791 B2 | 5/2003 | Lent et al. |
| 6,587,841 B1 | 7/2003 | Defrancesco et al. |
| 6,594,640 B1 | 7/2003 | Postrel |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,693,236 B1 * | 2/2004 | Gould et al. ............... 84/477 R |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 | 5/2006 | Martin et al. |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,568 B1 | 9/2006 | Fusz et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchinson et al. |
| 7,289,964 B1 | 10/2007 | Bowman-Amuah |
| 7,310,617 B1 | 12/2007 | Cunningham |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,395,259 B2 | 7/2008 | Bailey et al. |
| 7,505,939 B2 | 3/2009 | Lent et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,657,267 B2 * | 2/2010 | Kitazato ............... 455/456.3 |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,908,226 B2 | 3/2011 | Hutchinson et al. |
| 7,938,316 B2 | 5/2011 | Bennett et al. |
| 7,942,316 B2 | 5/2011 | Bennett et al. |
| 8,036,941 B2 | 10/2011 | Bennett et al. |
| 8,051,078 B2 * | 11/2011 | Lau et al. ............... 707/732 |
| 8,065,201 B2 * | 11/2011 | Perkowski ............... 705/27.1 |
| 8,117,120 B2 | 2/2012 | Misraje et al. |
| 8,145,563 B2 | 3/2012 | Misraje et al. |
| 8,177,124 B2 | 5/2012 | Bennett et al. |
| 8,181,851 B2 | 5/2012 | Bennett et al. |
| 2002/0052778 A1 | 5/2002 | Murphy |

* cited by examiner

*Primary Examiner* — Andrew Joseph Rudy

(74) *Attorney, Agent, or Firm* — Garlick & Markison; Bruce E. Garlick

(57) ABSTRACT

An online sales/automatic rebate and coupon redemption system provides online customers automatic retrieval and redemption of all applicable rebates and coupons during purchase. Purchase orders from customers are selectively fulfilled and products are shipped to the customers either by the system for online sales with automatic rebate and coupon redemption or by other merchant or manufacturer environments. The system purchases from merchants using applicable coupons and rebates and then sells the products to the customers, passing the savings to them. The system makes it possible to automatically retrieve coupons and rebates for items in a shopping cart during the activity of an online purchase at an electronic mall or an online merchant site. The system provides coupons to potential customers via email, based on customer profile, geographical information, etc. Manufacturers and merchants can update coupon value and content based on ongoing sales and volume of customer activity.

23 Claims, 44 Drawing Sheets

| Review Selection | Buy Selection |

Seller: Dell Computer Corp. *****
$1999.00 - Pentium 300MHz PII, 15" Monitor ...
$2299.00 - Pentium 350MHz PII, 15" Monitor ...

Seller: Compaq Computer Corp. *****
$1699.00 - Pentium 200MHz MMX, 17" Monitor ...
$2199.00 - Pentium 300MHz PII, 15" Monitor ...
$499.00 - 15" IBM Flatscreen Monitor, NI, ...

Seller: ABC Computer Corp. **
$1599.00 - Compaq Pentium 300MHz PII, No Monitor ...
$2499.00 - IBM Pentium 300MHz PII, 15" Monitor ...
$2899.00 - IBM Pentium 350MHz PII, 17" Monitor ...

FIG. 21

Quote for Customer 12555
4415

| | Jan Price | |
|---|---|---|
| 6Gig Hard Drives | 300; 225 | 52500 |
| 32Meg SDRAM | 70; 70 | 42000 |
| CDROM | 67; 50; 50 | 16700 |
| Total | | 111200 |
| Discounted Total | 10% | 100080 |

Customer No. 12555 Schedule 1
4405

| | May '99 | June '99 | July '99 | Aug '99 | Sept '99 |
|---|---|---|---|---|---|
| 6Gig Hard Drives | 100 | | | | 100 |
| 32Meg SDRAM | | 300 | | 300 | |
| CDROM | | 100 | 100 | | 100 |

Forecasted Prices
4410

| | May '99 | June '99 | July '99 | Aug '99 | Sept '99 |
|---|---|---|---|---|---|
| 6Gig Hard Drives | 300 | 275 | 250 | 225 | 225 |
| 32Meg SDRAM | 80 | 70 | 70 | 70 | 60 |
| CDROM | 67 | 67 | 50 | 50 | 50 |

FIG. 44

PROMOTION INFRASTRUCTURE SUPPORTING SELECTED AND EMAILED PROMOTION DELIVERY

CROSS-REFERENCE TO PRIORITY APPLICATIONS

This application is a continuation of the following applications:

U.S. application Ser. No. 13/109,093, filed May 17, 2011, which is a continuation of U.S. application Ser. No. 12/467,557, filed May 18, 2009, now issued as U.S. Pat. No. 7,942,316, which is a continuation of U.S. application Ser. No. 09/808,717, filed Mar. 14, 2001, now issued as U.S. Pat. No. 7,539,628, which is based on and claims the benefit of U.S. Provisional Nos. 60/214,136, filed Jun. 26, 2000, 60/214,183, filed Jun. 26, 2000, and 60/190,825, filed Mar. 21, 2000;

U.S. application Ser. No. 13/224,052, filed Sep. 1, 2011, which is a continuation of U.S. application Ser. No. 09/808,722, filed Mar. 14, 2001, now issued as U.S. Pat. No. 8,036,941, which is based on and claims the benefit of U.S. Provisional Nos. 60/213,912, filed Jun. 26, 2000, 60/214,183, filed Jun. 26, 2000, and 60/190,825, filed Mar. 21, 2000;

U.S. application Ser. No. 13/104,311, filed May 10, 2011, which is a continuation of U.S. application Ser. No. 12/467,664, filed May 18, 2009, now issued as U.S. Pat. No. 7,938,316, which is a continuation of U.S. application Ser. No. 09/808,723, filed Mar. 14, 2001, now issued as U.S. Pat. No. 7,542,922, which is based on and claims the benefit of U.S. Provisional Nos. 60/190,825, filed Mar. 21, 2000, 60/214,183, filed Jun. 26, 2000, and 60/214,188, filed Jun. 26, 2000; and U.S. application Ser. No. 09/687,499, filed Oct. 13, 2000, which is a continuation-in-part of U.S. application Ser. No. 09/547,162, filed Apr. 11, 2000, now abandoned, which is based on and claims the benefit of U.S. Provisional Nos. 60/130,082, filed Apr. 19, 1999, 60/130,083, filed Apr. 19, 1999, 60/130,084, filed Apr. 19, 1999; 60/131,008, filed Apr. 23, 1999, 60/144,584, filed Jul. 19, 1999, 60/146,208, filed Jul. 28, 1999, 60/147,062, filed Aug. 4, 1999, and 60/159,388, filed Oct. 14, 1999.

The above-identified applications are all hereby incorporated herein by reference in their entirety and constitute part of the present application.

BACKGROUND

1. Technical Field

The present invention relates generally to online sales and marketing, and, more specifically, to the dispensing of rebates and coupons to customers on the Internet and to the redemption of the rebates and coupons for customers by a system for online sales during online purchase on the Internet.

2. Related Art

Coupons have been traditionally dispensed by manufacturers and retailers to customers by means of inserts in newspapers. Some manufacturers also mail coupons to customers. Rebates have traditionally been offered by manufacturers to push the volume of sales of specific products. Such products are typically those for which the manufacturers have excess inventories or those that are being phased out.

Of late Internet based sales have increased in volume. Some manufacturers have made it possible for a potential customer to obtain rebate forms or coupons from their web site. These rebate or coupons can be downloaded and printed by customers to be redeemed in traditional neighborhood stores.

In general, there are several problems associated with dispensing and redeeming coupons in online sales and marketing activities. These include the frequent inability of a customer to use a coupon placed by an advertiser or merchant in a newspaper or brochure during the activity of online product purchase due to the remoteness of the merchant or vendor. That is because traditional coupon delivery and redeeming methods do not integrate well with Internet based sales where a customer visits a vendor or merchant's web site rather than a store for purchases. The customer and the vendor are also typically located in different cities and it is not possible to redeem traditional coupons in such a scenario.

These problems are also true for manufacturer's rebates. Such rebates are typically dispensed in traditional neighborhood stores and are to be mailed back to manufacturers with receipts for the related purchases. Customer's seldom redeem them as redemption requires making a photocopy of their receipts and mailing the receipts along with the rebates to the manufacturer and waiting a few weeks for a check from the manufacturer.

Sellers often provide coupons and rebates as an incentive to promote sales of specific products. A manufacturer attempts to identify the amount and quantity of each rebate or coupon and the time period during which such offer will be valid. Such rebates and coupons are typically delivered in a paper form to distributors and retailers. Distributors receiving such rebates and coupons further forward the rebates and coupons to their associated retailers.

To use the rebates and coupons online, the retailer often has to modify the product database, web server content, and, possibly, its sales application. This burden along with the burden of having to collect from the manufacturer dissuades the retailer from participating in the rebate and coupon process. Without knowing whether or to what extent the retailers will participate, a manufacturer may under or overestimate the number or amount of rebates or coupon offerings.

An overestimation may, for example, cause a manufacturer to over sell a product beyond an inventory. Similarly, an underestimation may fail to move an inventory before the value of such inventory plummets. Complicating this problem, a manufacturer by law must honor any coupon or rebate once distributed at least for a period of time identified on the rebate or coupon.

In addition to the difficulties associated with integrating rebates and coupons into their online sales systems, retailers have monetary disincentives to do so. In particular, a retailer typically purchases goods expecting a certain profit margin upon selling such goods. To apply a manufacturer's coupon or rebate at the time of the sale requires the retailer to seek at least a part, if not all of their profit from the manufacturer 30-90 days after making the sale.

Some online retailers offer their own "coupons and rebates", hoping to capture the attention of price conscience buyers. Such online retailers who post their own coupons or rebates are typically suspect in creating a façade pricing scheme.

Because retailers have little incentive to provide support for manufacturer's coupons and rebates on-line, buyers are left with coupon rebate options. In some cases, buyers may still use such coupons and rebates but must do so via post (snail mail) and subsequently receive the redemption value via return post.

After receiving a product, if a buyer is interested in redeeming a coupon or rebate and/or registering the product, for technical support or update reasons, the buyer must typically fill out a form, which they mail via post to the manufacturer. Upon receipt, the manufacturer will have to read the handwriting of the buyer to add the buyer's information from the form to their database. If the good purchased is software, only registration information may be gathered during installation. The buyer is still forced to interact with the manufacturer via post for coupons or rebates. The entire process fails if the buyer misplaces the receipt or the coupon or rebate or fails to file the same within a required timeframe. Upon receipt of such information the manufacturer must determine whether or not to honor a coupon or rebate. To do so, they must determine whether the coupon or rebate applies to a specific good that has been sold to the specific buyer. Because this process is difficult, it is not only time consuming but is also subject to fraud. Such fraud may involve a purported buyer operating independently, a buyer and retailer operating together, or a retailer operating independently.

To combat fraud, manufacturers apply complicated approaches to attempt to link the coupon or rebate to the specific good, often confusing and disappointing buyers and retailers. For example, a fifteen digit model number may appear to correspond to a coupon being offered and causing a sale even though one digit may be off and only identified after a manufacturer's rejection has been received. If this happens to a retailer, the retailer may lose money on the sale of the item. If it happens to the buyer, the buyer may be angry with the retailer and/or the manufacturer and avoid their businesses in the future.

With large distributed channels, manufacturers typically do not know the identity of their retailers. This further complicates the rollout of coupon or rebate offering.

Many other problems and disadvantages associated with prior systems will become apparent to one of skill in the art upon review of such prior systems and in light of the teachings herein.

SUMMARY OF THE INVENTION

A system and/or method is provided for an online promotion system supporting buyers, sellers and promoters, substantially as shown in and/or described in connection with at least one of the figures, as set forth more completely in the claims.

Many other aspects and variations of the promotion system of the present invention can be appreciated by one of skill in the art through review of the detailed description, corresponding drawings, and claims.

BRIEF DESCRIPTION OF THE DIAGRAMS

The numerous objects and advantages of the present invention may be better understood by those skilled in the art by reference to the accompanying figures in which:

FIG. 21 is a diagram that shows a list of products with prices provided to Buyer by the MSIS;

Figure 34:
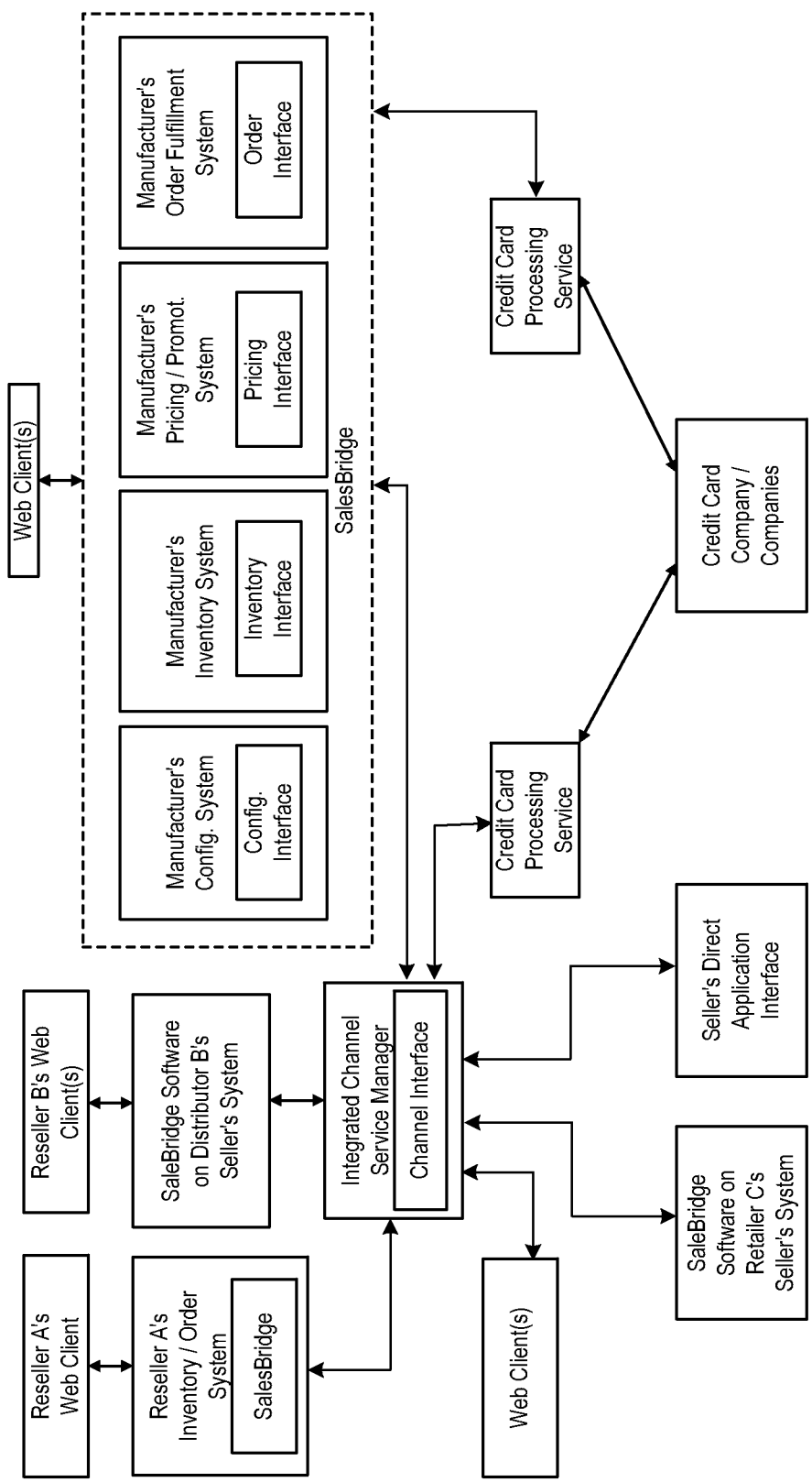
Figure 35:
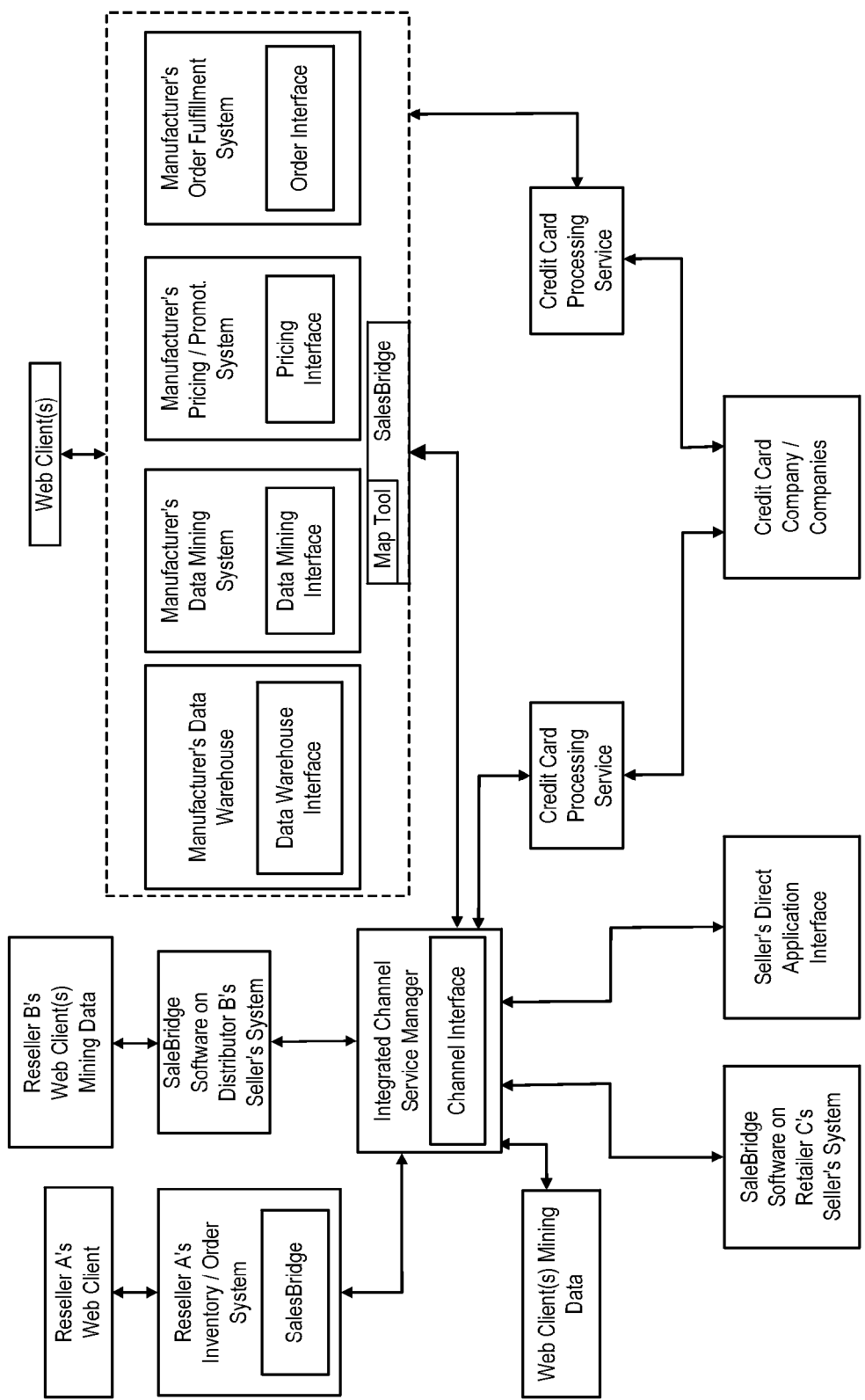
Figure 36:
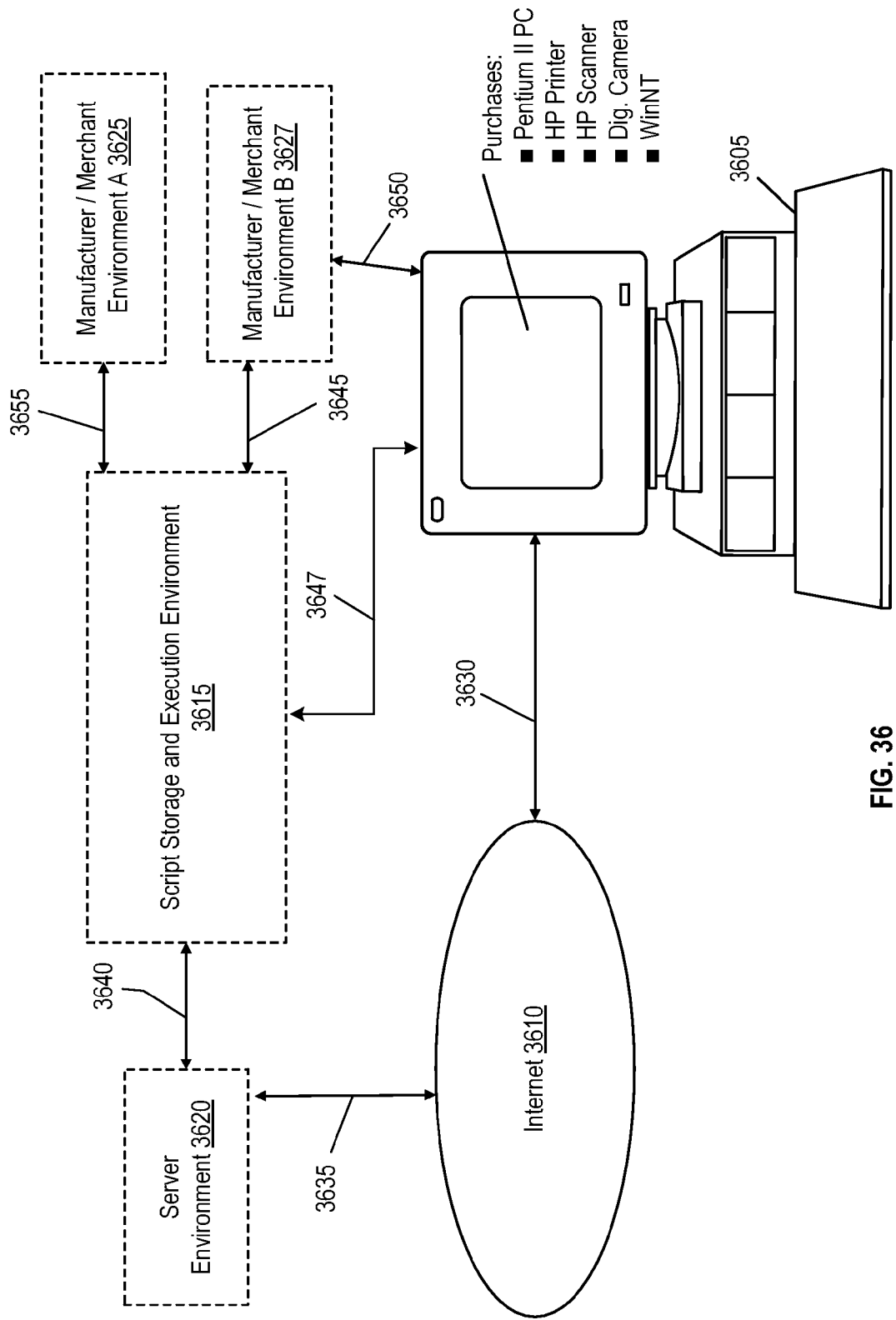
Figure 37:
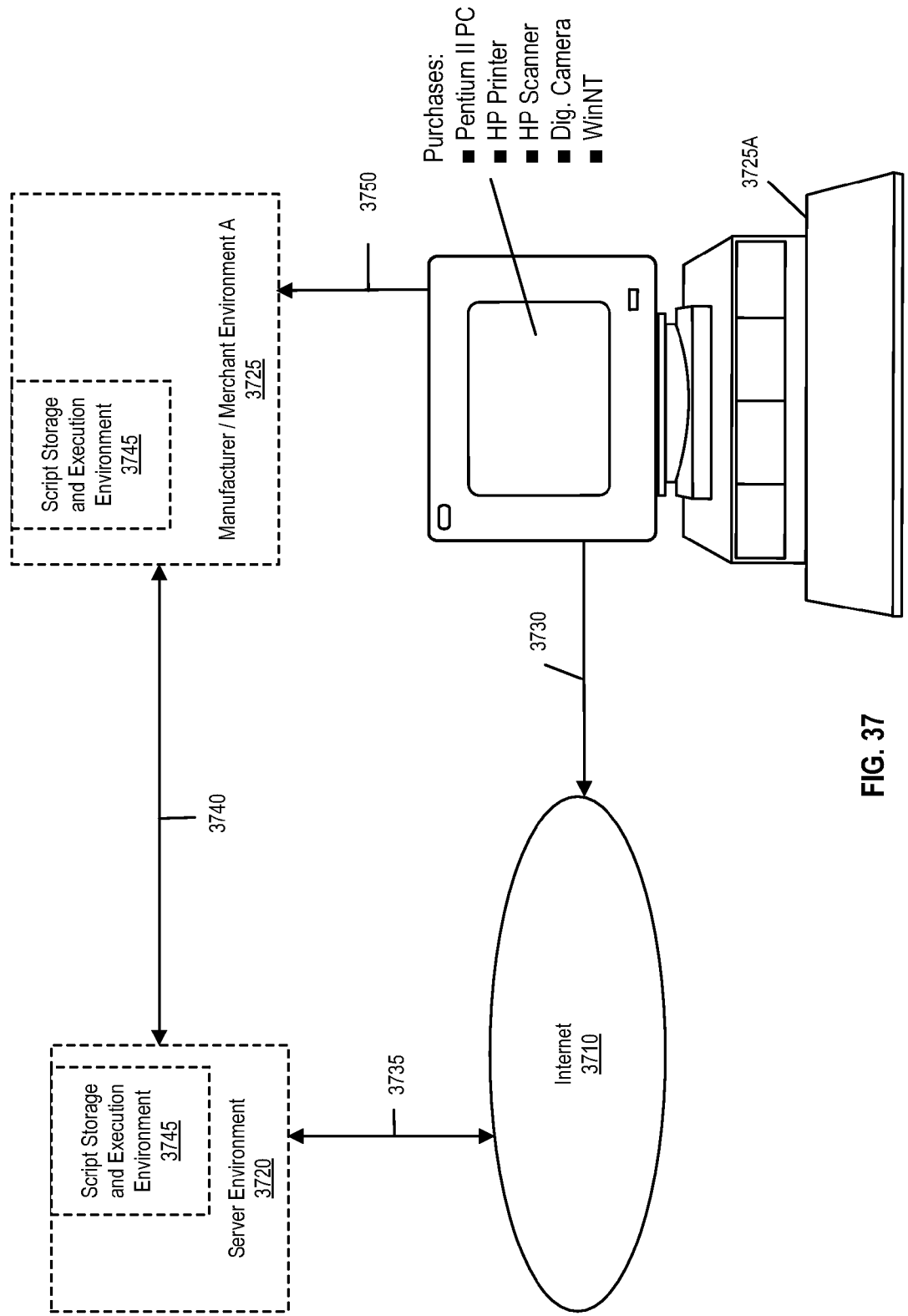
Figure 38:
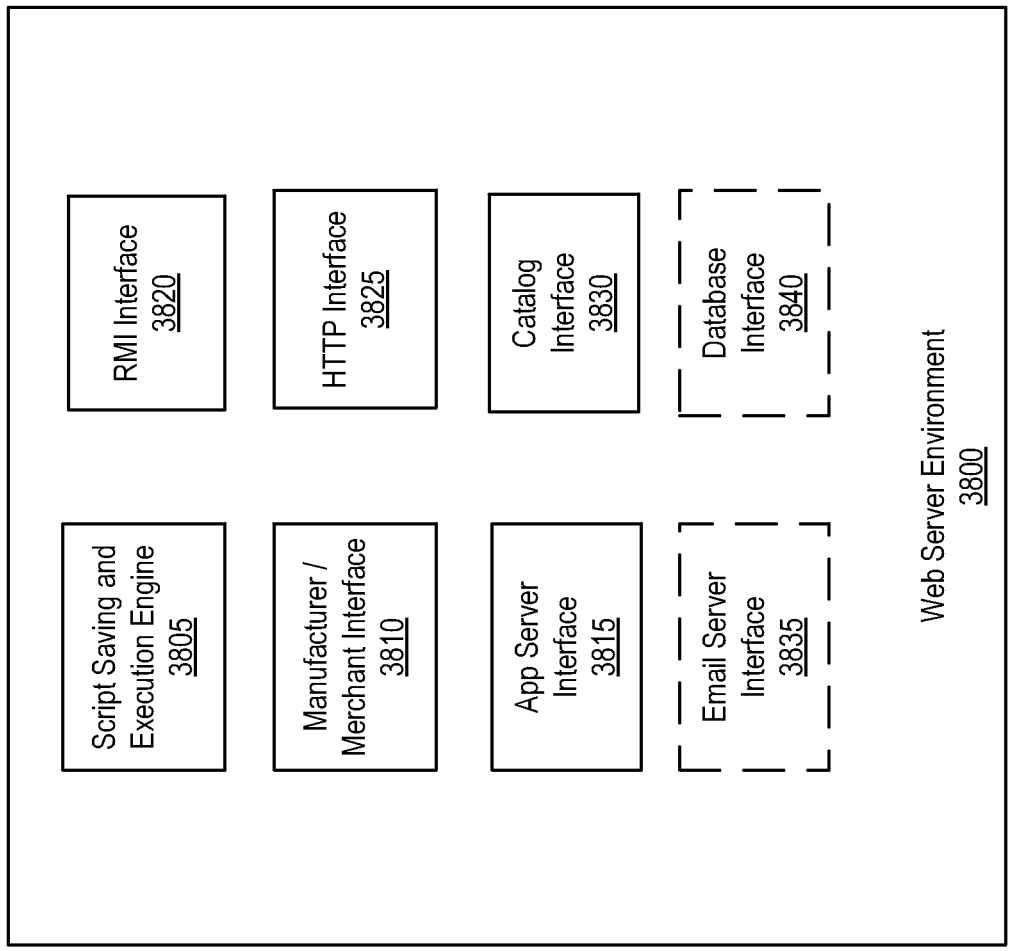
Figure 39:
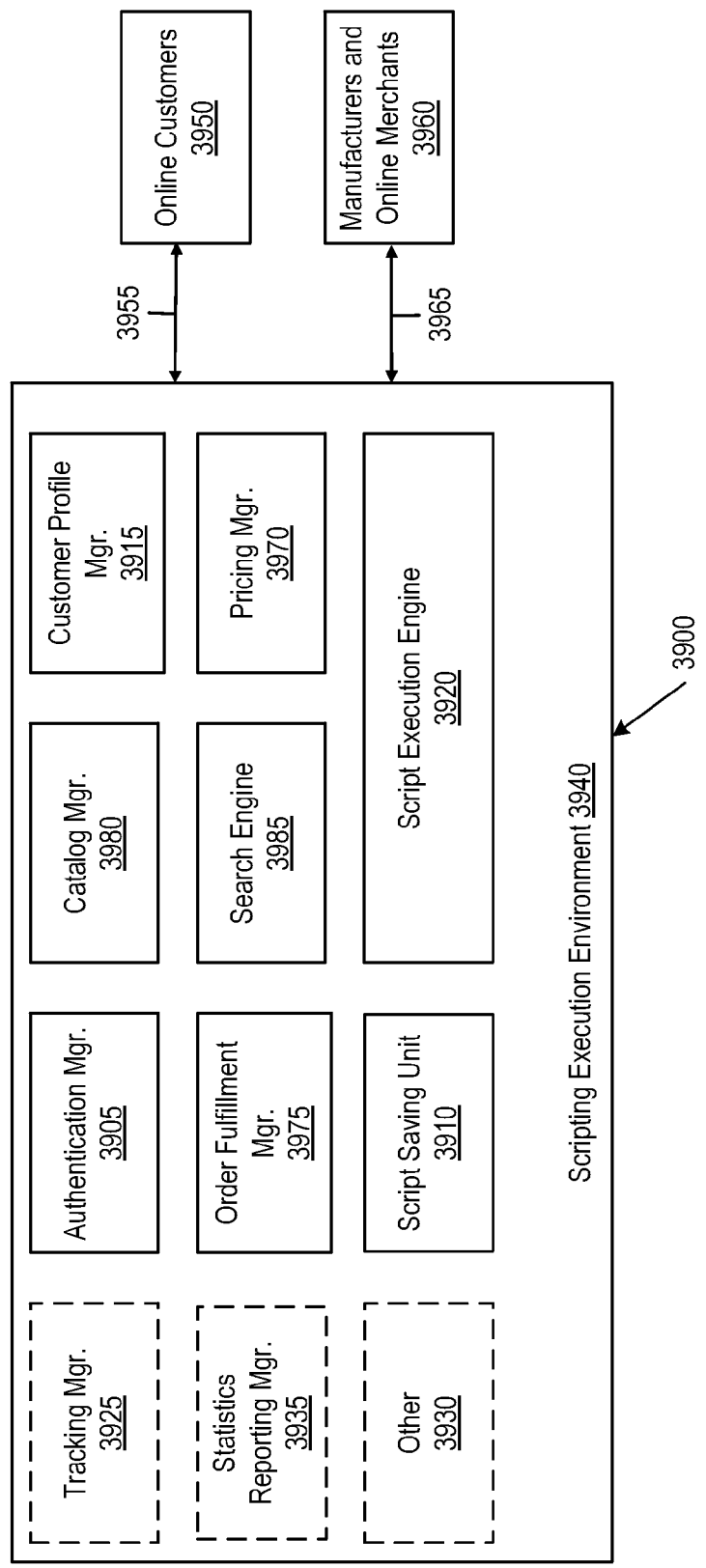
Figure 40:
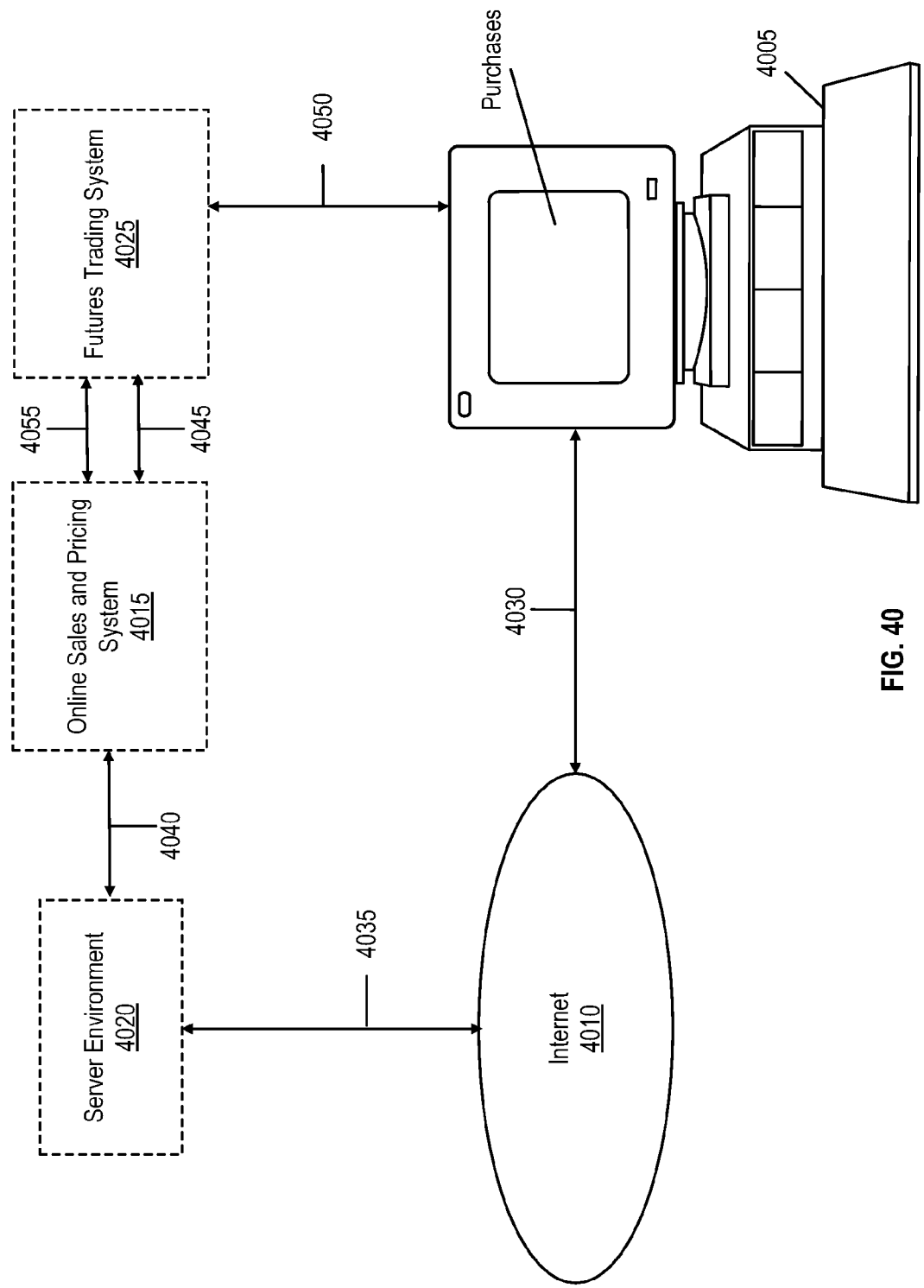
Figure 41:
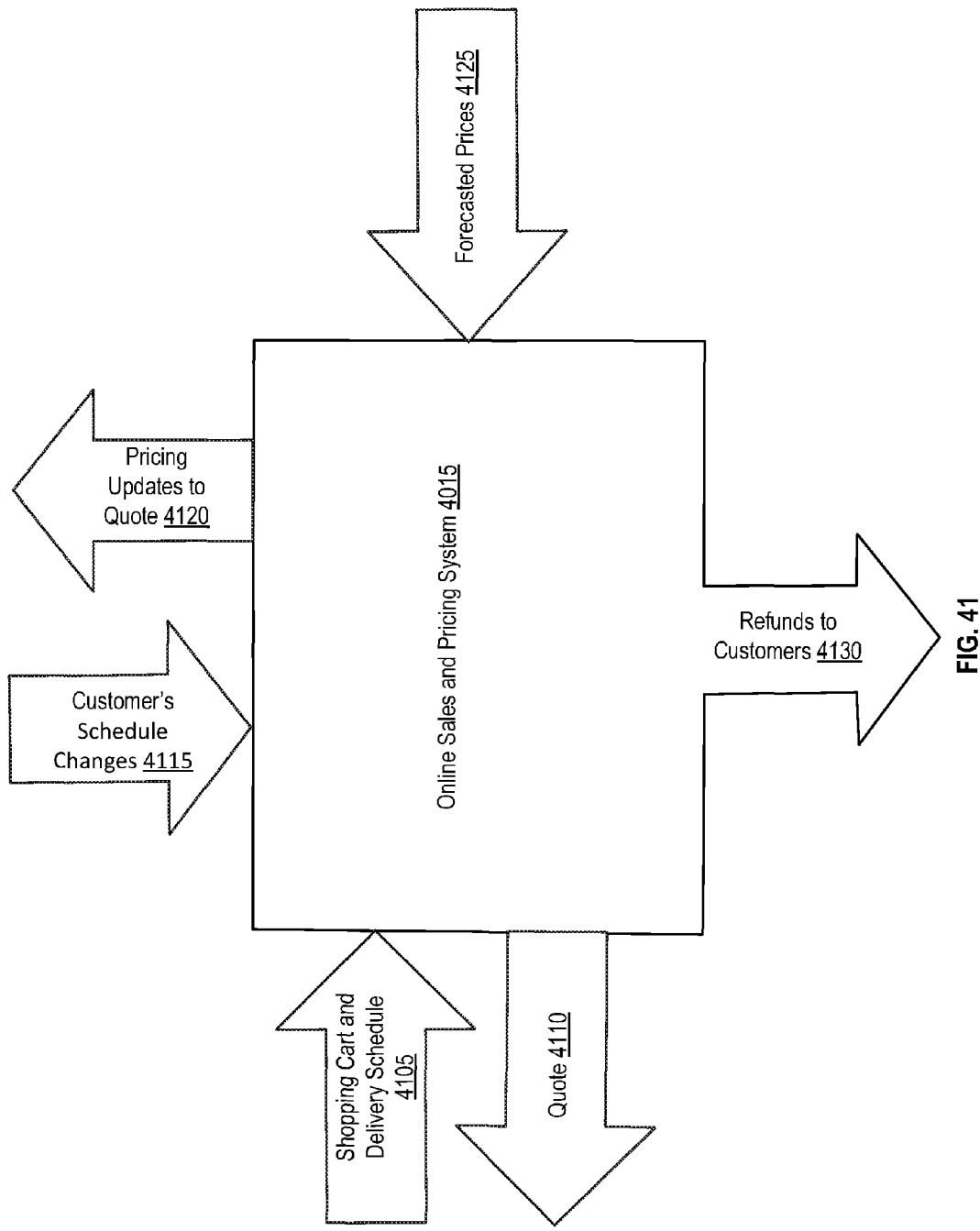
Figure 42:
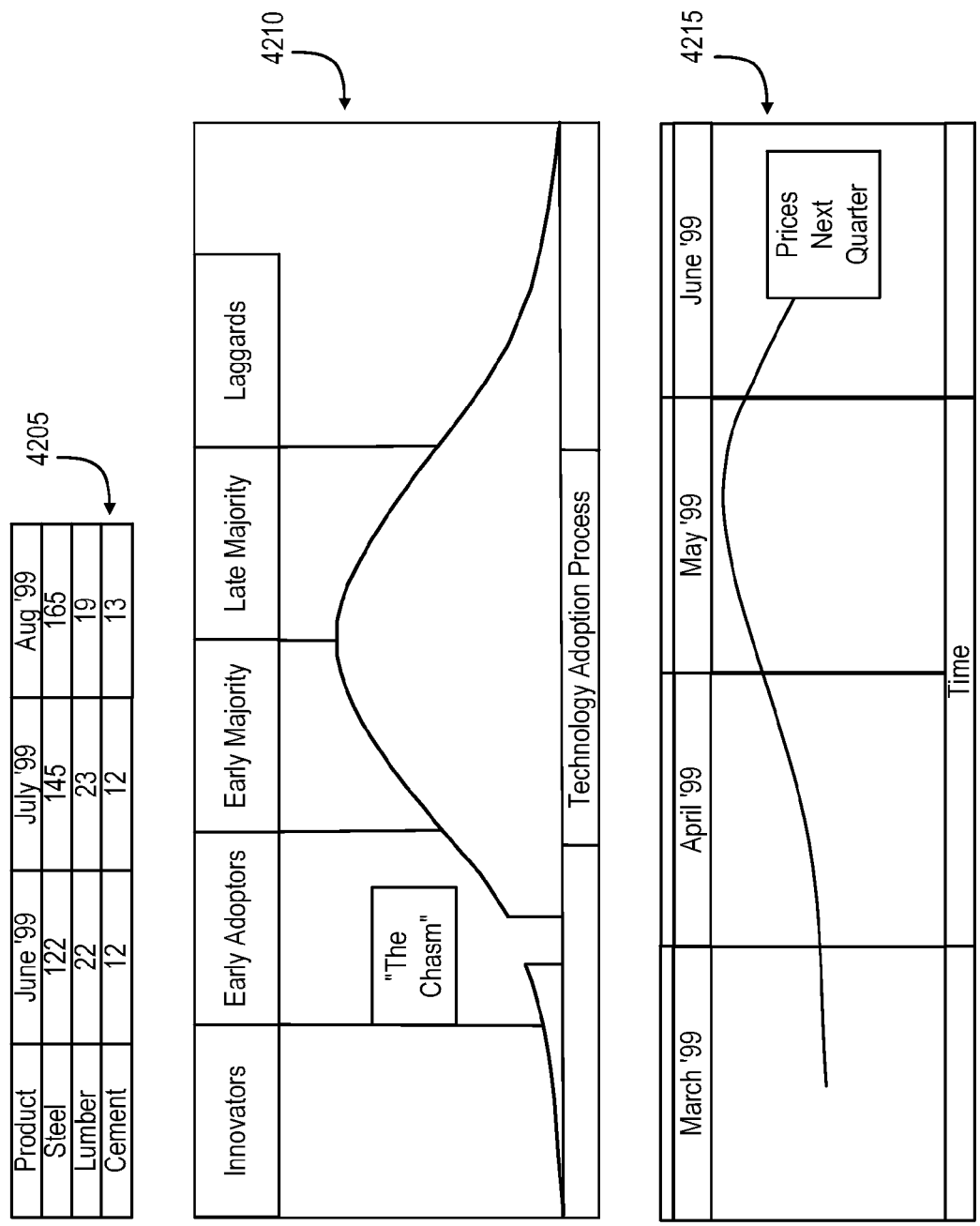
Figure 43:
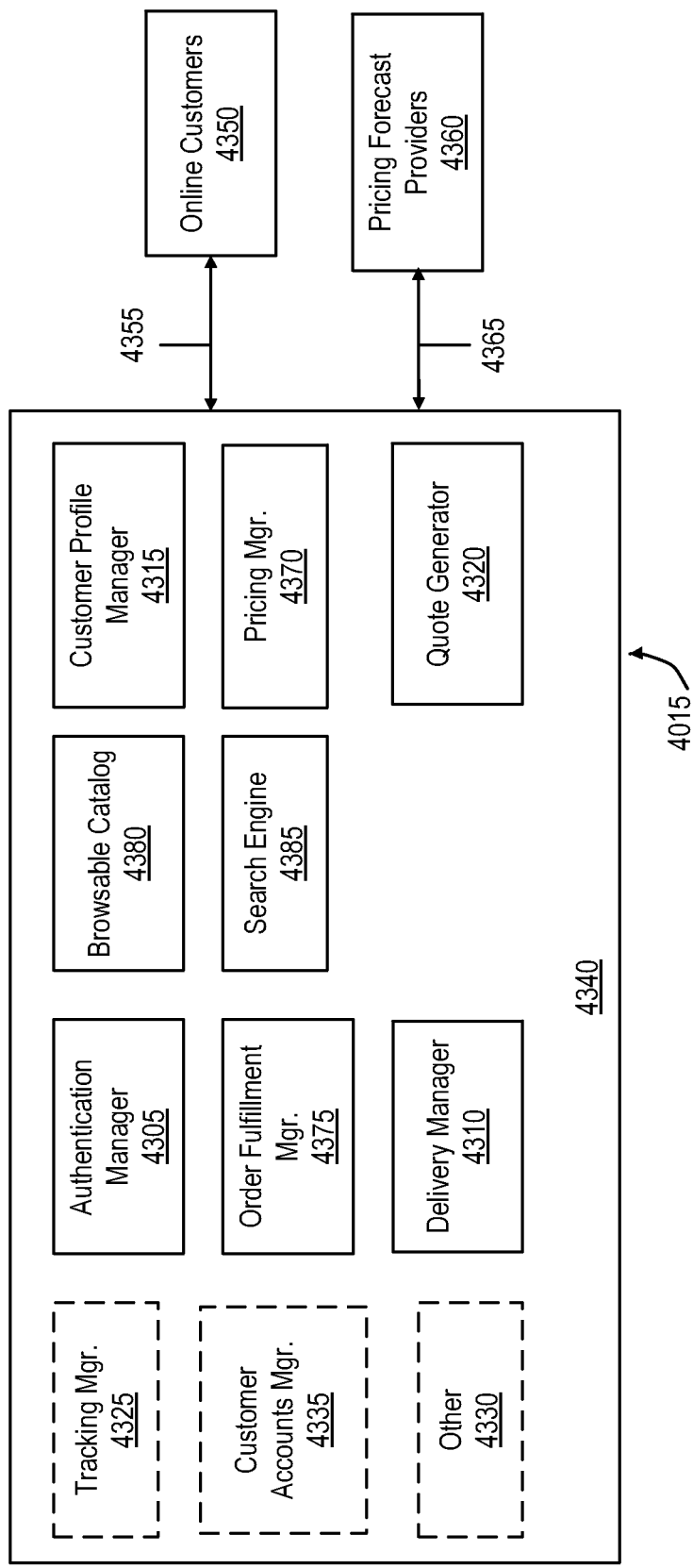

FIG. 34 is a schematic diagram of an Integrated Channel System comprising an Integrated Channel Service Manager, a manufacturer environment comprising an Inventory system, a Pricing system, a Configuration system, and an Order fulfillment system, a Reseller system for Reseller A comprising an inventory system and an order system, a Reseller system for Distributor B comprising a Seller's system, and a Retailer system for Retailer C comprising a Seller's system in accordance with the present invention;

FIG. 35 is a schematic diagram of an Integrated Channel System comprising an Integrated Channel Service Manager and a manufacturer environment of the present invention;

FIG. 36 is a perspective diagram of an online buyer interacting with a server, via the internet, to specify products that are to be purchased periodically, to selectively save the specification of products that are to be purchased periodically in a Script Storage and Execution Environment, and to selectively retrieve previously saved specification of products from the Script Storage and Execution Environment for modification or for purchasing;

FIG. 37 is a diagram showing the incorporation of the Script Storage and Execution Environment into both the web server and the manufacturer/merchant environment;

FIG. 38 is a block diagram showing the different functional components of a web server environment that facilitates email and script based sales transactions;

FIG. 39 is a block diagram of a scripting execution environment that provides access to various resources and data via appropriate interfaces during the execution of scripts;

FIG. 40 is a perspective diagram of an online customer using a computer interacting with an online sales and pricing system, via the internet, to conduct online purchases during which the pricing computation employs, among other things, the customer's schedule of product delivery, the forecasts of product prices provided by online futures trading systems and the projected needs of the customer;

FIG. 41 is a diagram showing the various inputs and outputs of the online sales and pricing system;

FIG. 42 shows various forms of product price forecasting information received by the online sales and pricing system from pricing forecasting systems such as futures trading systems, commodity trading organizations, market research institutions, manufacturers, etc.;

FIG. 43 is a block diagram showing exemplary components of the online sales and pricing system; and FIG. 44 shows the operation of the pricing logic based on unit prices of the products as determined by forecasted pricing information obtained from pricing forecast providers and the delivery schedule provided by the customer.

DETAILED DESCRIPTION OF THE DIAGRAMS

Figure 1:
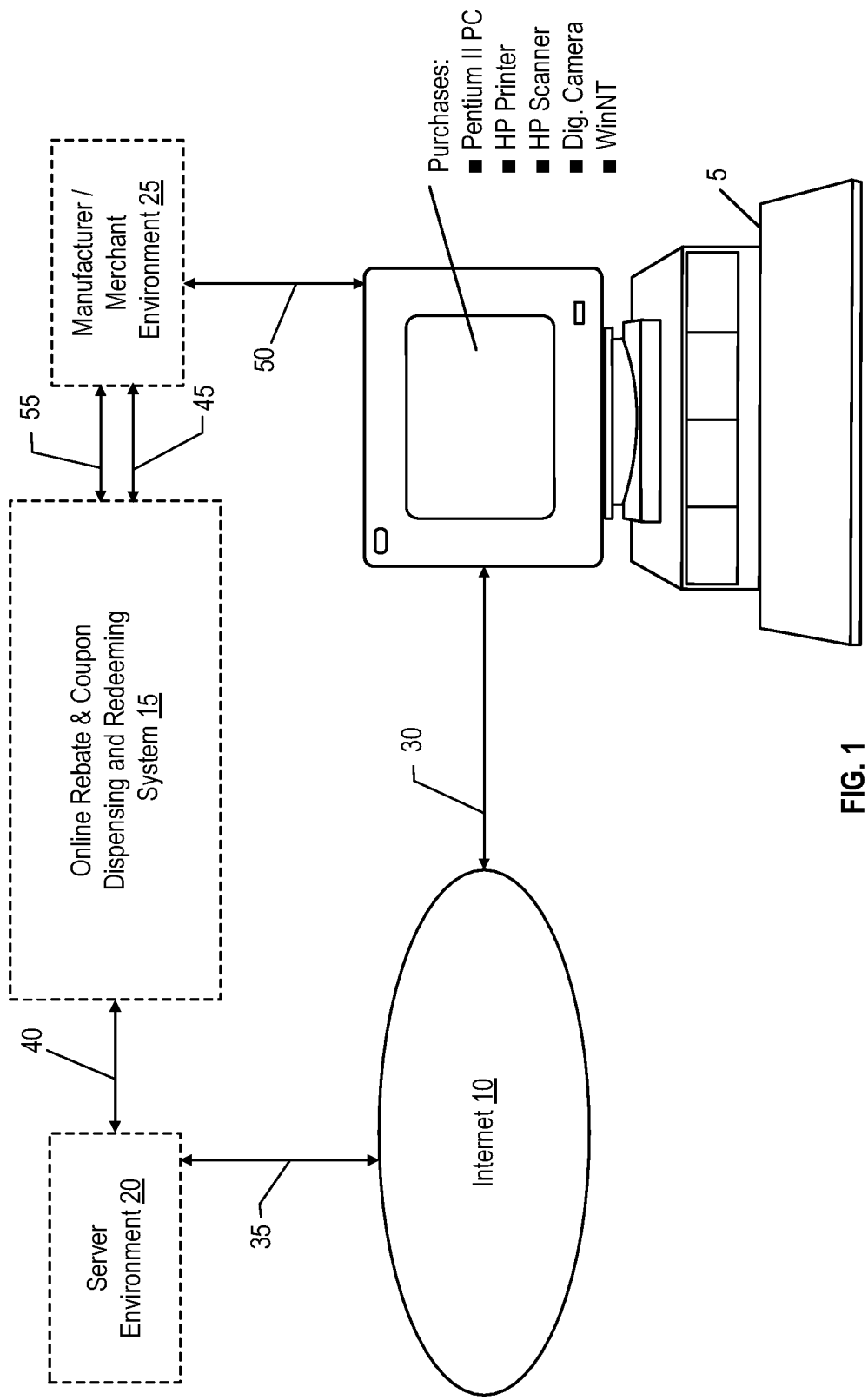
FIG. 1 is a perspective diagram of an online buyer using a computer, interacting with a system for online sales with automatic rebate and coupon redemption, via the Internet, to obtain savings from the automatic redemption of rebates and coupons that can apply towards his online purchases.

FIG. 1 is a perspective diagram of an online buyer using a computer 5, interacting with an online rebate and coupon dispensing and redeeming system 15, via the Internet 10, to obtain savings from the automatic redemption of rebates and coupons that can apply towards his online purchases. The system 15 is typically associated with a web server or server environment 20 that provides Internet-based web hosting services. In addition, the system 15 is linked via appropriate connections 45 to information systems at one or more manufacturer or merchant environments 25. Such information systems include appropriate Internet web hosting services.

The system 15 performs many functions. Among other functions, in many embodiments, the system 15: (1) verifies that a manufacturer's rebate or coupon applies to an independent retailer's offering; (2) instantly applies such rebates or coupons; (3) places control in the manufacturer for designing and defining the number, amount and, if desired, applicable timeframe of coupons or rebates in real time; (4) places control in the manufacturer for changing, replacing or canceling of coupons or rebates; and (5) supports advertising of rebates and coupons on many web servers by providing corresponding coupon and rebate processing. Thus, the system 15 automates the traditional human intensive coupon and rebate processing.

The system 15 supports automatic and manual adjustments of promotional offerings, i.e., coupons, rebates, etc. Automatic adjustments may be triggered by a variety of parameters such as the amounts of coupons and rebates distributed, the amount of coupons and rebates redeemed, current product inventory levels of the manufacturer or the distributor or retailer, the shelf life of products in inventory, etc. Adjustments may include increasing or decreasing the promotional value, i.e., the amount of the coupon or rebate, the quantity of coupons or rebates to be distributed, the term of the coupon or rebate, the goods to which the coupon or rebate may apply, or any other coupon or rebate parameter. The automatic adjustment parameters may be set up by the manufacturer, retailer, distributor, or system administrator via a web browser interface. Such interface may also be used to: modify such automatic adjustment parameters; change the coupon or rebate parameters; or withdraw the coupon or rebate.

Customers are presented with a catalog of products to choose from, by the web server or server environment 20 associated with the system for online sales with automatic rebate and coupon redemption 15, when they visit the system for online sales with automatic rebate and coupon redemption 15. If the customer selects one or more products from the catalog or list of products available at the system for online sales with automatic rebate and coupon redemption 15, they are provided with the option of purchasing the products with the automatic retrieval and application of rebates and coupons. They are also provided with the option of downloading them for purchasing those products at a future time.

If the customer elects to purchase the selected products from the system for online sales with automatic rebate and coupon redemption 15, all applicable rebates and coupons are applied to the customer's purchases by the system 15 in the determination of a final purchase price for the customer. The customer can consummate the purchase by using a credit card for payment. The system 15 processes customer's credit cards for sales processing.

Customer profiles, typically provided by customers during a customer profile generation activity, are selectively used by the system 15 to complete sales transactions and to ship products. Customer profile includes shipping address, credit card related information, etc. Once a customer profile is created, it is used to expedite subsequent customer purchases. Customers who choose not to have a profile created for them may be required to enter their shipping address, credit card related information, etc. during each purchasing activity.

In one embodiment of the present invention, a customer using the computer 5 and the Internet connection 30, accesses one or more rebate and coupon dispensing web pages presented by a server environment 20 associated with and communicatively coupled with the system for online sales with automatic rebate and coupon redemption 15. In this embodiment, the customer would retrieve one or more coupons and rebates for one or more products that the customer plans to purchase, by browsing through several categories of products presented by the system for online sales with automatic rebate and coupon redemption 15. The rebates and coupons for products are also located by searching for them via a searching interface. The customer then activates a purchase button to purchase the products. The system 15 completes a purchase order for the customer incorporating all the products selected by the customer and applying all applicable rebates and coupons. It also performs order fulfillment operations aimed at assigning products from its inventory to the customer.

In one embodiment, the inventory of some of the products purchasable from the system 15 is selectively maintained by the manufacturer/merchant environment 25. For such products, to perform order fulfillment activities, the system 15 interacts with the manufacturer/merchant environment 25, over the connection 45, in one of two approaches. In the first approach, the manufacturer/merchant environment 25 receives purchase orders to some products currently available in their inventory from the system for online sales with automatic rebate and coupon redemption 15, along with rebate and coupon information, in order to perform order fulfillment for the customer. The customer profile, or a subset thereof, is visible to the manufacturer/merchant environment 25 which then ships the products to the customer. In effect, the customer pays the manufacturer/merchant environment 25 directly for the products purchased from it.

In the second approach, the system 15 purchases the products using all associated coupons and rebates from the manufacturer/merchant environment 25 on behalf of the customer and has the purchased products shipped directly to the customer. In this scenario, the system 15 acts as a purchaser and pays for the products purchased from the manufacturer/merchant environment 25. It then bills the customer for the actual purchase price that incorporates relevant rebates and coupons. Thus, the customer benefits from the instantaneous redemption of coupons and rebates facilitated by the coupon dispensing and redemption system 15.

In one embodiment, the system 15 serves as a front end to the e-commerce sites of manufacturers and merchants wherein customers purchase products from the system 15 and reimburse it, say via credit cards, for the products purchased online. The system 15 in turn acquires the products purchased by the customer from designated suppliers such as manufacturers, distributors or retail merchants. A supplier is selected based on the product category, the inventories of products at the various suppliers, the business arrangements made with various suppliers and other criteria. In effect, the supplier sells the products to the system 15 which ensures the redemption of all available coupons and rebates for the purchases. The system 15 sells those products back to the customer passing most of the savings from rebates and coupons to the customer. The system 15 selectively charges the suppliers a transaction fee for generating their business. The customer is also selectively made to pay a service charge to the system 15 for its seamless and automatic rebate and coupon redemption.

In another embodiment of the present invention, the customer retrieves rebates and coupons from the system 15 and then saves these rebates and coupons, preferably in his browser software or on the hard disk of his computer 5. Such rebates and coupons are preferably saved in electronic form, for subsequent submission to the system for online sales with automatic rebate and coupon redemption 15, or to the manufacturer/merchant environment 25, during a purchasing activity. When presented with such coupons during any purchasing activity, the manufacturer/merchant environment 25 presents them, over the connection 45, to the system 15 for selective coupon and rebate authentication and selective redemption.

In another exemplary scenario, the online customer using the personal computer 5 accesses the Internet via a connection 30 employing a modem on his computer and a browser software on his computer. He then, using his browser software, navigates to a manufacturer/merchant environment 25, such as an electronic mall, to purchase one or more items of his choice. A connection 50 established over the Internet between the computer 5 and the manufacturer/merchant environment 25 allows user selection of purchasable items, optionally via a catalog of items presented to the customer by the manufacturer/merchant environment 25. After selecting the desired items into a shopping cart, the customer invokes a rebate and coupon button on a screen presented by the manufacturer/merchant environment 25 that results in the submission of the shopping cart to the system 15 via a connection 45. In response, the system 15 selectively returns all applicable coupons to each of the items in the customers shopping cart. This includes manufacturer's coupons, retailer's coupons etc. In addition, if any items in the shopping cart are not specific enough to unambiguously identify a manufacturer, the system 15 returns coupons for multiple manufacturers of similar products for the customer to choose from. The returned rebates and coupons are automatically applied by the manufacturer/merchant environment 25 in the determination and display of a final price for the customer.

To submit online information on coupons to the system 15 so that they can be dispensed to customers, one or more manufacturer/merchant environments 25 employ a connection 55, which is some cases, such as the Internet, may be the same as the link 45 used by the manufacturer/merchant environment 25 to extract coupons on behalf of a customer from the system for online sales automatic rebate and coupon redemption 15.

The system 15 selectively provides manufacturers and merchants information on the customer's region, the volume of sales, the material velocity of the products, etc. thus giving manufacturer/merchant environment 25 the ability to change coupons based on their sales goals and other criteria.

Figure 2:
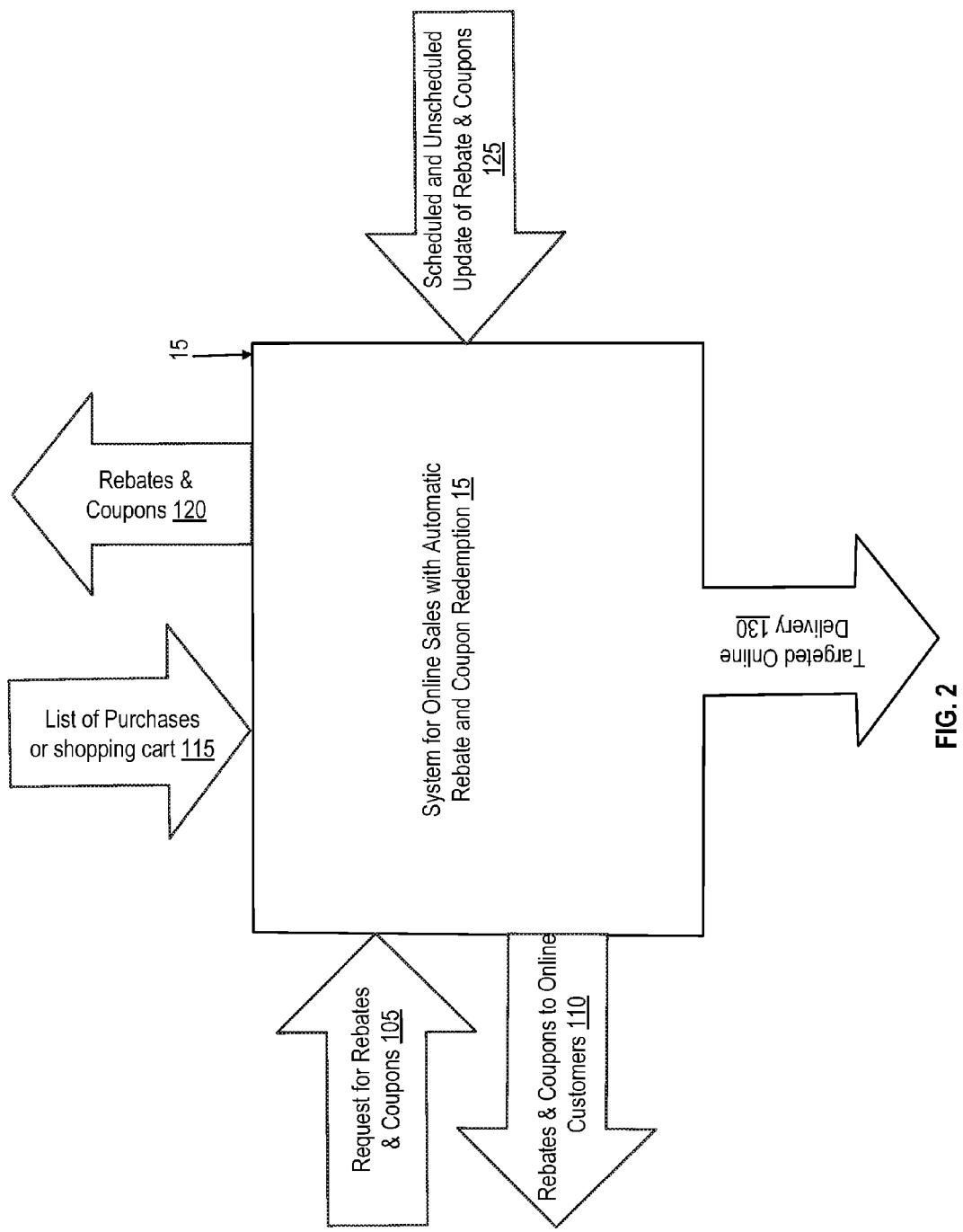
FIG. 2 is a diagram showing the various inputs and outputs of the system for online sales with automatic rebate and coupon redemption.

FIG. 2 is a diagram showing the various inputs and outputs of the system for online sales with automatic rebate and coupon redemption 15. The system 15 receives Request for Rebates and Coupons from Online Customers 105 and, in response, returns Rebates and Coupons to Online Customers 110. In addition, it receives a List of Purchases or Shopping Cart 115 from online merchants or online malls and, in response, it returns Rebates and Coupons 120. It also receives Scheduled and Unscheduled Update of Rebates and Coupons 125 from manufacturers and retailers. To automatically provide rebates and coupons to customers periodically, the system 15 performs Targeted Online Delivery 130, typically via email.

In one embodiment of the present invention, the system 15 receives a List of Purchases or Shopping Cart 115 from customers. In response, it prices the shopping cart and automatically applies all relevant rebates and coupons to the various products in the shopping cart. It then performs order fulfillment activities to ship the products to the customer.

Figure 3:
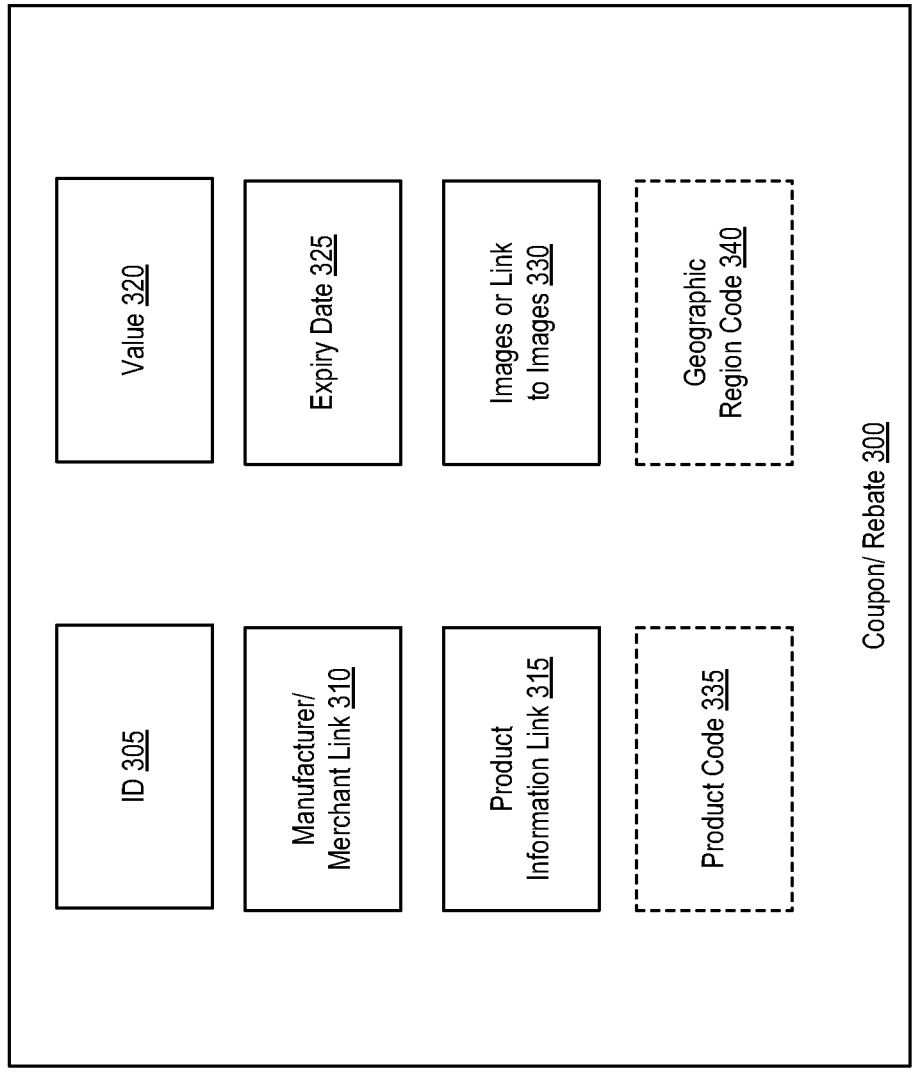
FIG. 3 shows the various elements contained in a rebate or a coupon in accordance with the present invention.

FIG. 3 shows the various elements contained in a rebate or a coupon in accordance with the present invention. The coupon 300 dispensed by the system 15 are each a structured collection of information including an identification 305, information on the value of the coupon 320, an expiry date 325, images or links to one or more images 330 for display purposes, links to a product manufacturer 310, and links to product information 315. Other information such as a product code 335, a geographic region code 340, etc. may also be selectively included. Some of the information presented in a coupon may selectively be encrypted for subsequent decryption and/or display either by the software at a customer's computer 5 or at a manufacturer/merchant environment 25. In this embodiment, the coupon is presented as an HTML document with appropriate links to some of its elements as described above. The coupon may be stored in other document types also, as appropriate. Rebates are also structured similarly to coupons, and they typically contain all the elements described here for coupons.

In general, coupons and rebates dispensed by the system 15 may be selectively saved by customers for subsequent redemption. Saved coupons and rebates have an associated expiry date. The manufacturer/merchant environment 25 may choose not to honor coupons that have expired. In one embodiment of the present invention, the manufacturer/merchant environment 25 interacts with the system 15 to determine if an expired rebate or coupon should automatically be replaced by a newer one.

In another embodiment, the coupons and rebates being dispensed are generated in Extensible Manipulation Language (XML) format. The customer's computer may or may not be able to process such XML documents. If, for example, the customer's browser cannot process the coupon information, then it does not display such information properly and gives the customer the option to save the coupon in the computer's 5 hard disk. Such XML coupons may not be processed by the manufacturer/merchant environment 25 either if the information systems at their web site are not capable of processing XML based coupons. In such situations, the XML based coupons and other coupons that cannot be processed are returned to the system 15 by the manufacturer/merchant environment 25 for processing and for redemption.

Figure 4:
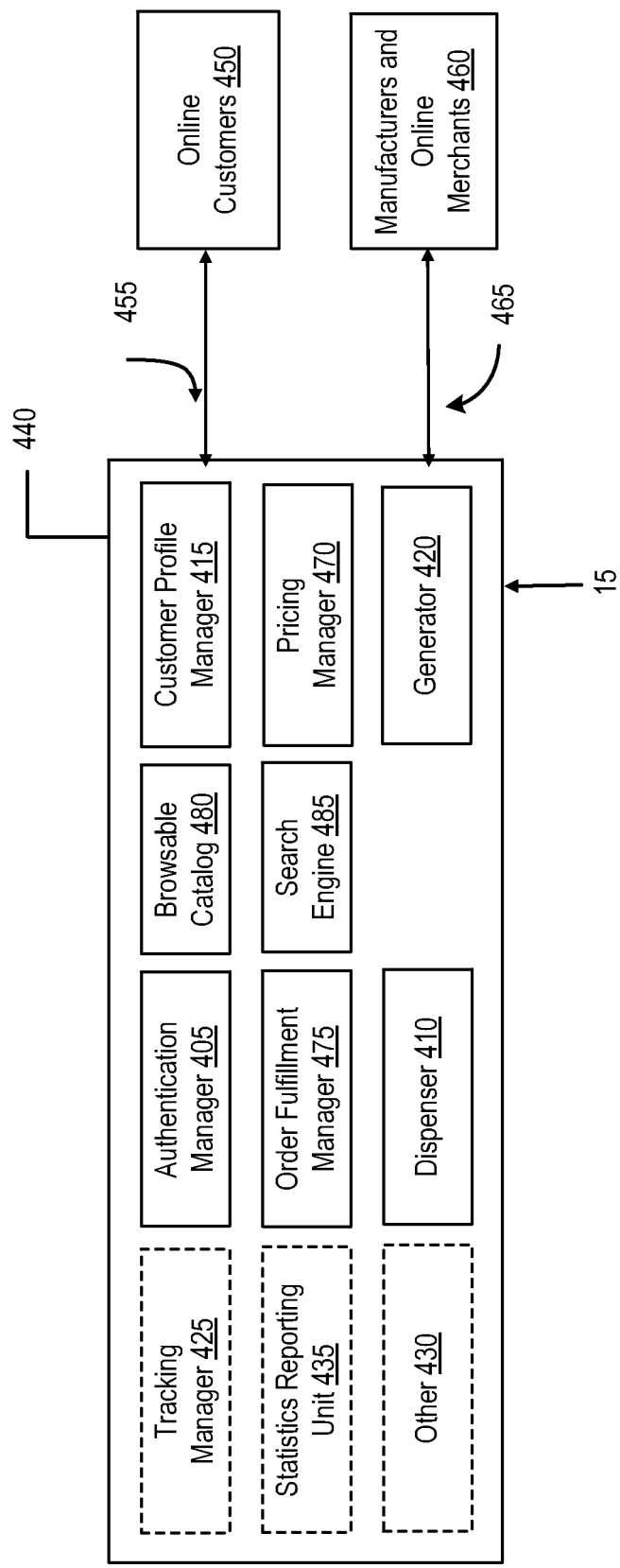
FIG. 4 is a block diagram showing exemplary components of the system for online sales with automatic rebate and coupon redemption.

FIG. 4 is a block diagram showing exemplary components of the system for online sales with automatic rebate and coupon redemption 15. The system 15 includes a browsable catalog 480 through which customers can select one or more products for purchasing, a search engine 485 for searching for specific products based on one or more criteria, an Authentication Manager 405 for verifying the authenticity of coupons and rebates presented to it for redemption, and a Dispenser 410 which dispenses coupons and rebates generated by a Generator 420. It also includes a Customer Profile Manager 415 which is used to gather profile information of customers and an optional Tracking Manager 425 that is used to track user buying patterns over a long term. An optional Statistics Reporting Unit 435 provides various statistical information to manufacturers and online merchants periodically or on-demand.

When customers decide to purchase products from the system for online sales with automatic rebate and coupon redemption 15, a pricing manager 470 provides pricing functionality that incorporates calculation of prices based on several factors including available rebates and coupons. The pricing manager 470 also includes a credit card processing unit that processes credit card based customer sales, and a sales support unit that provides quote generation features. An order fulfillment manager 475 provides information on available inventory of products. If a product purchased by a customer is not in stock or not stored locally at the system for online sales with automatic rebate and coupon redemption 15, the order fulfillment manager 475 makes it possible to purchase that product from the manufacturer, distributors or merchants. Such purchases are done in one of two ways—seamlessly where the customer does not realize that the product is being acquired from a manufacturer or merchant 460, or explicitly where the customer is aware of the participation of a manufacturer or merchant in the fulfillment of his purchase order.

Online Customers 450 access the system 15 over the connection 455. They can browse through the online browsable catalog of products and services 480 or search for a specific product or service based on criteria such as product category, geographical region, brand names, etc. Manufacturers and Online Merchants 460 access the system 15 over the connection 465.

In one embodiment of the present invention, when providing access to customers who want to download coupons and rebates, the system 15 contains a browsable indexed selection software making it easy for the customer to locate or search the required coupon or rebate. It also provides vectors to advertising placed by manufacturers or online merchants located either at the web server 20 or at an external web server. In addition, it can provide vectors to sales points such as online merchants or electronic malls where the associated products may be available for sale if it is not currently available for sale at the system for online sales with automatic rebate and coupon redemption 15. Moreover, the dispensed coupons and rebates can be automatically incorporated into the pricing logic of a merchant or manufacturer's electronic commerce system to which the system 15 provides links for customer access.

In a similar embodiment of the present invention, coupon verification is performed by the electronic commerce software of the manufacturer or online merchant to which a customer migrates to from the browsable indexed coupon selection software, along with a coupon and/or rebate for one or more products. This implies that a customer can consummate a purchase of a product at a merchant or manufacturer's e-commerce site following the selection of a coupon or rebate from the system 15 and subsequent vectoring with a coupon and/or rebate to the e-commerce site.

The system 15 provides a circular path for identifying the users of dispensed coupons and rebates when coupons previously downloaded by customers are returned by online merchants or manufacturers for redemption. Thus, buying habits and patterns of coupon access of individual customers can be determined. Such information may be used in the generation of appropriate coupons for individual customers as well as for creating marketing plans by online merchants and manufacturers.

Downloaded coupons may be printed as bar-coded coupons by customers for subsequent redemption at traditional neighborhood merchant shops. The printing is facilitated by a print engine that is either available at the customer's computer or can be easily downloaded to the customer's computer. The same is true for coupons and rebates emailed to customers by the system 15 as part of a "targeted coupons dispensing activity" in which individual customers are targeted to receive appropriate coupons based upon their shopping behavior, as determined by system for online sales with automatic rebate and coupon redemption 15. Automatic targeting of customers by the system 15 is based on customer's buying habits, current marketing promotions, etc., via for e.g., electronic mail (email). Customers have the ability to redeem them without having to print it, as is typically done for purchases from online merchants.

In one embodiment, the system 15 provides credit to customers for coupons redeemed by the customers. It subsequently dispenses further coupons to those customers based on their credits earned. Such coupons may be used by the customers either for further online purchases or for purchases at a traditional store. In addition, coupons are obtained at a traditional neighborhood store redeemable during the customer's next online purchase. Such coupons are redeemed by customers during online purchases where they are provided with the opportunity to specify information about the coupons.

Coupons typically have an associated expiry date. Vendors assign expiry dates to not only the advertisements of products but also for their associated coupons. While browsing the web server 20 for products and coupons, when customers are presented with an advertisement, they are also presented with a coupon for it. A displayed advertisement vectors seamlessly, via a link, to an associated manufacturer's or merchant's online information website. If a customer activates such a link to a online merchant's e-commerce site, if necessary, in order to facilitate the expected sale. Information carried by the coupon(s) may be employed by pricing and quote generation components of a merchant's e-commerce software.

In general, the system 15 integrates with sales force automation (SFA) software employed by manufacturers and merchants. It also integrates with e-commerce platforms that provide multi-vendor sales. For the multi-vendor platforms where similar products from multiple vendors are available for sale, the system 15 selectively dispenses "generic" coupons that will apply towards a product from any of the participating vendors. Such generic coupons may be provided to a customer along with a vendor-supplied coupon, if any.

In one embodiment of the present invention, information related to the geographical location of a customer is selectively used by system 15 in determining the type and/or value of coupon to dispense. For example, a manufacturer may desire to provide coupons of different value and expiry dates for the same product in different sales regions. The system 15 makes it possible to customize the different attributes of a coupon such as its value, expiry date etc. to specific geographical zones or to specific user types. For example, a corporate customer may be provided a different coupon from those provided to non-corporate customers.

The system 15 optionally charges manufacturers and online merchants for its services. These charges may be levied by one of several different methods, some of them related to the number of customers who download coupons, some related to the number of customers who redeem those coupons, and others related to both these attributes. For example, local small businesses may provide a coupon and they are charged based on the number of coupon's accessed or redeemed.

The system 15 captures the list of people who access it and download coupons. The local small businesses that employ the services of the system 15 pay a charge based on such a list. They can also update their coupons automatically via an interface to the coupon generation component of the system for online sales with automatic rebate and coupon redemption 15.

To facilitate location of a coupon for a product by a customer, in one embodiment, the system 15 provides a web interface where coupons are categorized into different product categories and a customer browses, using a web browser, through categories and sub-categories of products to locate one or more coupons. The system 15 also categorizes coupons by manufacturers and merchants. If a customer purchases one or more products on the system for online sales with automatic rebate and coupon redemption 15, the rebates and coupons, if any, are automatically applied to the final price for the customer.

Internet portals, such as Yahoo, and Internet web services, such as Internet service providers (ISPs), can provide an automatic connection to the system for online sales with automatic rebate and coupon redemption 15, so as to provide their readers information on available coupons on one or more products associated with the currently displayed web page. Such coupon related links or information is displayed in one of the frames displayed on the customer's web browser. Alternatively, these portals can route web browsers automatically to the system 15 to retrieve associated coupons if necessary, say in a pop-up screen (or frame) automatically created by the currently visible web-page provided by the portal. Thus, readers of web content provided by web page hosts and portals can retrieve coupons while they browse product information.

To facilitate the creation of coupons by manufacturers and online merchants, the system 15 provides canned images and coupon frames based on category that may be further customized by manufacturers and online merchants to suit their needs.

Customers search for coupons by category and region. In general, four types of coupons are supported, coupons from retailer, coupons from distributors, coupons from manufacturer, and coupons from managers of point of sale devices. Other types of coupons can be easily incorporated.

The online nature of the coupon system provided by system 15 makes it possible for merchants and manufacturers to devise a coupon based marketing and sales strategy where the expiry date, and the volume of coupons in a marketing campaign are dynamically adjusted to meet goals. For example, current sales volume might determine changes to coupons value and for expiry date. It would be possible to stop coupons associated with a marketing campaign if sales targets are met. It would also be possible to yank out a coupon based marketing campaign if necessary.

The success of a rebate and/or coupon based marketing and sales campaign can be dynamically and frequently ascertained. Automatic reports on coupon distribution and the redemption rates of coupons are provided to the manufacturers and merchants by the system for online sales with automatic rebate and coupon redemption 15.

Identity of potential customers who access coupons and those who redeem them are maintained by the system for online sales with automatic rebate and coupon redemption 15. Such customer related information can later be used for mass mailing/distribution of coupons. Manufacturers and merchants provide information on their mass mailing needs and system 15 mails (or emails) coupons based on those needs and on online customer information collected automatically. Once coupons are mailed to potential customers, they are tracked to see if they are ever redeemed. Tracking of mailed coupons provides information related to the efficacy of sales and marketing strategy employed.

If a new product is being released by a manufacturer, the system 15 is used to setup, manage and monitor promotional activities based on coupons and/or rebates. The time frame for such promotional activities, the number of coupons and/or rebates to be dispensed, the duration and time frame for the promotional activities, etc., are set by the manufacturer using the promotional server 505 of FIG. 5. The manufacturer may modify the parameters of the coupons and/or rebates (such as coupon or rebate amount, the quantity, the duration, the applicable products, etc.) based on a preset threshold quantity of dispensed coupons or rebates, based on monitored sales activities, etc.

The system 15 can be used to adaptably move inventory by managing the amount and quantity of rebates and coupons. Therefore, the system 15 incorporates inventory tracking, coupon and rebate amount management, marketing activities, sales tracking and other business functions so as to make it possible to not only create promotional material but also to manage/modify the promotional activities based on buyer response to such promotional activities.

The system 15 makes it possible to integrate coupon delivery with software registration and product surveys. Customers who buy and install software are often reluctant to register them with the vendor. This situation is true for other types of products too. In order to provide an incentive for registration of products, the manufacturers or vendors of such products can integrate the system 15 with the registration process so that customers might be enticed with coupons for their next purchase.

The system 15 also provides support for the retrieval of coupons for products to be purchased at neighborhood stores. Such retrieved coupons are printed on laser printers and taken by the customers to the stores for redemption during a purchase.

An advantage of incorporating a coupon authenticator component in the system 15 is the ability to verify if a coupon has already been redeemed. This makes it possible to enforce a redemption rule of one coupon per customer. Copies of a redeemed coupon are disallowed, if necessary. Customers can be informed when a coupon is being reused. For example, they can be told to get newer ones rather than use old ones.

In one embodiment, coupons or rebates that have expired are automatically exchanged with newer ones. If necessary, a 24-hour grace period may be permitted for redemption of coupons to account for time zones too.

Figure 5:
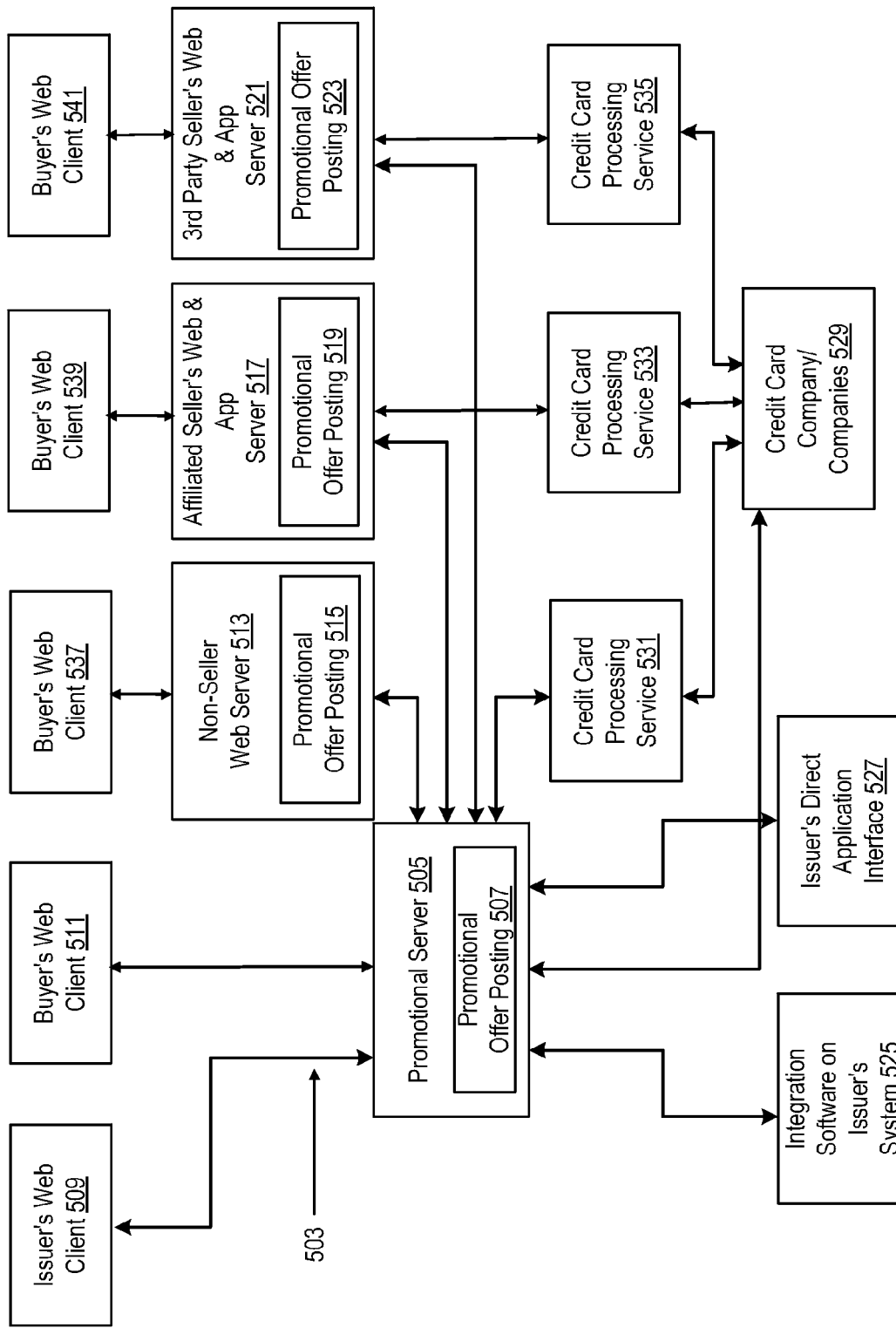
FIG. 5 is a perspective diagram of an online sales environment having a promotional server that interacts with online seller or non-seller, buyer, and issuer systems for offering promotional services.

FIG. 5 is a perspective diagram of an online sales environment 503 comprising a promotional server 505 that facilitates: management of promotional material by manufacturers, retailers and distributors via an issuer's web client 509; participation in online promotional sales by non-seller web servers 513, affiliated seller's web and application server 517 and third-party seller's web and application server 521; integration of credit card companies 529; and registration by buyers via buyer's web client 511. The promotional server 505 is selectively used by issuer's of promotional material such as coupons, rebates, etc.: to create and manage promotional material (in real time or in non-real time) that are applicable to online and offline sales; to provide an online coupon and rebate redemption service that is integrated with their own online sales systems or with online sales system managed by any other third parties; and to collect/retrieve information related to online sales and the efficacy of their online promotions.

Online buyer's register with the promotional server 505, via buyer's web client 511, in order to: automatically register products purchased online with the manufacturers, for warranties and other services, with the help of the promotional server 505; receive refunds due to the buyer from the application of coupons and/or rebates to online purchases consummated by buyer on third-party seller's web and application server 521; and to receive information on product information, sales, discounts, product recall, etc. via email or by other mechanisms.

The promotional server 505 hosts promotional offer posting from a plurality of issuers. The issuers may be manufacturers of goods, providers of services, distributors of manufactured goods, online retailers, etc. The promotional offer postings hosted by the promotional server 505 are coupons, rebates, etc. Promotional offer postings are governed by parameters such as the manufacturer, the associated product, the monetary amount of the promotional offer, the quantity of the promotional offer, the time frame, and any other parameters that may govern promotions. The issuers have the ability to manipulate these parameters using the issuer's web client 509. They also have the ability to create promotional offer postings 507, manage them and manipulate the associated parameters via an issuer's direct application interface 527.

In one embodiment, the promotional offer posting 507 comprises a portal that lists a plurality of promotions such as coupons, rebates, etc. The promotions are categorized based on types of goods and services being sold through the various seller's web servers. A search engine is also provided to assist in locating specific promotions from the plurality. For example, the buyer through the web client 511 might browse to find the available coupons and rebates for a hand held computer under the general category of computer systems. Alternatively, the buyer might enter the terms "hand-held computer" to direct a search through all of the plurality of promotions to find promotions matching such terms.

This search engine may also be used to supplement other search engines of sellers, portals, etc. For example, on a first search engine, a buyer may enter search terms which are used to search a corresponding database for information, goods or services that are offered for sale. Such search terms are also used by the promotional server 505 to search the plurality of promotions stored therein. Alternatively, the plurality of promotions may also be stored in/along with the first search engine for searching through the first search engine.

Typically, promotional offer postings are visually presented to all users that invoke an associated "promotional element" on a web page provided by non-seller web servers 513, affiliated seller's web and application server 517 and third-party seller's web and application server 521. However, some promotional offer postings are selectively provided based on criteria specified by issuers. Such criteria may include the number of past purchases of the same or similar products by individual buyers, the random selection of recipients of specific promotional material by non-seller web servers 513, affiliated seller's web and application server 517 and third-party seller's web or application server 521, etc.

Buyers have the option of registering with the promotional server 505 over the Internet using the buyer's web client 511. During such online registration process, the buyer provides personal information and credit card information that are stored by the promotional server 505. The buyer's personal information is selectively used by the promotional server 505 to: register products subsequently purchased by the buyer with the associated manufacturer; inform the buyer about product recalls, etc.; selectively forward promotional material to the buyer via email; selectively enhance the value of promotional offer postings to specific buyers or to specific category of buyers; etc.

In general, the promotional server 505 employs several different processes to participate in the consummation of online sales, depending upon the nature of integration of the services offered by the promotional server 505 with the services offered by other online sales systems such as the non-seller web servers 513, affiliated seller's web and application server 517 and third-party seller's web and application server 521. The specific process employed by the promotional server 505 also determines the approach by which a buyer redeems the amount associated with a coupon or rebate. For example, in one embodiment, if the buyer consummates an online purchase at the affiliated seller's web and application server 517, the promotional server 505: reimburses the affiliated seller's web and application server 517 or its associated merchant account, either immediately or in deferred mode, for the amount of the coupon or rebate exercised by the buyer towards the buyer's purchase; conducts transactions with the issuer(s) of the coupon(s) or rebate(s), in real time or in deferred mode, to redeem the amount of the associated coupons or rebates; selectively charges the issuers (such as manufacturers providing rebates) for services rendered (such as those rendered during the buyer's transactions); selectively registers products with associated manufacturers for tech support and warranty purposes; and selectively updates buyer's profile, if necessary, with the purchase related information.

The affiliated seller's web and application server 517 is more tightly integrated with the promotional server 505 than is the third-party seller's web and application server 521. This makes it possible for the promotional server 505 to interact in more than one way with the affiliated seller's web and application server 517 in completing a buyer's online purchases. For example, in one embodiment, the affiliated seller's web and application server 517 charges the buyer only for the actual purchase price taking into account any and all rebates or coupons that may apply towards the buyer's purchases, and in turn conducts a transaction with the promotional server 505 to recover the amount of coupon or rebate that is not charged to the customer. The promotional server later interacts with one or more associated issuer to recover the cost of the coupons or rebates redeemed by the buyer. Such interaction is selectively conducted in online interactive mode with issuers or in a batch or deferred mode.

In another embodiment, the affiliated seller's web and application server 517 charges the buyer only for the actual purchase price taking into account any and all rebates or coupons that may apply towards the buyer's purchases and recover such amounts associated with the applied coupons and rebates later from the promotional server 505 by billing the promotional server for those amounts. In a variant of this approach, the affiliated seller's web and application server 517 informs the promotional server 505 of all rebates and coupons redeemed by its online buyers and the promotional server 505 deposits money, such as via electronic fund transfers, to any bank account associated or managed by the affiliated seller's web and application server 517.

In another embodiment, the affiliated seller's web and application server 517 retrieves a registered user's profile from the promotional server to present the buyer, using the buyer's web client 539, with a set of coupons and rebates tailored to the buyer's interest based on the buyer's profile.

The non-seller web server 513 typically carries promotional offer posting 515 that typically provide a vector to associated web pages hosted by the promotional server 505. By activating the promotional offer posting 515 on web pages provided by the non-seller web server 513, the buyer can migrate to online sales related web pages provided by the promotional server 505 and purchase associated products, while also availing of rebates and/or coupons associated with the purchased product(s). In completing the online sales transaction with the buyer, the promotional server 505: prompts the buyer for credit-card information and shipping information if the buyer is not a registered buyer; retrieves coupon or rebate amount for the product(s) selected by buyer; applies all coupons and rebates retrieved for the purchased products; selectively interacts with a credit card processing service 531 or credit card company 529 in order to process buyer's credit card information; selectively interacts with the issuer of associated promotional offer posting to inform issuer of sales related information; and selectively interacts with the issuer to charge the issuer for services provided during the sale.

The third-party seller's web and application server 521, although not as integrated with the services provided by the promotional server 505 as the affiliated seller's web and application server 517, interacts with the promotional server 505 to inform the promotional server details of the buyer's online purchases, such as the identification and quantity of the products purchased by the buyer along with buyer information such as the buyer's address or bank account, while charging the buyer for the full amount for the products purchased without immediately applying the coupons and rebates, if any. The promotional server 505 later sends a check to the buyer via post or transfers money to the buyer's bank account or credit card account if such buyer information is provided by the third-party seller's web and application server 521.

In one embodiment, the interaction between the promotional server 505 and the issuer's is in real time. Such interaction is typically facilitated by integration software on the issuer's system 525. The promotional server 505 conducts transactions with the integration software on the issuer's system 525 to send information on redeemed coupons and/or rebates to the issuer and to achieve reimbursement for coupons and rebates honored by the promotional server 505.

In another embodiment, the promotional server 505 communicates a list of coupons and rebates honored by buyers to one or more issuer's and the issuer's, in turn, transfer reimbursements associated with those redeemed coupons and rebates to the promotional server 505. Such reimbursements may be conducted employing money transfer into an established bank account or by other means such as electronic fund transfer, checks, etc. The communication between the promotional server 505 and the issuer's systems, such as the integration software on the issuer's system 525 or the issuer's direct application interface 527, regarding redeemed coupons and rebates may be conducted in interactive mode in real time, in non-interactive mode in real time, in batch mode in deferred mode, batch mode in real-time, etc.

In one embodiment, a buyer, using the buyer's web client 541, interacts with the third-party seller's web and application server 521 to conduct online purchases. The third-party seller's web and application server 521 charges the buyer the full amount on the purchased products including the amount on the rebates and coupons, if any rebate or coupon are associated with the purchased products, but displays the amount of coupons and/or rebates that will be reimbursed to them. Such charges are made to the credit card account provided by the buyer to the third-party seller's web and application server 521. The third-party seller's web and application server 521 then interacts with the promotional server 505 to communicate details of the online purchases made by the buyer and buyer information, including the buyer's credit card account information. The promotional server 505 then reimburses the buyer the total of all the coupons and/or rebates that apply to the buyer's purchases by conducting a transaction with the credit card processing service 531 or the credit card company/companies 529. Such reimbursement transactions with the credit card processing service 531 or the credit card company companies 529 are selectively conducted in real-time or in deferred mode after batching one or more buyer redemptions.

In one embodiment, the third-party seller's web and application server 521 does not provide any indication of the completion of a buyer's online purchase to the promotional server 505. Instead, the promotional server 505 determines the completion of online purchase by the buyer from the third-party seller's web and application server 521 and determines the buyer information details and details of products purchased from sales completion document made available to the buyer from the third-party seller's web and application server 521. Such sales completion document may be an online purchase order provided to the buyer, or an online order tracking web page presented to the buyer. Other mechanisms for determining purchase order completion may be employed by the promotional server to determine the completion of online purchases by the buyer.

In one embodiment, manufacturers selectively use the promotional server as a mechanism for providing up-sell information to buyers when buyers, using buyer's web client 537, 539, 541, access promotional offer posting 515, 519, 523 located at non-seller web servers 513, affiliated seller's web and application server 517 and third-party seller's web and application server 521, respectively.

In another embodiment of the present invention, when a buyer, using one of buyer's web clients 537, 539, 541, accesses a specific promotional offer posting such as a coupon or rebate presented by the non-seller web servers 513, the affiliated seller's web and application server 517 or the third-party seller's web and application server 521, respectively, the buyer is presented with a list of promotional material for other products that the buyer is deemed to be interested in by the promotional server 505. Such a list of promotional material may include: promotional materials for other similar products by the same manufacturer; promotional materials that belong to the same category of products as the one the buyer initially evinced interest in; promotional materials for only those products that the associated manufacturer considers relevant to the buyer; promotional material for all competing or associated products from the same or different manufacturers; or promotional material determined to be useful to the buyer by the individual web servers 513, 517, 521.

In one embodiment, the buyer, using the affiliated seller's web and application server 517, the buyer can assemble a shopping cart of products that is presented and maintained by the affiliated seller's web and application server 517. The buyer can then request the affiliated seller's web and application server 517 to extract all applicable coupons and rebates to the shopping cart. The affiliated seller's web and application server 517 interacts with the promotional server 505 to extract all applicable coupons and rebates for the buyer's shopping cart. It then applies the extracted coupons and rebates to the shopping cart.

In another embodiment, the buyer, using the buyer's web client 537, assembles a shopping cart with online products at a different online sales web server than the affiliated seller's web and application server 517 and then transfers the shopping cart to the promotional server 505 to extract all applicable coupons and rebates. The transfer of the shopping cart by the buyer to the promotional server 505 is implemented in one of several ways: by the transfer of an XML file to the promotional server 505 via an HTTP connection to the promotional server 505; by uploading shopping cart information stored in a file or in memory at the client computer to the promotional server 505 via upload web pages provided by the promotional server; by sending a shopping cart in an email to the promotional server, the shopping cart represented as an XML document or as some other structured document; or by other common techniques to transfer a shopping cart to the promotional server 505. A buyer may choose to retrieve applicable coupons and rebates based on their current shopping cart contents by interacting with the promotional server 505 via the affiliated seller's web and application server 517 or via the third-party seller's web and application server 521. In both cases, the promotional server facilitates the automatic redemption of rebates and coupons that can apply towards the buyer's online purchases. In some embodiments, the buyer is unaware of the promotional server 505 and presumes the automatic redemption of rebates and coupons to be provided by the web server that the buyer conducts his purchases from.

In a multi-functional embodiment of FIG. 5, the promotional server 505 supports multiple processing approaches for facilitating promotion redemption. When a buyer attempts to purchase a good or service on a third-party seller's web and application server 521, the third-party seller's web and application server 521 receives full payment for the good or service offered. If the buyer's account supports charge-back, then the promotional server 505 will charge-back the promotional amount to the buyer's account after the buyer has completed the purchase for the entire sales price. Otherwise, the promotional server 505 will pay the third-party seller's web and application server 521 the full sales price itself and charge the buyer's account for the sales price less the promotional amount. In either case, the promotional server 505 will charge the issuer's account for the promotional amount.

Service charges can be applied to the issuer, or the issuer's account, buyer's account, and/or to the third-party seller's web and application server 521. Such surcharge (service charges) can be used to collect value for services rendered by the promotional server 505. In addition, the issuer and/or the buyer may pay more than the promotional amount and/or sales price less the promotional amount, respectively, as an incentive to the buyer and/or the seller.

In such interaction, the third-party seller's web and application server 521 need not be aware of the issuer's promotion amount. Even if aware, the third-party seller's web and application server 521 need not account for the promotion amount of the issuer in the offering price of the item. In either case, however, the promotional server 505 identifies when the transaction for the promoted item has been completed.

Similarly, a buyer interacts through the promotional server 505 and the affiliated seller's web and application server 517 to purchase a good and exercise a promotion. This is accomplished by making two account transactions with the affiliated seller's web and application server 517. Specifically, the buyer's account is used to pay the sales price less the promotion amount, while the issuer's account is used to pay the promotion amount.

The promotional server 505 also supports full payment of the sales price of an item by the issuer's account. When so charged, the promotional server 505 will assist in the payment from the buyer's account to the issuer for the purchase price less the promotion amount. Of course, surcharges and incentives might also be applied in such transactions.

The buyer's account may comprise an account such as a credit card or bank account that is independent of the promotional server. Alternatively, the buyer's account may be a credit or deposit account managed directly by the promotional server. Similarly, the issuer's account might be a credit or deposit account managed directly by the promotional server. Promotional server may bill an issuer and/or buyer's account on a monthly basis or charge the issuer and/or buyer's account immediately.

The promotional server 505 can perform credit or account processing directly through the processing service 531 or allow such processing to be performed by the servers 517 and 521 via the corresponding services 533 and 535.

In another embodiment the promotional server 505 constructs a promotional offer posting 507 from a plurality of issuers of promotions and corresponding sales information retrieved from a seller or the seller's web and application server. A buyer browses (by category) or searches the sales information in the promotional offer posting 507 to identify an item for purchasing. Upon receiving a purchase request for such item from the buyer, the promotional server 505 charges the buyer's account for the sales price less the promotional amount, then uses the promotional server's account (which may be set up by the issuer or through contributions from the issuer, for example) to pay the full sales price directly to the seller. Although, tighter integration may be used, the promotional server 505 need only deliver its account information, buyer's shipping information and the sales item(s) information to the non-integrated seller's online sales system. The seller's system need not distinguish this interaction with traditional online sales interaction with a buyer without promotions.

Figure 6:
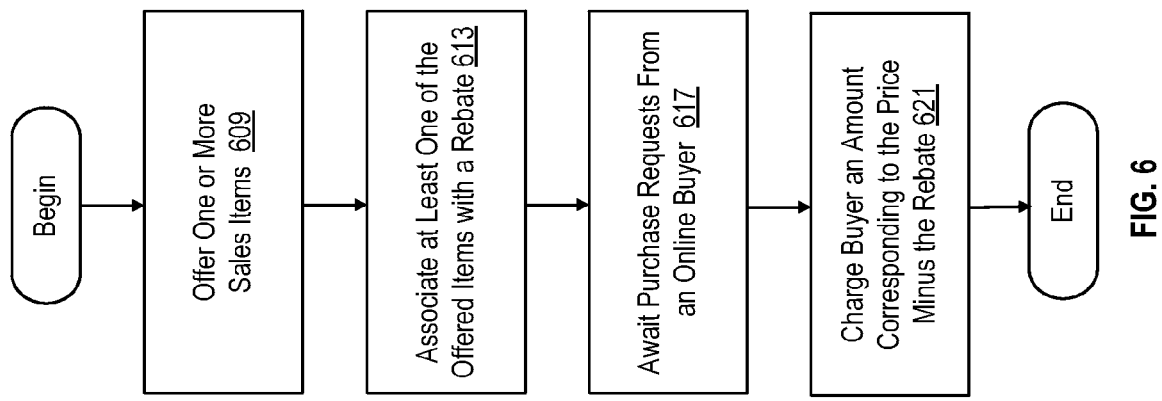
FIG. 6 is a flow diagram illustrating rebate processing functionality of one embodiment of the present invention.

FIG. 6 is a flow diagram illustrating rebate processing functionality of one embodiment of the present invention. Specifically, at a block 609, a seller offers an item online for sale at a sales price amount. At a block 613, a manufacturer's rebate having a rebate amount is associated with the item. A purchase request from a buyer for the item being offered online is received at a block 617. In response, at a block 621, a buyer is required to pay a purchase amount corresponding to the sales price amount less the rebate amount for the item.

Of course, there are many variations and further processing functionality that may be applied to this process. For example, the purchase amount may comprise the sales price amount less the rebate amount, and may further comprise a service charge amount. The purchase amount may also comprise an amount lower than the sales price amount, and greater than the sales price amount less the rebate amount.

The manufacturer may also control the rebate. This may involve adjusting a rebate parameter or canceling the rebate. Rebate parameters may include, for example, a rebate amount, quantity of rebates offered, rebate offering time frame, rebate terms and conditions, goods or services associated with the rebate, particular sellers to which the rebate applies, manufacturer and/or distributors involved, the issuer, automatic thresholds and conditions under which other rebate parameters will change, passwords and other account information regarding the issuer or other parties involved, etc.

In certain embodiments, associated with the block 621, the purchase amount is electronically collected by the seller. The purchase amount may comprise the sales price amount less the rebate amount plus a service charge amount. Similarly, the manufacturer may be electronically charged at least the rebate amount, which may consist of the rebate amount plus a service charge amount. At least a portion of the service charge amount, if not all, may be distributed to the seller. Similarly, at least a portion of the service charge amount, if not all, may be distributed to a promotional system for services rendered.

An account of the buyer is charged the purchase amount in the block 621, in some embodiments. At least a portion of the charged amount may be directly delivering to the seller. In such configurations, the charging may be performed via a promotional system. Alternatively, the buyer's account may be charged an amount corresponding to the sales price amount and credited an amount corresponding to the rebate amount. The purchase amount may include a service charge amount that is also charged to the buyer's account. In various embodiments, the buyer interacts online to cause payment to the seller of the sales price amount less the rebate amount, and the manufacturer electronically pays the rebate amount to the seller. A manufacturer's account may be used for paying at least the rebate amount. The manufacturer's account may be established in association with a promotional system or independently. Such payments may be performed directly or via a promotional system.

In Internet applications, a web server may be used to deliver the manufacturer's rebate to a browser of the buyer. The manufacturer's rebate may comprise one of a plurality of manufacturer's rebates delivered by the web server. The web server may operate as at least a part of a promotional system, a seller's system, an affiliate's system or a third party's system. In any case, the system may comprise a rebate system offering or supporting only promotional items for sale.

Other extensions of the present invention involve the selection of a potential buyer and delivering a manufacturer's rebate to the selected buyer. Among other traditional delivery infrastructures, delivery may be performed via email. Selection of the potential buyer may be based on the previous purchase history of the selected buyer and/or registration information. The manufacturer through human interaction may make such selection with information regarding each potential buyer, or automatically pursuant to a manufacturer's defined set of filtering criteria. More than one manufacturer's rebate may be sent to the selected buyer.

The present invention also supports shopping cart interaction. Shopping carts, or logical equivalents thereof, may contain the item for sale and at least one other item for sale. The promotional system may identify the item in the shopping cart. After identifying the sales item, the purchase request may be responded to.

A visual rebate element may be displayed for a buyer. The element will typically contain at least one of the plurality of rebate parameters. The visual rebate element can be involved in the association of the rebate with the item for sale. Third party systems may offer for a buyer's selection one or more visual rebate elements. The elements may also direct the buyer to an item for sale on a sales system of the seller. Visual rebate elements can be banner ads or other advertisements, for example. Visual rebate elements may also direct the buyer to other of the plurality of rebate parameters.

In some implementations, the seller will not fulfill a purchase request without receiving an amount corresponding to the purchase amount and the rebate amount. The language "corresponding to" (as used herein and throughout the application) attempts to clarify that any such amount need not be exact. For example, a seller may fulfill the purchase request by receiving the purchase amount plus the rebate amount but less or plus a surcharge (e.g., for service rendered). Such surcharge may be applied through the payment of the purchase amount, the rebate amount, both the purchase and the rebate amounts, or along with both amounts if the charges are paid to the seller in one transaction, etc. Therefore, the use of the language "corresponding to" anticipates that the exact amounts need not be paid to accomplish the payment purpose.

Figure 7:
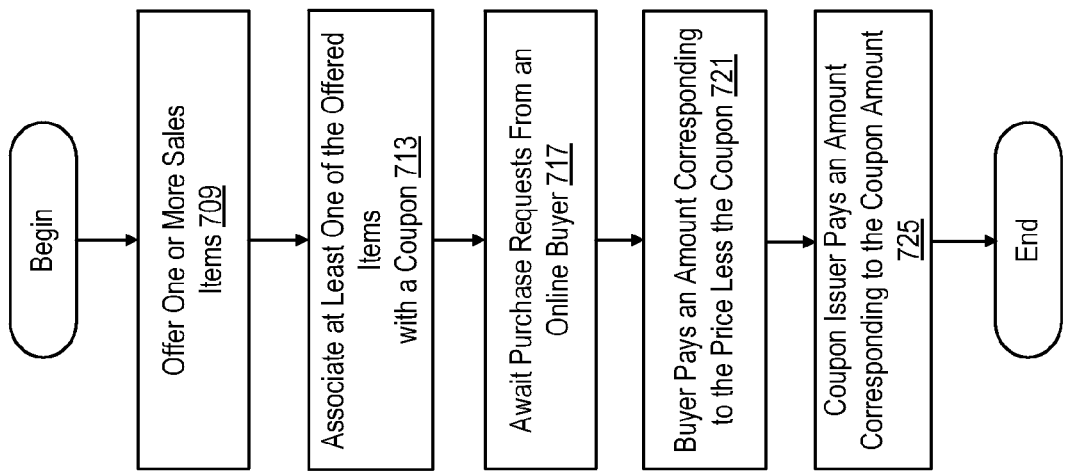
FIG. 7 is a flow diagram illustrating coupon processing functionality of another embodiment of the present invention.

FIG. 7 is a flow diagram illustrating coupon processing functionality of another embodiment of the present invention. Such processing may operate independently of rebate processing or may operate together in a single system along with other promotional functionality. At a block 709, a first party, such as a seller, offers one or more items online for sale, each item having a sales price amount. A coupon of a second party is associated with at least one of the sales items at a block 713. A purchase request from a buyer for the item being offered online is received at a block 717. In response, a buyer is required to pay a purchase amount corresponding to the sales price amount less the coupon amount for the item, at a block 721. At a block 725, the second party electronically pays to the first party an amount corresponding to the coupon amount.

As with the rebate processing functionality, there are many variations and further functionality that may be applied to such coupon processing. In fact, the aforementioned variations and further functionality of the rebate processing described with reference to FIG. 6 can be applied to the coupon embodiment of FIG. 7. For example, the purchase amount may comprise the sales price amount less the rebate amount and include a service charge amount, either party may control the coupon and coupon parameters (which parallel that of rebates), payments of the purchase amount and coupon amounts may be electronically made to the first party, buyer and third party accounts may be used, etc. Similarly, in Internet applications, a web server may be used to deliver a coupon from one or more coupons stored on the web server to a buyer's browser. The web server may operate as at least a part of a promotional system, a first party's system, a second party's system, an affiliate's system or a third party's system. In any case, the system may comprise a system supporting coupon processing alone or in combination with other promotional activities such as rebates. Many other extensions of the present invention as applied to coupon processing can be found above in relation to the processing of rebates as described above with reference to FIG. 6.

Figure 8:
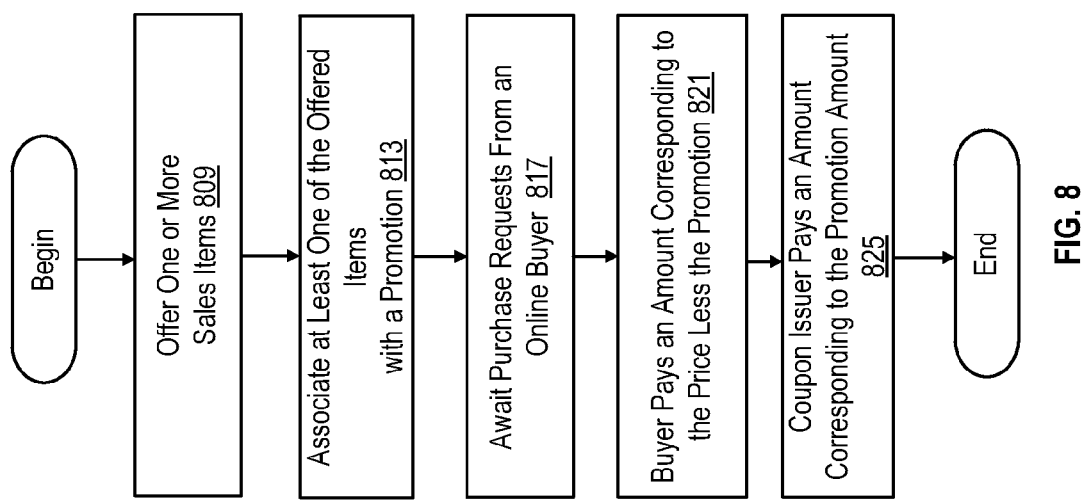
FIG. 8 is a flow diagram illustrating the application of various aspects of the present invention to any promotional processing functionality including that of rebate and coupon processing.

FIG. 8 is a flow diagram illustrating the application of various aspects of the present invention to any promotional processing functionality including that of rebate and coupon processing. Generally, at a block 809, a first party, such as a seller, offers one or more items online for sale, each item having a sales price amount. A promotion of a second party is associated with at least one of the sales items at a block 813. A purchase request from a buyer for the item being offered online is received at a block 817. In response, a buyer is required to pay a purchase amount corresponding to the sales price amount less the promotion amount for the item, at a block 821. At a block 825, the second party electronically pays to the first party an amount corresponding to the promotion amount. Then, at a block 825, the first party fulfills the purchase request after receiving an amount corresponding to the purchase amount and the payment amount.

As with the rebate and coupon systems (which constitute promotional systems) described in reference to FIGS. 6 and 7, respectively the aforementioned variations and further functionality can be applied to the general case promotional embodiment of FIG. 8.

Figure 9:
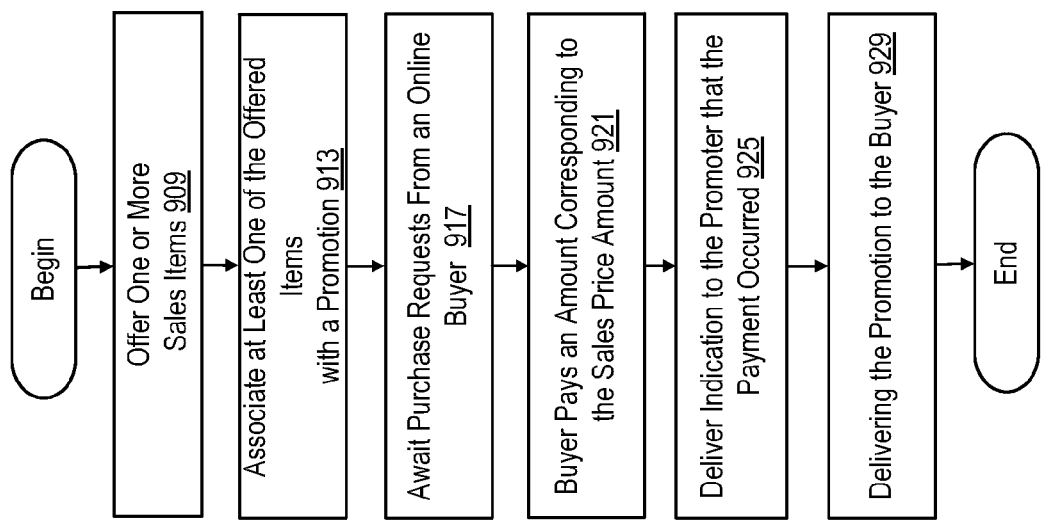
FIG. 9 is a flow diagram illustrating the application of various aspects of the present invention to any promotional processing wherein the promotion may involve more than a discount off a purchase price.

FIG. 9 is a flow diagram illustrating the application of various aspects of the present invention to any promotional processing wherein the promotion may involve more than a discount off a purchase price. In particular, at a block 909, a first party (a "promoter") offers one or more items online for sale. A promotion of a second party is associated with at least one of the sales items at a block 913. A purchase request from a buyer for the item being offered online is received at a block 917. In response, a buyer is required to pay a purchase amount corresponding to the sales price amount for the item, at a block 921. Thereafter, at a block 925, the first party receives an indication that the payment occurred. At a block 929, the first party delivers the promotion value to the buyer.

In some embodiments, the delivery of the promotion value will only occur after at least one promotion condition has been met. For example, the promotion condition may require that several of the items offered for sale is purchased; and/or such items are purchased simultaneously or within a fixed time period. Many other types of promotion conditions may be applied which parallel traditional promotional techniques.

Nearly all of the aforementioned variations and further functionality described with reference to FIGS. 6-8 applies to the present embodiment illustrated in FIG. 9. Further, the functionality of FIGS. 6-9 may be combined into a single system to support all types of promotions with both price discounting and non-price value offerings.

With reference to the above-described figures, a method of processing a manufacturer's rebate may comprise, for example, the following. A manufacturer associates a rebate with an item, where the rebate has a rebate amount. A seller offers the item online for sale at a sales price amount that does not account for the rebate of the manufacturer. A purchase request for the item being offered online is received from a buyer. The purchase request is then responded to by requiring the buyer to only pay a purchase amount corresponding to the sales price amount less the rebate amount for the item.

The purchase amount may be, for example, the sales price amount less the rebate amount. In addition, the purchase amount may also include a service charge amount. The purchase amount may alternatively be, for example, an amount lower than the sales price amount, but greater than the sales price amount less the rebate amount.

In one embodiment, the manufacturer may control the rebate. For example, the rebate amount or a parameter of the rebate may be adjusted, or the rebate may be disassociated from the item for sale altogether.

The seller may also electronically collect the purchase amount, which again may be, for example, the sales price amount less the rebate amount plus a service charge amount.

In addition, the manufacturer may be electronically charged at least the rebate amount, which may comprise, for example, the rebate amount plus a service charge amount. A portion of the service charge amount may further be provided to the seller. Also, at least a portion of the service charge amount may be provided for services rendered by a promotion system.

In one embodiment, an account of the buyer is charged for the purchase amount. In this case, at least a portion of the charged amount may also be provided to the seller. The charging of the buyer's account may be performed, for example, via a promotion system.

When the buyer's account is charged an amount corresponding to the sales price amount less the rebate amount, the account may also be credited for an amount corresponding to the rebate amount. In addition, when the purchase amount includes a service charge amount, the buyer's account may additionally be charged for the service charge amount.

In one embodiment, the buyer may interact online to cause payment to the seller of an amount corresponding to the sales price amount less the rebate amount. The manufacturer may then electronically pay the rebate amount to the seller. Such paying may be performed directly or via a promotional system.

In one embodiment, an account may be established for the manufacturer for paying at least the rebate amount. Such payment may be assisted by a promotion system. The account established for the manufacturer may be associated with the promotional system or be independent of the promotion system.

The method may also comprise delivering, by a web server, the rebate to a browser of the buyer. Such rebate may be one of a plurality of rebates delivered by the web server. The web server may be that of a promotion system or a system of the seller. When it is a system of the seller, the system may be an affiliate system, a non-seller system or a rebate system offering only promotional items for sale. In fact, in either case, the system may be a rebate type system offering only promotional items.

The method may also comprise selecting a potential buyer, and delivering the rebate to the selected buyer. Such delivery may be performed, for example, via email. The selection may be, for example, based on a previous purchase history of the selected buyer or on a registration of the selected buyer. The manufacturer, for example, may perform the selection.

The method may further comprise delivering the rebate to a selected buyer with at least one other of the manufacturer's rebates. Also, a shopping cart containing the item for sale and at least one other item for sale may be constructed. A promotion system, for example, may identify the item in the shopping cart, and the response to the purchase request occurs after the item is identified.

In one embodiment, the rebate comprises a plurality of rebate parameters. At least one of the plurality of rebate parameters may be displayed within a visual rebate element. At least a portion of the associating by the manufacturer of the rebate with the item may involve the visual rebate element. A buyer may then select the visual rebate element provided by a third party system (e.g., promotional system). The buyer may then be directed to the item on a sales system of the seller. In addition, the buyer may be directed to at least one of the plurality of rebate parameters. The visual rebate element, may be, for example, a banner ad.

In one embodiment, the seller may wait to receive an amount corresponding to the purchase amount and the rebate amount before fulfilling the purchase request.

Alternatively, a method of processing a coupon may comprise, for example, the following. A first party offers an item online for sale at a sales price amount. A coupon of a second party is associated with the item, the coupon having a coupon amount. A purchase request is received from a buyer for the item being offered online. The purchase request is responded to by requiring the buyer to pay a purchase amount corresponding to the sales price amount less the coupon amount for the item. And the second party electronically pays a payment amount corresponding to the coupon amount to the first party.

The purchase amount may be, for example, the sales price amount less the coupon amount. In addition, the purchase amount may also include a service charge amount. The purchase amount may alternatively be, for example, an amount lower than the sales price amount, but greater than the sales price amount less the coupon amount.

In one embodiment, the second party may control the coupon. For example, the coupon amount or a parameter of the coupon may be adjusted, or the coupon may be cancelled altogether.

The first party may also electronically collect the purchase amount, which again may be, for example, the sales price amount less the coupon amount plus a service charge amount.

In addition, the second party may be electronically charged at least the coupon amount, which may comprise, for example, the coupon amount plus a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. The charging of the buyer's account may be performed, for example, via a promotion system.

When the buyer's account is charged an amount corresponding to the sales price amount less the coupon amount, the account may also be credited for an amount corresponding to the coupon amount. In addition, when the purchase amount includes a service charge amount, the buyer's account may additionally be charged for the service charge amount.

In one embodiment, the buyer may interact online to cause payment to the first party of an amount corresponding to the sales price amount less the coupon amount. The second party may then electronically pay the rebate amount to the first party. Such paying may be performed directly or via a promotion system.

In one embodiment, an account may be established for the second party for paying at least the coupon amount. Such payment may be assisted by a promotion system. The account established for the second party may be associated with the promotion system or be independent of the promotion system.

The method may also comprise delivering, by a web server, the coupon to a browser of the buyer. Such coupon may be one of a plurality of coupons delivered by the web server. The web server may be that of a promotion system or a system of the first party. When it is a system of the first party, the system may be an affiliate system, a non-seller system or a coupon system offering only promotional items for sale. In fact, in either case, the system may be a coupon type system offering only promotional items.

The method may also comprise selecting a potential buyer, and delivering the coupon to the selected buyer. Such delivery may be performed, for example, via email. The selection may be, for example, based on a previous purchase history of the selected buyer or on a registration of the selected buyer. The second party, for example, may perform the selection.

The method may further comprise delivering the coupon to a selected buyer with at least one other of the second party's coupons. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of coupon parameters. At least one of the plurality of coupon parameters may be displayed within a visual coupon element. At least a portion of the associating by the second party of the coupon with the item may involve the visual coupon element. A buyer may then select the visual coupon element provided by a third party system (e.g., promotional system). The buyer may then be directed to the item on a sales system of the first party. In addition, the buyer may be directed to at least one of the plurality of coupon parameters. The visual coupon element, may be, for example, a banner ad.

In one embodiment, the first party may wait to receive an amount corresponding to the purchase amount and the coupon amount before fulfilling the purchase request.

The method may alternatively comprise, for example, the following. A first party offers an item online for sale at a sales price amount. A promotion of a second party is associated with the item, the promotion having a promotion amount. A purchase request is received from a buyer for the item being offered online. The purchase request is responded to by requiring the buyer to pay a purchase amount corresponding to the sales price amount less the promotion amount for the item. The second party electronically pays a payment amount corresponding to the promotion amount to the first party. And the first party receives an amount corresponding to the purchase amount and the payment amount before fulfilling the purchase request.

In one embodiment, the promotion is a rebate and in another the promotion is a coupon. The purchase amount may be, for example, the sales price amount less the coupon amount. In addition, the purchase amount may also include a service charge amount. The purchase amount may alternatively be, for example, an amount lower than the sales price amount, but greater than the sales price amount less the promotion amount.

In one embodiment, the second party may control the promotion. For example, the promotion amount or a parameter of the promotion may be adjusted, or the promotion may be cancelled altogether.

The first party may also electronically collect the purchase amount, which again may be, for example, the sales price amount less the promotion amount plus a service charge amount. In other words, the first party may receive payment (e.g., the sales price amount less the promotion amount) electronically.

In addition, the second party may be electronically charged at least the promotion amount, which may comprise, for example, the promotion amount plus a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. The charging of the buyer's account may be performed, for example, via a promotion system.

When the buyer's account is charged an amount corresponding to the sales price amount less the promotion amount, the account may also be credited for an amount corresponding to the promotion amount. In addition, when the purchase amount includes a service charge amount, the buyer's account may additionally be charged for the service charge amount.

In one embodiment, the buyer may interact online to cause payment to the first party of an amount corresponding to the sales price amount less the promotion amount. The second party may then electronically pay the promotion amount to the first party. Such paying may be performed directly or via a promotion system.

In one embodiment, an account may be established for the second party for paying at least the promotion amount. Such payment may be assisted by a promotion system. The account established for the second party may be associated with the promotion system or be independent of the promotion system.

The method may also comprise delivering, by a web server, the promotion to a browser of the buyer. Such promotion may be one of a plurality of promotions delivered by the web server. The web server may be that of a promotional system or a system of the first party. When it is a system of the first party, the system may be an affiliate system, a non-seller system or a promotion system offering only promotional items for sale. In fact, in either case, the system may be a promotion type system offering only promotional items.

The method may also comprise selecting a potential buyer, and delivering the promotion to the selected buyer. Such delivery may be performed, for example, via email. The selection may be, for example, based on a previous purchase history of the selected buyer or on a registration of the selected buyer. The second party, for example, may perform the selection.

The method may further comprise delivering the promotion to a selected buyer with at least one other of the second party's promotions. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of promotion parameters. At least one of the plurality of promotion parameters may be displayed within a visual promotion element. At least a portion of the associating by the second party of the promotion with the item may involve the visual promotion element. A buyer may then select the visual promotion element provided by a third party system (e.g., promotion system). The buyer may then be directed to the item on a sales system of the first party. In addition, the buyer may be directed to at least one of the plurality of promotion parameters. The visual promotion element, may be, for example, a banner ad.

Another method of processing a promotion may comprise the following. A promotion of a second party is associated with an item, the promotion having a promotion value. A first party offers the item online for sale at a sales price amount without advertising the promotion of the second party. A purchase request is received from a buyer for the item being offered online. The purchase request is responded to by requiring the buyer to pay a purchase amount corresponding to the sales price amount. The buyer's payment is responded to by electronically communicating an indication of the buyer's payment to the second party. And the second party delivers the promotion value to the buyer after receiving the indication of the buyer's payment.

In one embodiment, the second party is a promotion system, which may or may not be managed by a third party. The purchase amount may be, for example, the sales price amount. In addition, the purchase amount may also include a service charge amount.

In one embodiment, the second party may control the promotion. For example, the promotion value or a parameter of the promotion may be adjusted, or the promotion may be cancelled altogether.

The promotion value may, for example, be delivered electronically. In addition, the second party may be electronically charged a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. In the case where the purchase amount includes a service charge amount, the buyer's account may additionally be charged for the service charge amount. The charging of the buyer's account may be performed, for example, via a promotion system.

In one embodiment, the buyer may interact online to cause payment to the first party of an amount corresponding to the sales price amount. Such paying may be performed directly or via a promotion system. The delivering of the promotion value may also be assisted by a promotion system.

The method may also comprise delivering, by a web server, the promotion to a browser of the buyer. Such promotion may be one of a plurality of promotions delivered by the web server. The web server may be that of a promotion system or a system of the first party. When it is a system of the first party, the system may be an affiliate system, a non-seller system or a promotion system offering only promotional items for sale. In fact, in either case, the system may be a promotion type system offering only promotional items.

The method may also comprise selecting a potential buyer, and delivering the promotion to the selected buyer. Such delivery may be performed, for example, via email. The selection may be, for example, based on a previous purchase history of the selected buyer or on a registration of the selected buyer. The second party, for example, may perform the selection.

The method may further comprise delivering the promotion to a selected buyer with at least one other of the second party's promotions. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of promotion parameters. At least one of the plurality of promotion parameters may be displayed within a visual promotion element. At least a portion of the associating by the second party of the promotion with the item may involve the visual promotion element. A buyer may then select the visual promotion element provided by a third party system (e.g., promotional system). The buyer may then be directed to the item on a sales system of the first party. In addition, the buyer may be directed to at least one of the plurality of promotion parameters. The visual promotion element, may be, for example, a banner ad.

The method may alternatively comprise the following. An item is offered for sale on a first online system of a seller, where the first online system requires payment of a sales price amount for the item. A promotion having a promotion amount is associated with the item. A purchase request is received from a buyer for the item being offered online. The buyer is required to pay a purchase amount corresponding to the sales price amount less the promotion amount for the item. A second online system electronically facilitates payment, through communicative coupling with the first online system, of a payment amount corresponding to the promotion amount. And the seller receives an amount corresponding to the purchase amount and the payment amount.

In one embodiment the promotion is a rebate and in another the promotion is a coupon. The purchase amount may be, for example, the sales price amount less the promotion amount. In addition, the purchase amount may further include a service charge amount.

The facilitation mentioned above may be achieved by the gathering of sales transaction information from the first online system. Such facilitation may further include the automatic generation of an invoice corresponding to the sales transaction information gathered.

Facilitation may also be achieved by the payment of an amount corresponding to the promotion amount. Facilitation in this case may further include the automatic generation of an invoice corresponding to the promotion amount. In addition, it may include the automatic generation of an offsetting accounting entry corresponding to the promotion amount. Such offsetting accounting entry may be, for example, a debit entry or a credit entry.

The method may also permit control of the promotion via the second online system. In this case a service charge may also be assessed for services rendered by the second online system.

Figure 10:
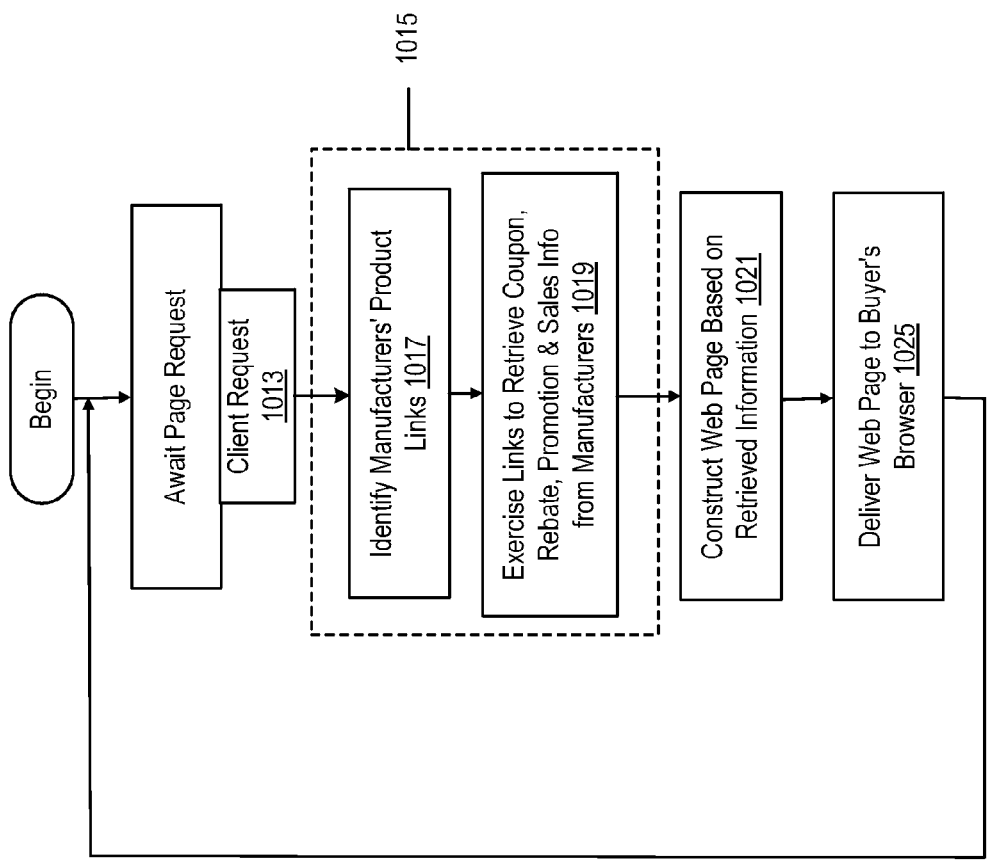
FIG. 10 is a flow diagram illustrating the exemplary operation of a retail product or service sales server with a client and with a plurality of manufacturer servers to support a promotion such as a rebate or coupon.

FIG. 10 is a flow diagram illustrating the exemplary operation of a retail product or service sales server with a client and with a plurality of manufacturer servers to support a promotion such as a rebate or coupon. Specifically, a sales server waits for a client, typically through web-browser interaction, to request information about one or more products or services from one or more manufacturers, suppliers or service providers. In a real time mode of operation, when such a client request is received as indicated by the block 1013, the sales server responds by performing the operations within a block 1015.

In particular, the sales server identifies the servers of the manufacturers, suppliers and/or service providers (hereinafter "source servers") underlying the client request at a block 1017. Thereafter, at a block 1019, the sales server establishes secure communication with such source servers to retrieve promotion information, including terms and conditions for such promotions as "buy one item, get a different item for free," "buy 2 get one free," coupons, rebates, etc., along with related sales information, including, but not limited to pricing, inventory, images, descriptions, warranty information, licensing information, third party reviews, and links to further information.

In the real time mode of operation, the retrieval process within the block 1015 occurs upon receiving each client request. In a periodic mode of operation, the sales server only performs the functions of block 1015, for example, once every 24 hour period. Of course any period may be possible. In an aged mode of operation, the sales server performs the functions of the block 1015 only if the information underlying the client request has not been retrieved for a period of time. In other words, if a client request that occurred fifteen minutes earlier caused the retrieval of information from a source server, then such information need not be requested again by the source server at least for a predetermined duration of time, such as for six hours. Thus, for example, a single request from a client may cause the retrieval of locally stored information (recently retrieved) regarding some products or services along with remotely retrieved information regarding other products or services (from source servers) that have old information stored locally, with the old information being updated in the process.

Regardless of the mode of operation of the sales server, at a block 1021, the sales server uses the retrieved product and/or service information to construct a web page which is delivered to the client browser for viewing at a block 1023. Of course, such construction and delivery may take any other form. For example, the information may be constructed for printing, emailed, faxed, voice synthesized for telephone playback, etc. Many other construction and delivery mechanisms are well known and may be used.

Figure 11:
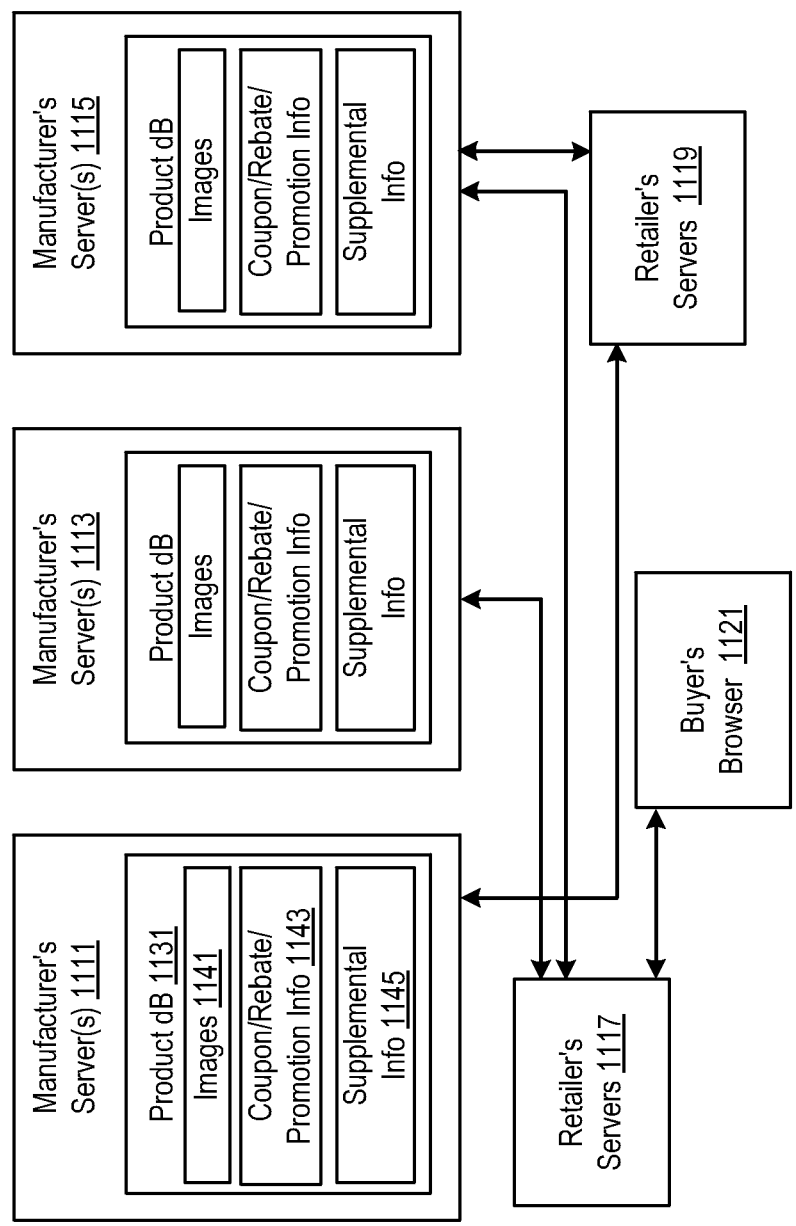
FIG. 11 is a schematic block diagram of exemplary system level interaction that illustrates the functionality described in relation to FIG. 10.

FIG. 11 is a schematic block diagram of exemplary system level interaction that illustrates the functionality described in relation to FIG. 10. A buyer (or client) accesses one of a plurality of sales servers; such as sales or retailer's servers 1117 and 1119, via Internet by sending a request for a web page or web page content through a buyer's browser 1121.

In response, the sales server 1117 (which may comprise one or more servers) will respond by constructing the web page or page content from product and/or service information underlying the buyer's request. As mentioned in reference to FIG. 10, the sales server 1117 may retrieve the required product and/or service information (hereinafter "sales information") from one or more of a plurality of source servers, such as source servers or manufacturer's servers 1111, 1113 and 1115, and/or from memory local to the sales server 1117. The specific timing of such retrieval of sales information depends entirely on the mode of operation in which the sales server is operating, as previously described.

To retrieve sales information, the sales server 1117 establishes a secure link with one or more of the source servers 1111, 1113 and 1115. Each sales server 1111 typically comprises, among other things, a product or services database 1131 which itself may contain images 1141, promotion information 1143, and other sales information 1145, for example. Thus, after receiving a request from the buyer via the buyer's browser 1121, the sales server 1117, if operating in the aged mode, will respond by first looking to local storage to determine whether the sales information underlying the request exist locally. For portions of the sales information that exists locally and is not too old, such information is used in the construction of a response to be sent to the buyer's browser 1121. For all portions of the sales information that is too old or does not exist locally, the sales server 1117 establishes secured links with one or more of the source servers 1111, 1113 and 1115 to retrieve such information. Similar operation for the other modes of operation is also possible.

Moreover, in some embodiments, the mode of operation of the sales server is defined by the sales information itself. For example, a buyer's request may require that two products from two different manufacturers be displayed in a single web page. The first product may require the aged mode of operation, while the second product may require a real time mode. Similarly, any portion of the sales information may define its own required mode. For example, general image information may operate under a periodic mode while the price or an associated promotion might require the real time mode for control purposes.

Fall back modes are also contemplated when the desired mode fails. For example, if a real time mode fails, the sales server may be authorized to resort to an aged or periodic mode of operation, so long as the conditions underlying conditions for use are met. Other variations such as modified or combined versions of the modes or fall back strategies identified above are also contemplated and will be apparent to one skilled in the art after considering such disclosed modes.

The secured communication from the sales servers to the source servers may occur through an ASP architecture. A variety of encryption and compression techniques can be used to provide secure and minimal bandwidth utilization between servers.

The source servers 1111, 1113 and 1115 are thus able to control and modify any of the sales content without worrying about the buyer basing a purchase on outdated data existing at the sales servers 1117 and 1119. For example, a coupon can be tracked by the source server 1111 for a product sold by the sales servers 1117 and 1119. Once a certain volume is reached, as counted through direct feedback from the sales servers 1117 and 1119 as sales occur, the source server 1111 can remove the coupon, ending this promotion. The source server 1111 can make this decision automatically based on a predetermined number or a number calculated based on current warehouse inventory, for example.

Figure 12:
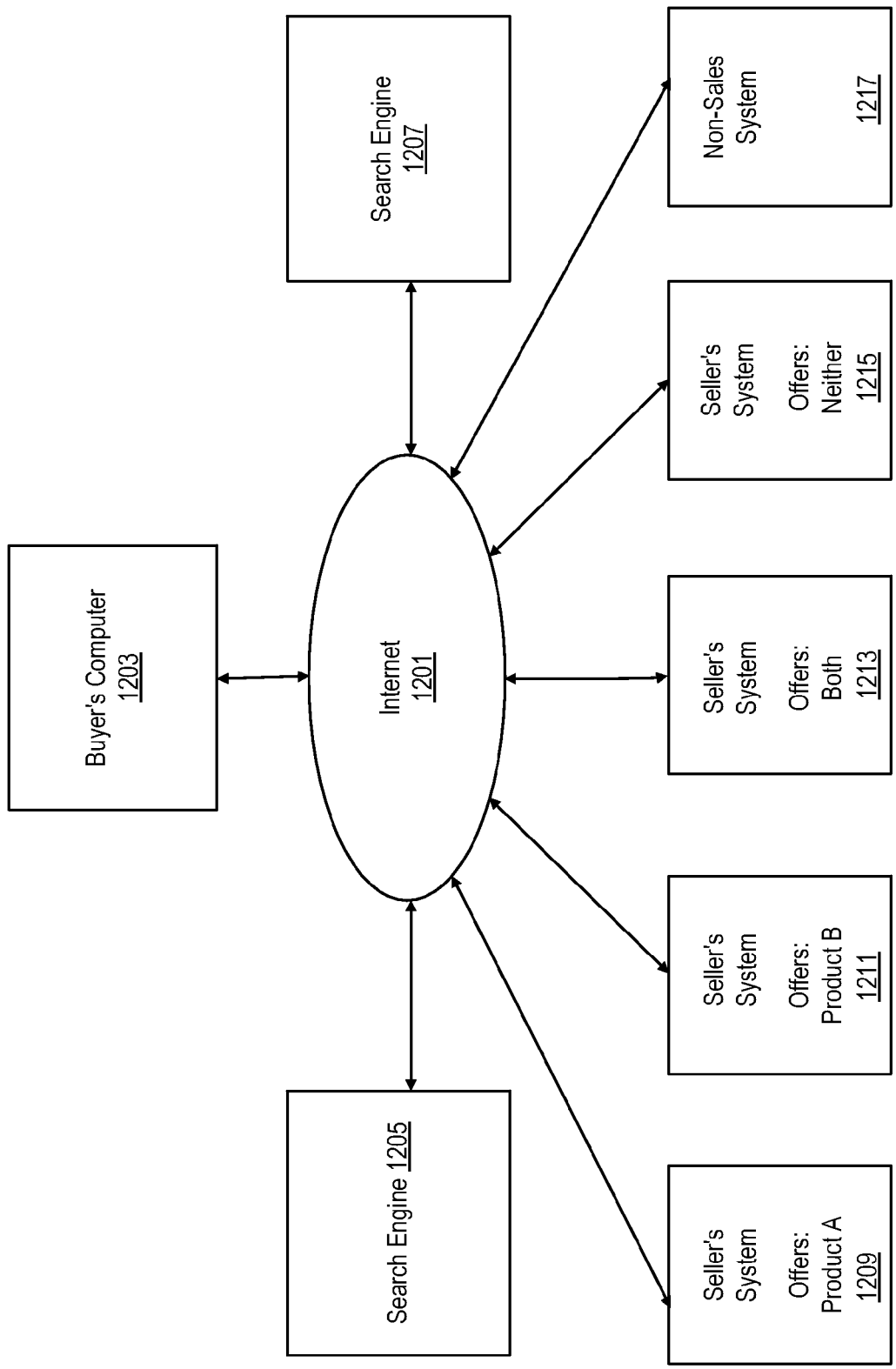
FIGS. 12-15 are diagrams illustrating buying and selling systems.

Referring to FIG. 12, when a Buyer (i.e., individuals or business entities, such as, for example, corporations, distributers, or retailers) desires to purchase several Products (i.e., goods or services) from a plurality of Sellers (i.e., manufacturers, distributers, or retailers) via the Internet 1201, the Buyer typically must first, via the Buyer's computer 1203, search for the Products and locate the various Sellers online using, for example, a listing site 1205 and/or search engine 1207. The search results may, for example, identify a Seller System 1209 that only sells a desired Product A, a Seller's System 1211 that only sells a desired Product B, a Seller's System 1213 that sells both desired Products, a Seller's System 1215 that sells neither of the desired Products and a Seller that maintains a Non-Sales System 1217. The Buyer, however, does not know which System identified will support the desired purchase until the Buyer undertakes the time-consuming process of accessing and navigating each of the identified Seller's Systems. The Buyer must then find the prices for the Products and select the Seller or Sellers from which to buy the Products. Often, during the selection process, the Buyer must access and re-access selected Seller's System(s) to compare the Products and their prices.

In other words, the Buyer is faced with the problem of identifying the type and model of the Products desired, the Seller(s) that carry them, and whether those Seller(s) support on-line purchases. In addition, if the Buyer eventually identifies several Products that might meet the desired requirements, the Buyer has no easy way to compare the Products or their prices, regardless of whether the Buyer is looking for the Same Products (i.e., identical Products from a single manufacturer sold by multiple Sellers) or Similar Products (i.e., like Products from different manufacturers sold by multiple Sellers). Moreover, once the Product(s) and Seller(s) are finally selected, the Buyer must often undertake multiple transactions, with at least one transaction for each Seller.

The above process is further complicated by the fact that the initial step of identifying via the internet the desired Products and the Sellers who provide the Products is not inherently easy. Search engines often provide unorganized results. The Buyer is therefore required to undergo the further time consuming process of sifting through the search results just to locate possible matches.

In general, therefore, even though comparing Products and prices by conducting searches using a search engine or listing site (such as Excite or Yahoo) is possible, the process is not very productive, especially if the Buyer wants to specify an upper limit to the price the Buyer is willing to pay for one or more Products. Search query formulations on typical search engines simply do not enable a Buyer to specify upper limits for Product prices. In addition, as mentioned above, if a Buyer locates one or more Sellers, the Buyer must interact with each one individually, and often sequentially, to determine if a purchase can be made. Of course, no two sales systems picked at random are likely to be similar. Therefore, the Buyer must learn to query the sales system of each and every Seller.

To make matters more complicated, Buyers often like to receive quotes for the cost of purchasing a set of Products from different Sellers without having to consummate any purchase right away. The Buyer is usually not permitted to save such quotes at the Sellers' System, requiring the Buyer to re-request quotes every time the System is accessed. This problem is compounded when a Buyer identifies Products desired from different Sellers and views quotes for some of those Products without the ability to save any of the quotes for subsequent access and use.

Even if a Buyer prints quotes provided by multiple Sellers, if the Buyer wants to change the desired Product list and generate a new quote for the changed Product list from a particular Seller, the Buyer is often required to interact with that Seller's online Sales System to enter the information all over again. In the rare situation where a Seller allows a Buyer to save quotes for some duration, those saved quotes are likely to be discarded by the Seller after a period of suspended sales activity.

Once the Buyer finally gets to the point of actually purchasing Products via the internet, the Buyer must interact with each Seller individually, and sequentially, to provide the Buyer's shipping information and credit card related information. Usually, the Buyer is prompted to provide such information before the Buyer can consummate a purchase. If the amount quoted by an online Seller for the currently selected Products from a Buyer's list is larger than the available credit on the credit card provided by the Buyer, the sales activity is often terminated. Even when the Buyer is in possession of multiple credit cards and their combined available credit exceeds the quoted amount for a Products list, it is often not possible for the Buyer to complete the purchase due to the inability of the online Sales System of the Seller to handle such complicated transactions.

In addition to the problems discussed above, a Buyer that is also a corporation experiences its own unique set of problems when it buys in bulk from online Sellers. For example, the Buyer often must have sufficient storage capacity to house the Product purchased before the Product can be distributed. In addition, when a Buyer is purchasing and storing the Product as such, the Buyer is often paying a higher price for the Product than it would have paid if the Buyer had simply waited and bought the Product when the Buyer was ready to distribute it. This is particularly true of high technology Products, such as, for example, computers, whose prices drop rapidly as the state of the art improves. Thus, it is often desirable for a Buyer to determine the cost of purchasing just some of the desired Products in the near future as opposed to purchasing them all at a current time period. There is currently no online sales system in widespread usage that enables a Buyer to obtain graduated quotes as such. Consequently, the advantages of buying in bulk online are often vitiated.

Additionally, when a Seller sells one or more Products to a Buyer on the internet, there is often an opportunity for the Seller, or for other Sellers, to sell a related but distinct item to the Buyer that is perhaps available at another Seller's online Sales System. For example, a Buyer purchasing a computer from an online Seller may also be in the market for a computer desk and a computer chair. However, nearly all such sales opportunities go undetected and untapped because Sellers do not have the ability or motivation to automatically share sales related activity information with each other.

Further, if a Seller has built up inventory of one or more Products that it wants to dispose of at an accelerated rate, it has no means to offload such inventory online.

Small Sellers experience even more difficulty in selling Products online. Before even buying Products via the internet, Buyers generally need to have confidence in the Sellers, which may not be the case unless the seller is well known or has a good reputation. Absent such confidence, Buyers may decide to pay a higher price simply for the comfort of dealing with a known Seller.

In addition, small online Sellers often do not have the Sales Systems necessary to provide online sales support. Such online Sales Systems often require web hosting services, product configuration and pricing databases, credit-card processing systems, etc. Small online Sellers often purchase web-hosting and sales support services from internet service providers or from online malls. However, Buyers can only get to such Seller's Sales System when Buyers locate and subsequently migrate to them for browsing.

Figure 13:
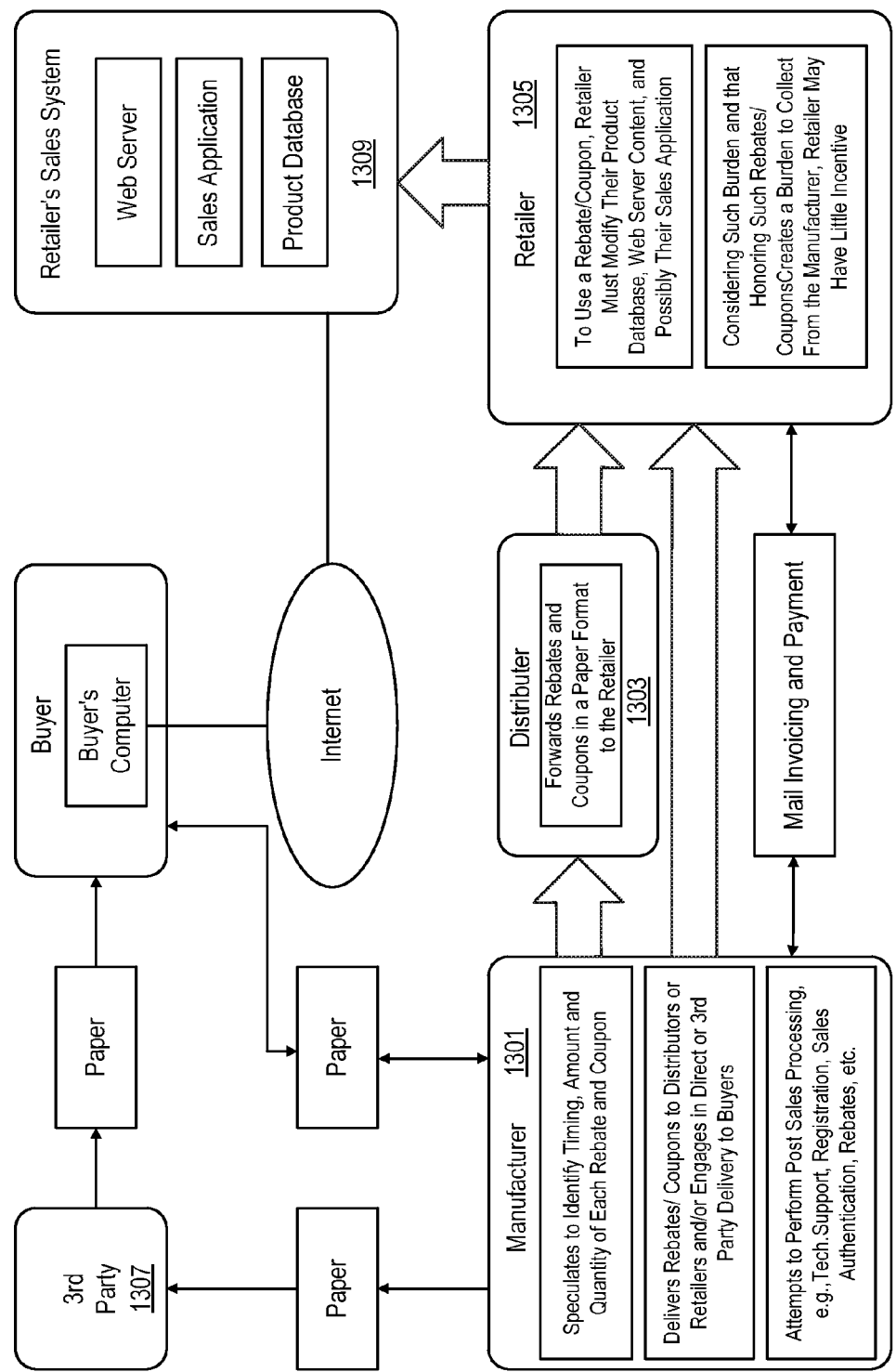

Sellers often provide coupons and rebates as an incentive to promote sales of specific Products. Sellers who offer coupons on the internet experience their own unique set of problems. More specifically, referring to FIG. 13, in a typical scenario, a manufacturer 1301 first must speculate to identify the timing, amount and quantity of each rebate and coupon. The manufacturer 1301 creates and delivers paper rebates/coupons to a distributor 1303, who forwards the paper rebates/coupons to a retailer 1305. The manufacturer 1301 may deliver the paper rebates/coupons directly to the retailer 1305. To use a rebate/coupon, the retailer 1305 must modify their product database, web server content, and, possibly, their sales application. This burden, along with the burden of having to collect from the manufacturer 1301, dissuades the retailer 1305 from participating in the rebate/coupon process.

Alternatively, the manufacturer may use a third party 1307 to deliver the coupons/rebates directly to the Buyer.

In addition, Sellers who provide coupons and rebates for Products on the internet often do not have the ability to control the amounts dispensed or to whom they are dispensed. This often leads to problems when too many, or too few, rebates/coupons, are dispensed online by a Seller. A manufacturer desires to determine the rate at which the rebates/coupons are accessed and redeemed by Buyers so as to alter the volume of rebates/coupons offered or discount given. However, rebates offered on the internet cannot be easily tracked, and without such tracking, a Seller cannot determine when to alter the rebate/coupon value or the number of rebates/coupons dispensed.

Furthermore, in most situations, retail Sellers on the internet do not have the ability or the facility to honor rebates supplied by manufacturers or distributors. This is also true for coupons. Buyers are then left with no option for redeeming such coupons and rebates. In the case of rebates, Buyers might be able to send the rebates along with the Buyer's sales receipts to manufacturers via post (snail mail) and subsequently redeem them via post.

Additionally, when Buyers are typically provided a quote by the online sales system of online Sellers for the products selected for purchase, the Buyers have the option to cancel the transactions and not purchase any Products. When they choose not to consummate a sale after a quote is provided to them, the Sellers do not have a second opportunity to provide a better quote or "sweeten the deal", causing the Seller to lose a potential sale.

After receiving the Products purchased from various Sellers, if the Buyer is interested in registering the Products with the manufacturers for technical support reasons or for Product update reasons, the Buyer must typically fill in registration cards and mail them to the manufacturers via post (snail mail) In the case of software purchased over the internet, the buyer if often prompted by the software during its installation to fill in a registration form full of questions. Such online registrations for each software purchased is a chore that Buyers often bypass at the risk of foregoing tech support from the manufacturer.

In general, without registering the product purchased, Buyers are not likely to receive warranty support or tech support. If Buyers are interested in registering the Product purchased with the manufacturer, the Buyer must mail receipts of the Products purchased, and sometimes even proofs of purchase, such as barcodes, along with registration cards, to the manufacturer. If a Buyer misplaces either the receipt or the registration card, registering the products with the manufacturers is very difficult.

When manufacturers offer rebates on specific Products, the Buyer, in general, must mail in the rebates that apply to the Products purchased. Again, mailing in rebates to manufacturers requires an investment of time and energy. For rebates being offered over the internet, Sellers must request and collect the information, print it, and mail it with receipts and sales information for redemption.

The problems related to redemption of rebates are in some ways similar to the problems with the redemption of coupons. Even if buyers can locate coupons for some of the products that they intend to buy on the internet, typically there is no easy way to redeem them on internet purchases.

Figure 14:
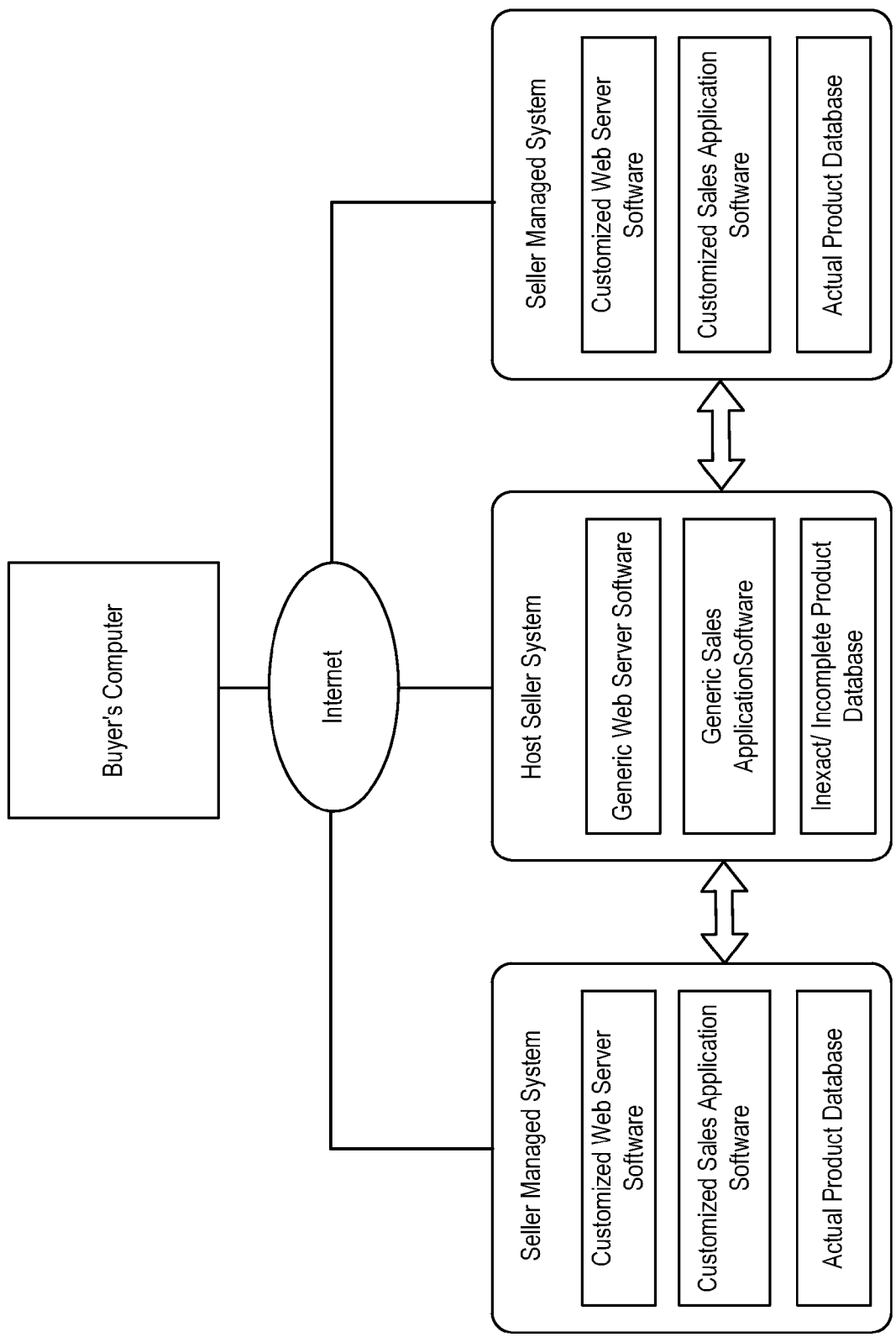

Referring now to FIG. 14, quite often, manufacturers of products employ several distributors and retailers to sell their products. Often these distributors and retailers have their own internet sales presence and endeavor to sell the manufacturers products on the internet. One of the common problems faced by these distributors and retailers is their inability to assure Buyers of the availability of products, whether the product is coming from theirs or the manufacturer's inventory. This causes problems during order fulfillment activities after a Buyer makes a purchase and delay in delivery follows. Manufacturers do not have the ability to determine the sales executed by their various retailers and distributors. This causes the Seller problems in determining production targets.

Figure 15:
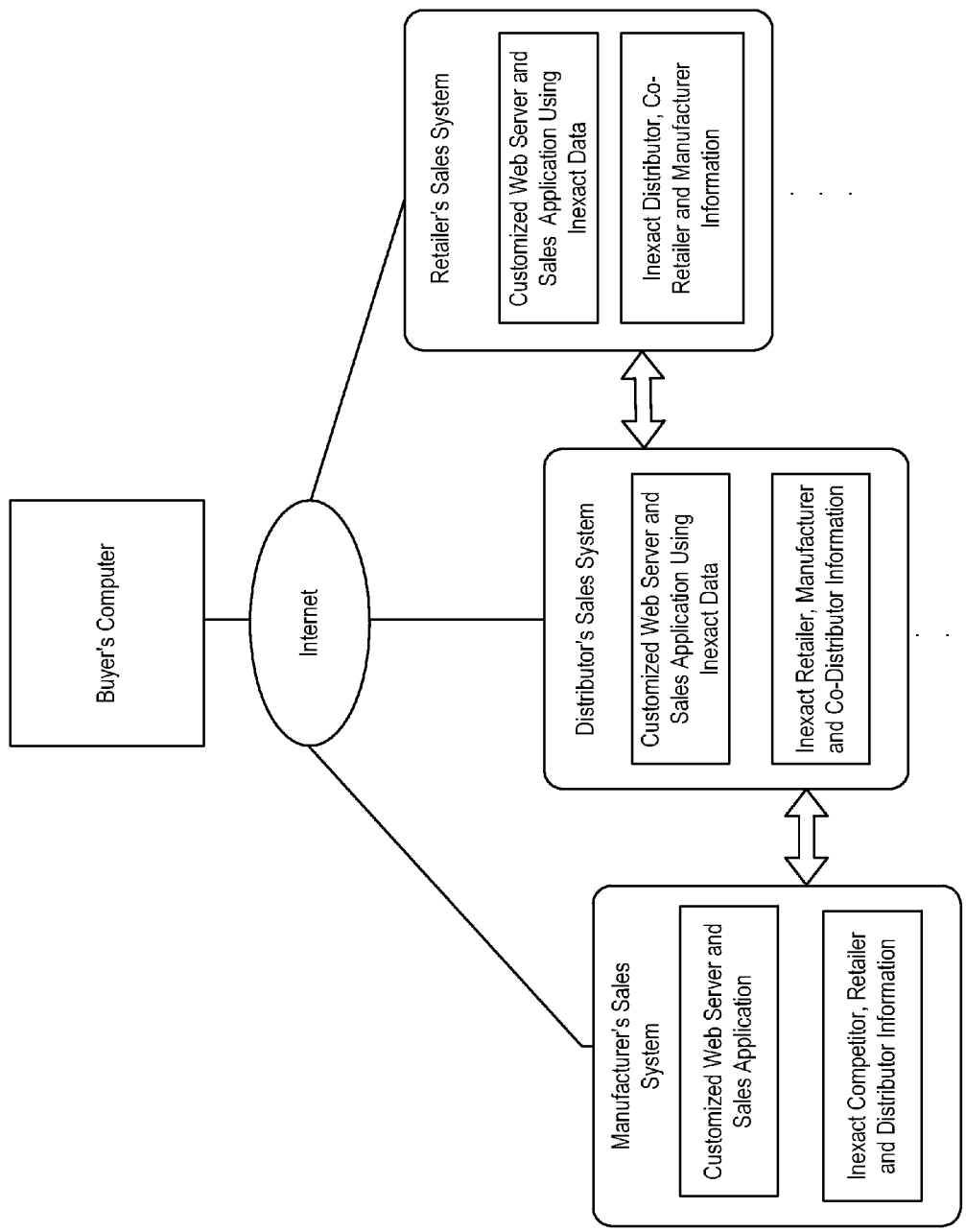

Often, a Seller would want to determine the selling price of specific Products being offered for sale by other online Sellers (see, e.g. FIG. 15). This, however, is not easy. Such information may be gathered by visiting the online sales sites of various vendors and browsing or executing queries on each of those sales sites to extract pricing information. This solution does not scale up.

If manufacturers want to control the flow of rebates in an automated way, they require information, such as the volume of sales, from their distributors and retailers. In the online internet based sales environment, coupons and rebates dispensed to Buyers cannot be easily tracked and reported, especially if the individual distributors and retailers have online sales systems that don't interact with each other and don't communicate information easily, as is the situation when they all have heterogeneous sales environments. A related problem is one of determining the sale prices for similar products from different retailers and distributors that sell the same family of products from a manufacturer.

Quite often, third party web-hosting companies host online sales systems for multiple vendors, some of whom might be involved in selling Similar or Same Products (see e.g., FIG. 14). If online vendors have to determine prices of similar Products or the same Products sold by their competition, it is often difficult to obtain such information in a timely manner even when the competing vendors are hosted by the same web-hosting service provider. Among other reasons for this, one important reason is the fact that each vendor employs their own proprietary tools and system design to store product information, customer information, sales information etc.

If a product manufacturer, their distributors and retailers each manage their own online sales system, then it is difficult for them to correlate similar or the same information contained in each of their systems. If they choose to install and use similar sales systems to alleviate this problem, then the distributors and retailers are either constrained to carrying products from that single manufacturer or they are forced to support several such manufacturer specific proprietary sales systems. Therefore, in order to minimize the number of such sales systems that they have to support and interact with and yet not limit themselves to a few manufacturers, distributors and retailers are often forced to maintain their own individual and customized sales system that is not necessarily tied to any individual manufacturer. By doing so, they encounter the problems of correlation of data in their sales systems and in those of the manufacturers.

Figure 16:
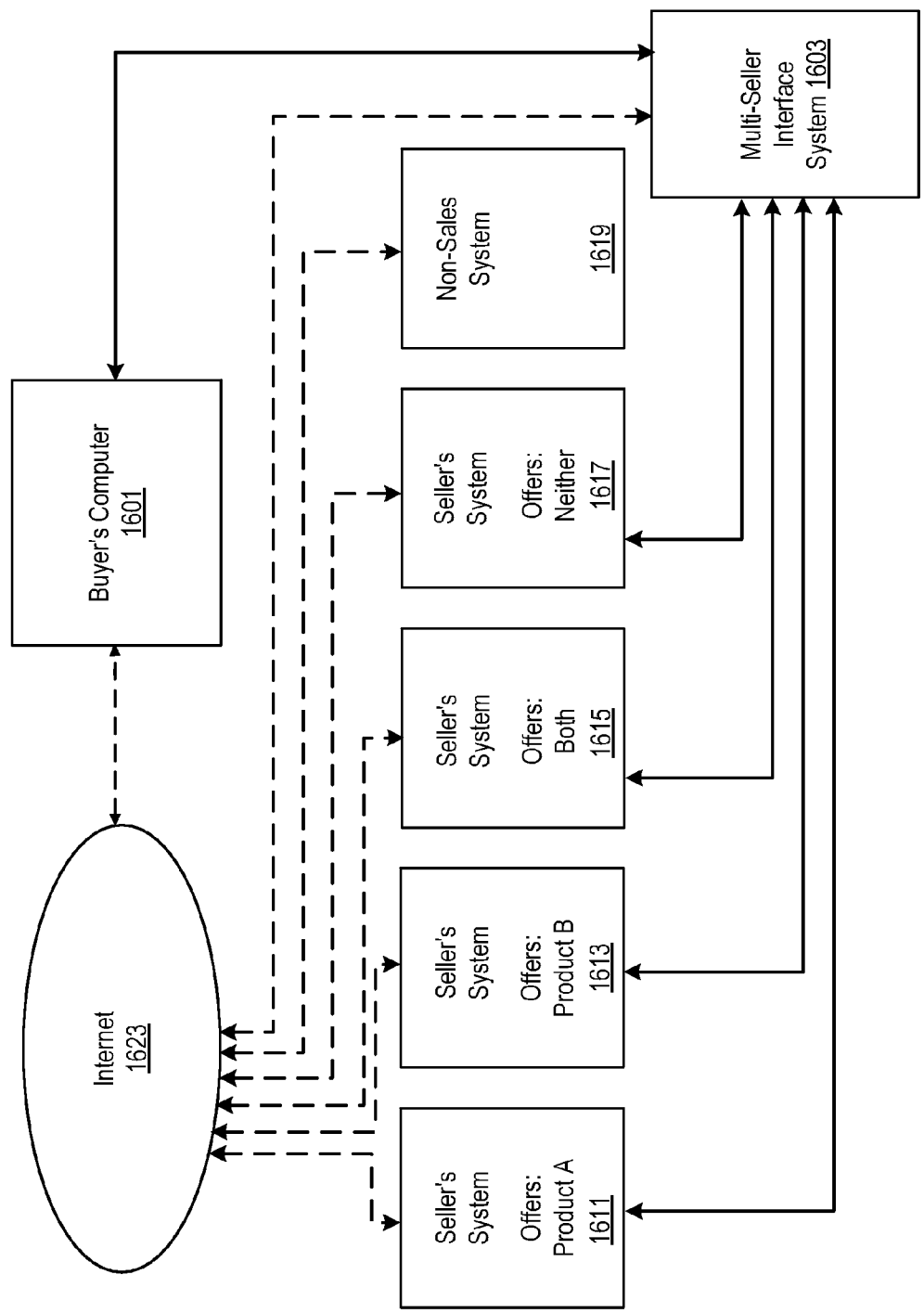
FIG. 16 is a block diagram of the Multi-Seller Interface System's role in the identification of Sellers for a Buyer attempting to purchase products Product A and Product B over the Internet.

FIG. 16 is a block diagram showing the Multi-Seller Interface System's 1603 role in the identification of Sellers for a Buyer attempting to purchase products Product A and Product B over the internet. The Buyer, using the Buyer's computer 1601, interacts with the Multi-Seller Interface System 1603 to specify information about the products Product A and Product B that he intends to purchase from online Sellers on the internet. The Multi-Seller Interface System 1603 identifies the various Seller's systems based on the category of products the Sellers carry, the Seller's capability to provide quality goods and services, and other criteria. For example, the Multi-Seller Interface System (MSIS) 1603 identifies Seller's systems 1611, 1613, 1615 as those that are capable of selling one or more products desired by the Buyer. It also determines that the Seller's System 1617 is incapable of selling one or more products desired by the Buyer and that the Non-Sales System 1619 should be ignored for possible sales transactions initiated by the Buyer.

The Buyer's computer 1601 interacts with the MSIS 1603 via internet 1623. Similarly, the MSIS 1603 interacts with the Seller's systems 1611, 1613, 1615, 1617 and 1619 via internet 1623. Optionally, the MSIS 1603 may choose to interact with any of the Seller's systems 1611, 1613, 1615, 1617 and 1619 via a dedicated network or via an intranet.

Typically, in response to a Buyer's selection of product categories, the MSIS 1603 sends queries to one or more Seller's systems 1611, 1613, 1615, 1617, 1619 to extract product and pricing information from the corresponding Seller's system. In response, the Seller's systems typically return shopping carts filled with those Buyer specified products that they are capable of selling, along with prices for the products and, optionally, their inventory of the products.

Figure 17:
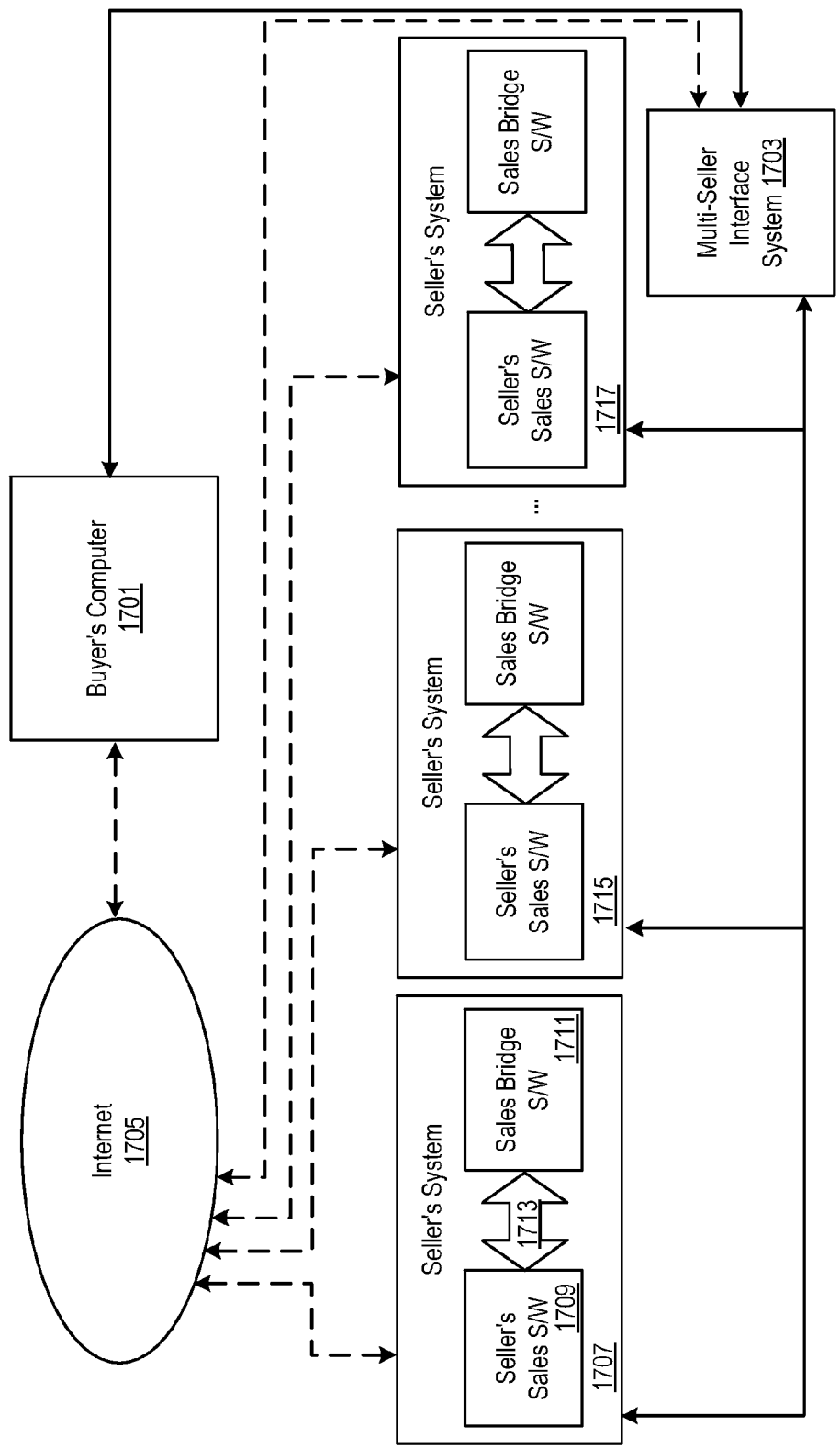
FIG. 17 is a block diagram of the Multi-Seller Interface System capable of interacting with Seller's systems employing a Sales Bridge software that is installed on each of the Seller's systems.

FIG. 17 is a block diagram showing the Multi-Seller Interface System 1703 capable of interacting with Seller's systems 1707, 1715, 1717 employing a Sales Bridge software 1711 that is installed on each of the Seller's systems 1707, 1715, 1717. The Sales Bridge software 1711 is used by the MSIS 1703 to execute queries sent to the Seller's systems 1709, 1715, 1717 from the MSIS 1703 and, in response, return shopping carts with prices back to the MSIS 1703. In general, the Sales Bridge 1711 is used by the MSIS 1703 as a remote database layer that is capable of translating queries received from the MSIS 1703 into queries and processes that retrieve the requested information, such as configuration, pricing and inventory, from the Seller's Sales software 1709.

A Buyer using a Buyer's computer 1701 interacts with the MSIS 1703 over internet 1705 to specify queries related to products that he intends to purchase. Such interactions typically involve navigating down a hierarchy of product categories to identify those that the Buyer is interested in, or specifying a search criteria via a search interface to extract information on products and product categories and to identify relevant product categories.

Figure 18:
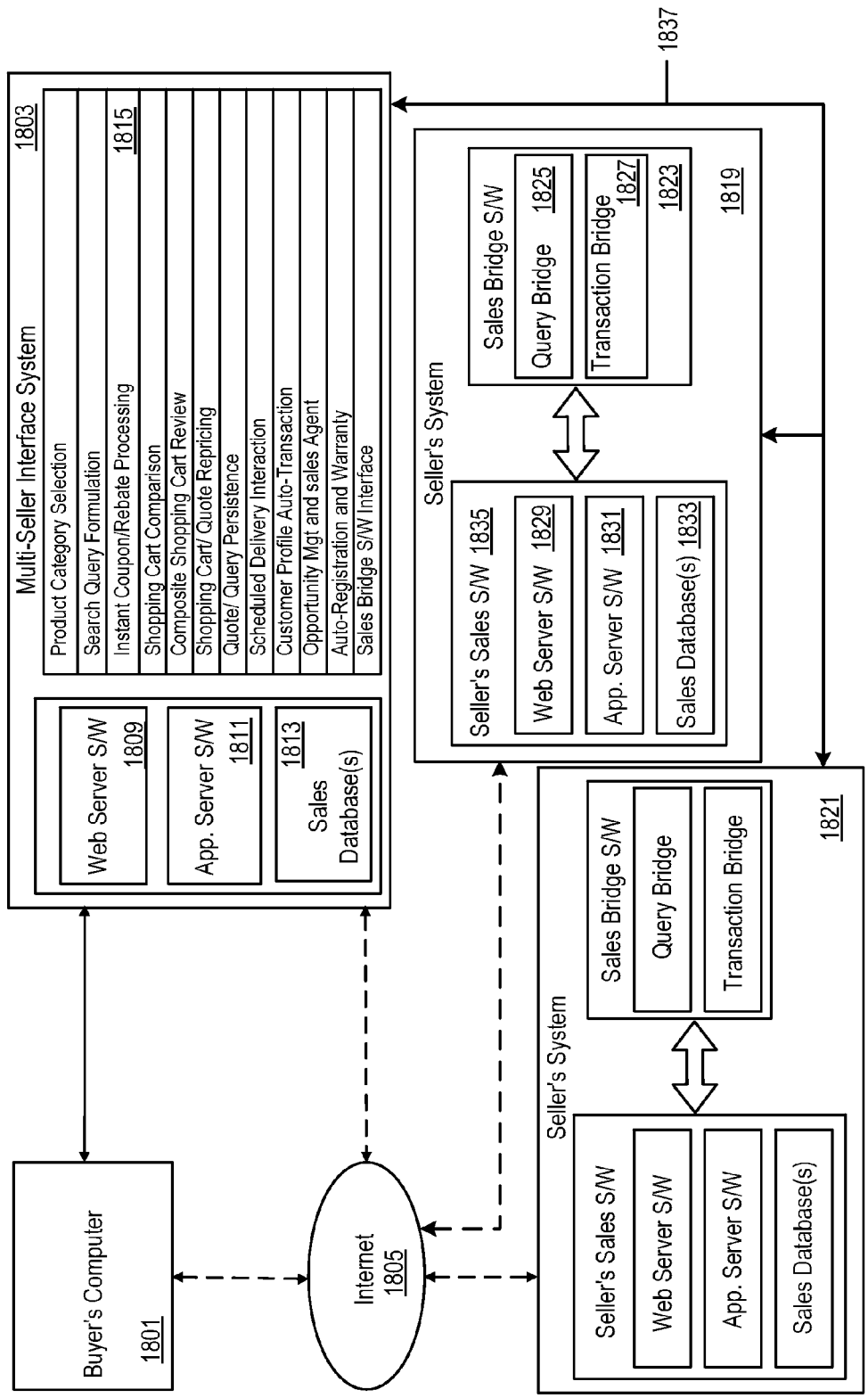
FIG. 18 is a schematic block diagram illustrating various functionality of a Multi-Seller Interface System's and Seller's systems.

FIG. 18 is a schematic block diagram illustrating various functionality of a Multi-Seller Interface System's 1803 and Seller's systems 1819 and 1821. The MSIS 1803 includes one or more web server software 1809 with which Buyer's computers 1801 interact, one or more Application server software 1811 that provide various Sales services to buyers accessing them over internet 1805 and one or more Sales databases 1813 that is used to save various kinds of information such as customer profile, saved quotes, product categories, etc.

Among other things, the MSIS also supports product category selection, search query formulation, instant coupon and rebate processing, shopping cart comparison, composite shopping cart review, shopping cart pricing and saved quote repricing, quote persistence and query persistence, scheduled delivery information from Buyers, customer profile auto transactions, opportunity management and sales agent support, automatic registration of products on behalf of Buyers, Warranty management. In addition, it also includes Sales Bridge software interface that makes it possible to interact with Seller's systems 1819 and 1821.

Seller's system 1819 comprises a Seller's sales software 1835 and a Sales Bridge software 1823. The Seller's Sales software 1835 includes a web server software 1829, an Application server software 1831 and a Sales databases 1833. The Sales Bridge software 1823 comprises a Query Bridge 1825 and a Transaction Bridge 1827.

The Query Bridge 1825 is used to query one or more Sales databases 1833 using queries formulated by the MSIS 1803 or queries created from search information sent by the MSIS 1803. Information extracted by the Query Bridge 1825 is communicated to the MSIS 1803 over communication links 1837. The Transaction Bridge 1827 is typically employed by the MSIS 1803 to conduct credit-card based sales transactions with the Seller's system 1819.

Figure 19:
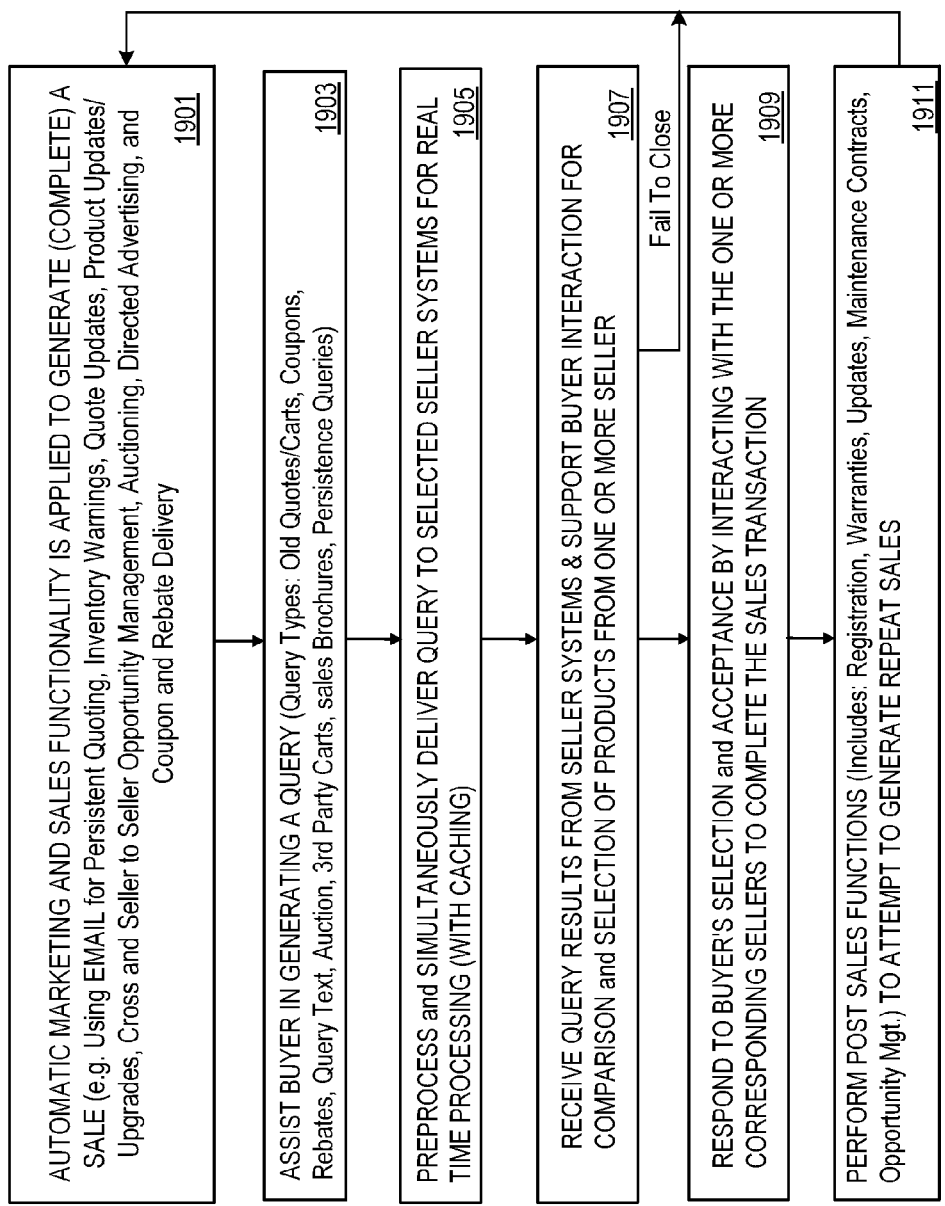
FIG. 19 is an exemplary flowchart of typical workflow at the Multi-Seller Interface System.

FIG. 19 is an exemplary flow chart showing typical work flow at the Multi-Seller Interface System 1803. At a block 1901, the MSIS 1803 attempts to generate a sale employing automatic marketing and sales functionality. These activities include emailing potential buyers information such as saved persistent quotes, current inventory information, quote updates based on repricing existing quotes, product upgrades that might have become available, up and cross-selling opportunity detection from an individual Seller's sales activity or from monitoring sales activities across multiple Sellers. The automatic marketing and sales functionality activities also include directed advertising, coupon and rebate delivery to potential Buyers based on Buyer profile provided by Buyers or based on information gathered by tracking Buyer's buying habits.

Later, at a block 1903, the MSIS 1803 assists Buyers in generating a query for subsequent submission of those queries to Seller's systems. Queries can take the form of old saved quotes or shopping carts, coupons selected, rebates selected, query text, third party shopping carts, sales brochures, persistent queries, etc.

Later, at a block 1905, the MSIS 1803 preprocesses Buyer specified queries and delivers them to selected Seller systems that are identified based on one or more search criteria including, in some cases, product categories, customer profiles, etc. Some of these queries are selectively cached in memory by the MSIS 1803.

When the Seller's systems respond with product and pricing information, for example, with priced shopping carts that include all or a subset of the Buyer's product list, the MSIS 1803 presents the information to Buyer for interaction with the Buyer. Optionally, such information is presented as a comparison of products and prices, at a block 1907. If a customer's query fails to retrieve results from Seller's systems, the MSIS 1803 makes a transition to the block 1901.

Otherwise, the MSIS 1803 continues to a block 1909 where it responds to Buyer's selection and acceptance of product prices by interacting with none or more corresponding Seller's systems to complete the sales transactions. Subsequently, at a block 1911, the MSIS 1803 performs post sales functions which selectively include registration, warranties, updates, maintenance contracts, opportunity management etc. Opportunity management is employed to generate additional sales or repeat sales.

Figure 20:
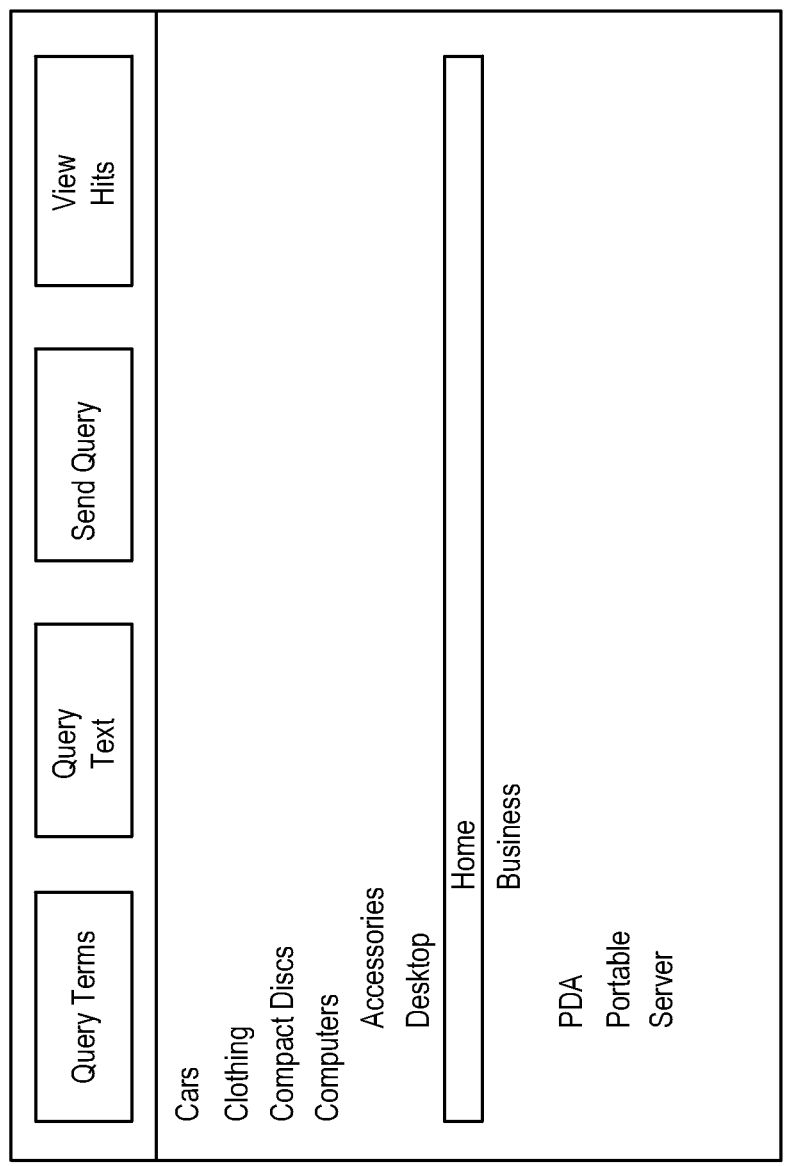
FIG. 20 is an exemplary screen layout that a Buyer interacts with in order to select products and obtain product prices during an online purchasing activity supported by the MSIS.

FIG. 20 is an exemplary screen layout that a Buyer interacts with in order to select products and obtain product prices during an online purchasing activity supported by the MSIS 1803. The MSIS presents a Buyer with a screen of information that includes a button for Query terms that the Buyer can select from, a button for Query Text that is optionally entered by the user to facilitate product and price searches, a button that when activated, results in sending a query to one or more Seller's systems, and a button that makes it possible to view the hits following the receipt of responses to Buyer's queries.

FIG. 21 is a diagram that shows a list of products with prices provided to Buyer by the MSIS 1803. It shows a comparison of prices, for products acquired from two different shopping carts. In this exemplary scenario, products bought from two different Sellers add up to a total that is less than the total quoted by another single Seller. Addition, the Sellers are rated with asterisks (**) indicating the ratings.

Figure 22:
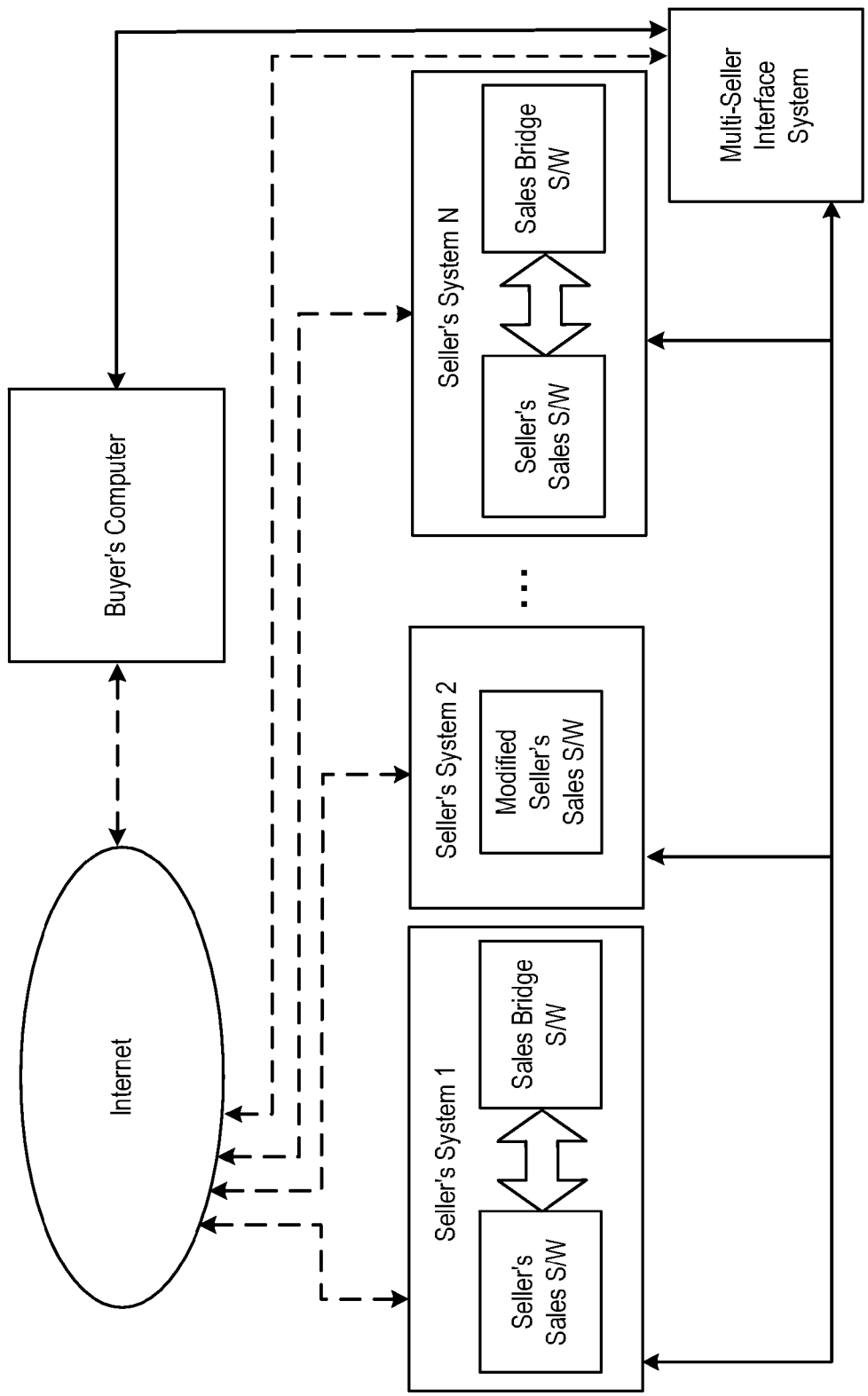
FIG. 22 is a functional block diagram of buyer and seller system interaction with the system of the present invention.

FIG. 22 provides a functional block diagram of buyer and seller system interaction with the system of the present invention. Therein, the system comprises a web based, Multi-Seller Interface System (MSIS) and a plurality of Sales Bridge Software (SBS) modules through which buyer's computers can simultaneously access many independent and differing sellers' sales systems.

To interact with the system of the present invention, a buyer, corporate or individual, merely accesses web pages provided by the MSIS with conventional web browser software on the buyer's computer. The buyer interacts with the MSIS to define queries relating to one or more desired products. The MSIS automatically attempts to identify those of the plurality of participating sellers that might carry such products. Once defiled, each query is simultaneously communicated by the MSIS to each of Seller's Sales System (SSS) via the SBS modules of the identified ones of the plurality of participating sellers. Using a query bridging approach, each SBS module performs a search of product, pricing, inventory, etc., database(s) based on the query. All sales information relating to each product identified in the search is delivered to the MSIS for the buyer's review, comparison and selection. The MSIS permits concurrent selection and single transaction purchasing of products from more than one seller. Caching of common queries on a day to day basis is also supported by the MSIS to minimize communication overhead.

The sales information returned from each SSS represents complete, real time public and private sales information, catering not only to individual buyers, but, more importantly, to sellers. For example, in response to queries from individual buyers or competitors, the query bridge of the present invention may easily be configured to deliver public information such as pricing and product descriptions. For queries generated within a selling channel (i.e., by a manufacturer, distributor or retailer or by their sales systems), private information relating to each product such as inventory, inventory projections, numbers sold, margins, etc., may be easily and automatically exchanged. Such information can be used for forecasting inventory, pricing, planning promotional activities (e.g., instant coupons, auctioning and rebate programs), and production planning, for example.

The MSIS supports query definition in several ways to provide the buyer with greatly needed yet currently unavailable functionality. For example, through a category selection process and/or textual search term entry, a buyer can construct a query to simultaneously retrieve from all sellers all underlying product sales information matching the query. The buyer can also generate a query from online rebate and coupon information for true instant processing, unlike current online rebate and coupon vendors who incorrectly claim to do the same. Queries may be generated from third party seller shopping carts for comparison with participating sellers' products. Saved quotes may be converted to queries for updating and verification, and may be used as a persistent basis via sales email for attempting to complete the transaction with the buyer. Further, queries may be generated from advertising information, e.g., online auction descriptions, online sales brochures, etc., whether or not such information originates within the MSIS.

Selling channel systems also generate queries in a number of, ways with or without interaction through a web client (user interface). Automatic data gathering between participants in the selling channel will permit an application (based on a toolkit) to automatically (1) place or suggest placing orders to replenish inventory, (2) identify new product offerings, (3) suggest pricing changes, (4) facilitate just in time delivery, (5) identify and/or maintain appropriate inventory levels, (6) suggest or carry out changes or additions to advertising and promotional programs, (7) schedule release of upgraded or superseding products, etc. Competing selling channel systems may also be queried (automatically or otherwise) to gather public information regarding competing product lines. Such information may be used to supplement the automatic processes identified in items 1-7 above, for example. A toolkit underlying the MSIS simplifies preparation of application software to carry out such and other processes. Such application software may run on any or all system(s) within a sales channel. In fact, such application software, or portions thereof, may be placed at many locations within a single organization to carry out internal, enterprise sales functions.

The toolkit underlying the MSIS also provides for up, cross and seller to seller opportunity management for automated, email-based target marketing without the need to release buyer information to a participating seller. For example, the MSIS permits a first seller to establish relationships between completed and/or queried sales transactions within categories and/or by a specified second seller. Based thereon, predefined email is automatically sent to buyers or potential buyers advertising sales of the first seller's products that relate to the category or to the second seller's product.

From a buyer's online perspective, the MSIS performs a single transaction (e.g., credit card) processing of multiple product selections spanning more than one seller. Based on final configuration, the underlying transaction may actually involve (1) a plurality of transaction processes between each seller and the buyer using the buyer's credit card information, and/or (2) a single credit card transaction for the total from the buyer to the MSIS along with a plurality of transaction processes with each seller involving account information of the MSIS.

As part of the sales transaction, or in follow up thereto, the MSIS performs automated registration, warranty delivery and acceptance, maintenance contract offerings and purchases, and emailed product information regarding updates and upgrades services. Stored buyer profiles minimize buyer interaction required to carry out sales transactions and such associated services. Stored buyer transaction records enable targeted email advertising, persistent query support, opportunity management, etc.

The MSIS can, upon a seller's request and in addition to or in replacement of the seller's sales system, perform transaction and/or other sales processing for the seller. In addition, the MSIS provides each seller with real time access to product sales information from the seller's competitors and own sales chain. The query protocol and the SBS enable a corporate buyer to develop specifically desired sales interfaces into one or more seller systems. The underlying functionality and software libraries used in the MSIS may be specifically licensed for such purpose. Corporate buyers are also supported through scheduled purchasing and just in time delivery functionality within the MSIS.

The present invention may generate revenue by taking a percentage of each completed sales transaction conducted through the MSIS. To generate further revenue, the MSIS tracks each buyer's use of the web-site, whether or not a transaction is completed, and offers to provide sellers with information for potential future sales opportunities. Similarly, the System offers instant rebate and coupon processing, direct email targeted sales, advertising space, and persistence in exchange for transaction percentages. Credit card processing, delivery tracking, customer support, and other backend sales functions can be offered, generating further revenue streams.

The System may be based on web server and application server software products offered by Trilogy Development Group, a company located in Austin, Tex.

Figure 23:
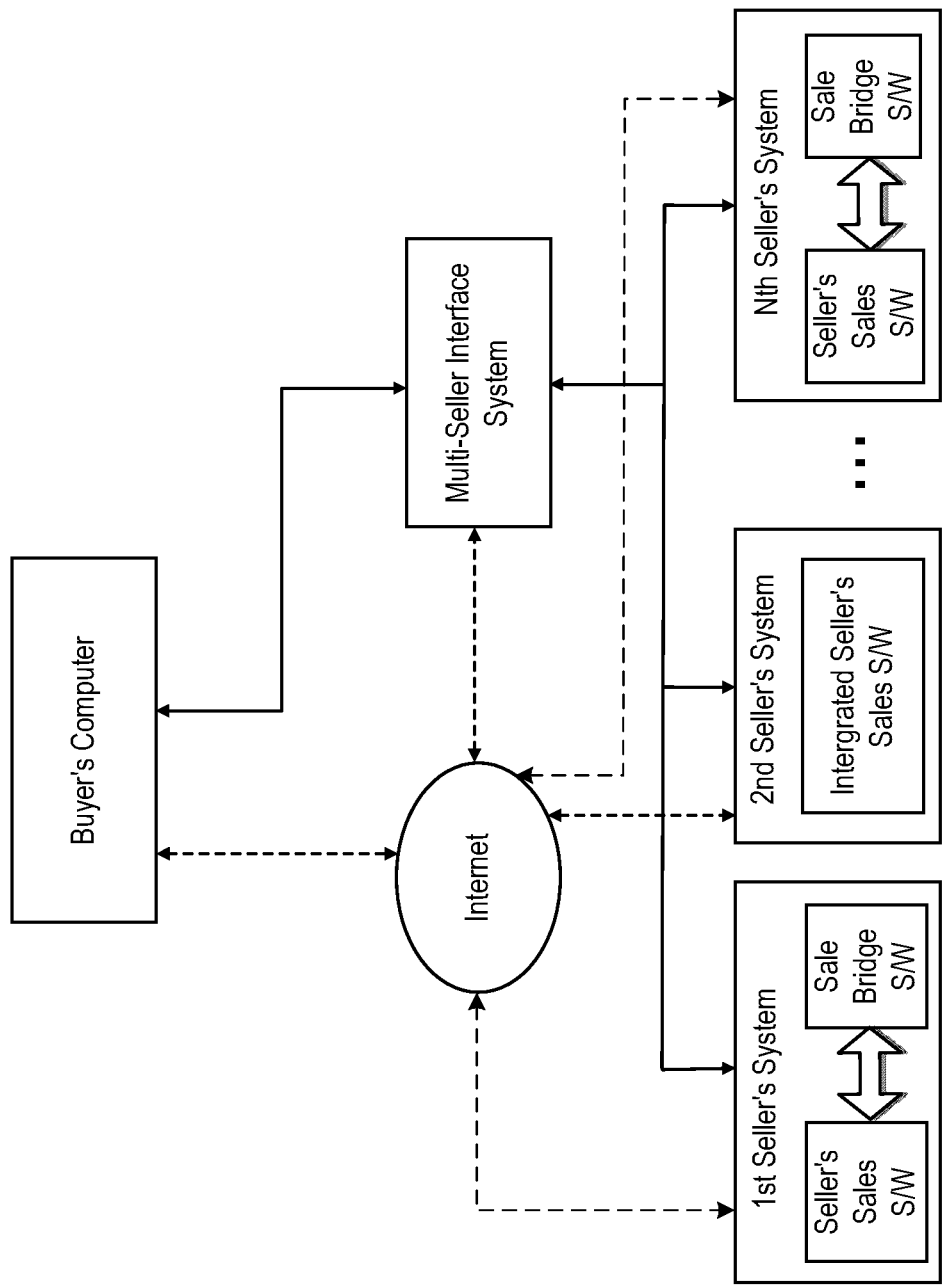
FIG. 23 is a functional block diagram of buyer and seller system interaction with the Multi-Seller Interface System (MSIS) of the present invention.

FIG. 23 is a functional block diagram illustrating buyer and seller system interaction with the Multi-Seller Interface System (MSIS) of the present invention. The MSIS comprises SalePoint and SalesBridge Software. The SalePoint software runs on one or more conventional web and application servers to provide a multi-seller interface.

The SalesBridge Software is placed on each seller's online sales system to bridge communication between the SalePoint software and each seller's online sales databases and applications. Buyers may then simultaneously access many independent and different seller's sales systems. Similarly, groups of sellers (within one or more sales channels) can easily and automatically share sales and product information.

Figure 24:
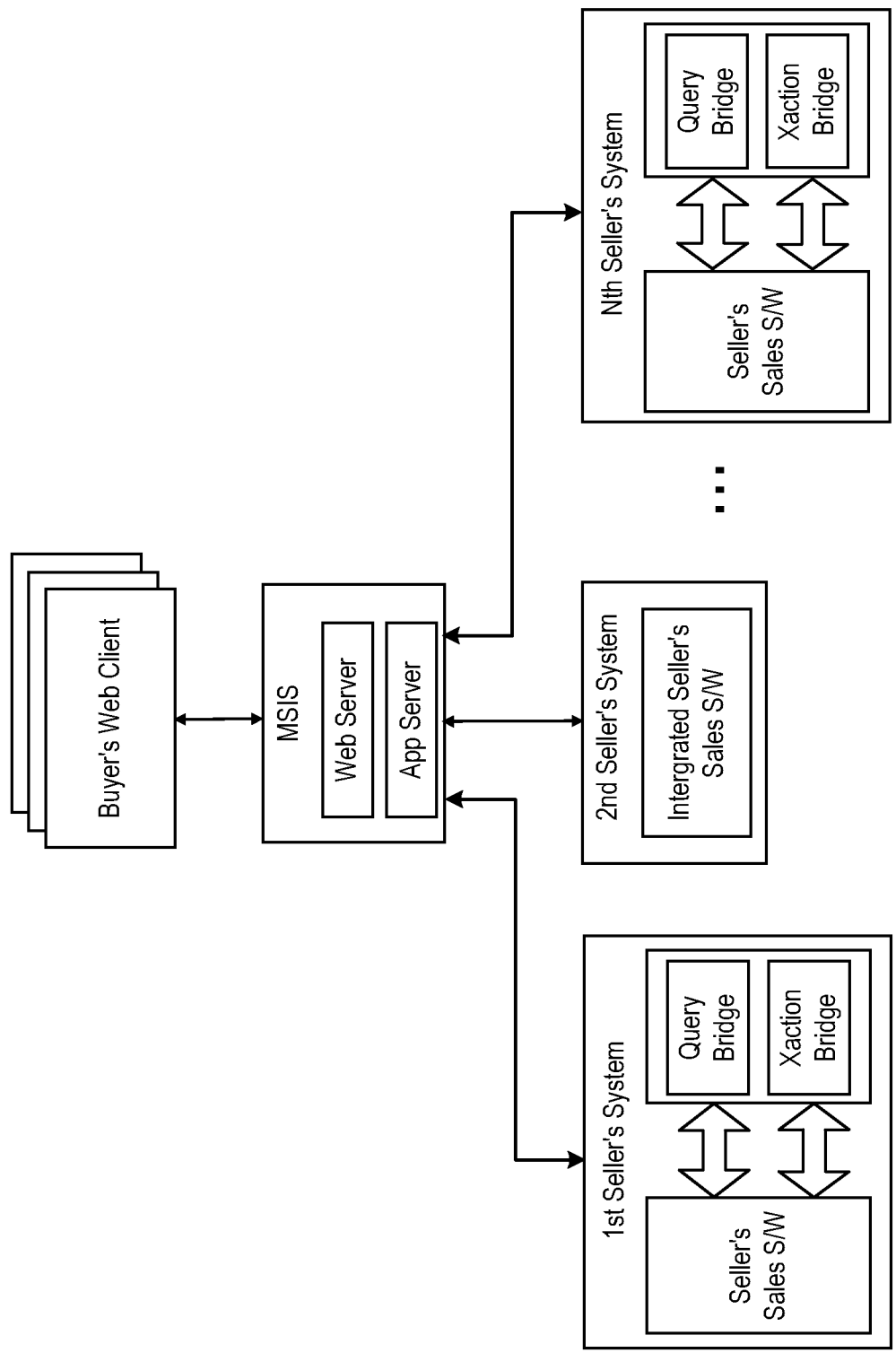
FIG. 24 is a block diagram illustrating web based, interactive and non-web based, automatic access of software by buyers and sellers of the present invention.

As shown in FIG. 24, the SalePoint software will support web based, interactive access by buyers and sellers through their web clients, and non-web based, automatic access by the sellers through an interface.

The SalesBridge Software uses both query and transaction bridging functionality to couple each seller's system with the SalePoint software. Alternatively, such bridging functionality may be partially or entirely integrated into the seller's system.

Figure 25:
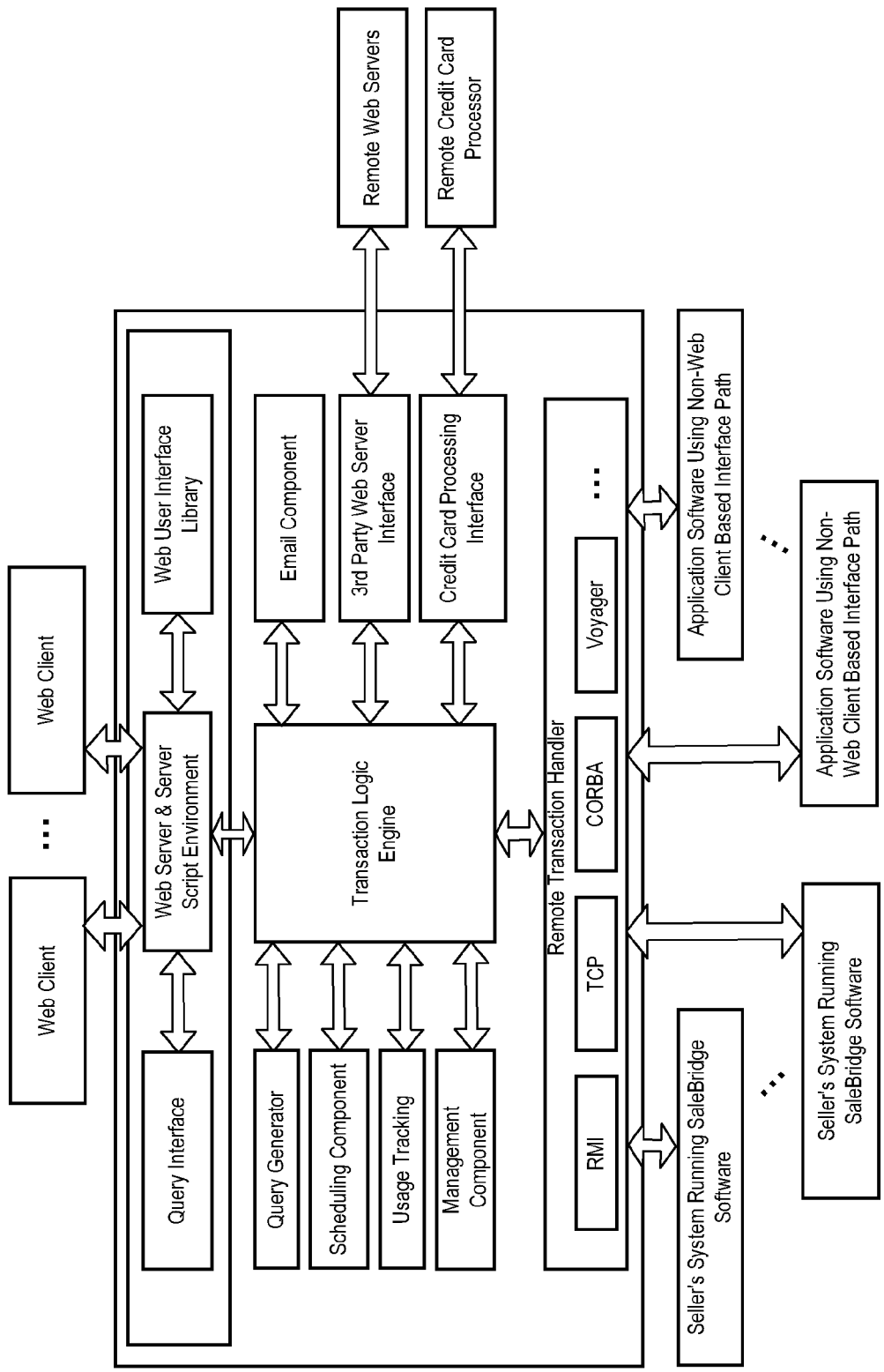
FIG. 25 is a diagram illustrating buyer's use of web client software to select and request server pages for one of a plurality of application services of the present invention.
Figure 26:
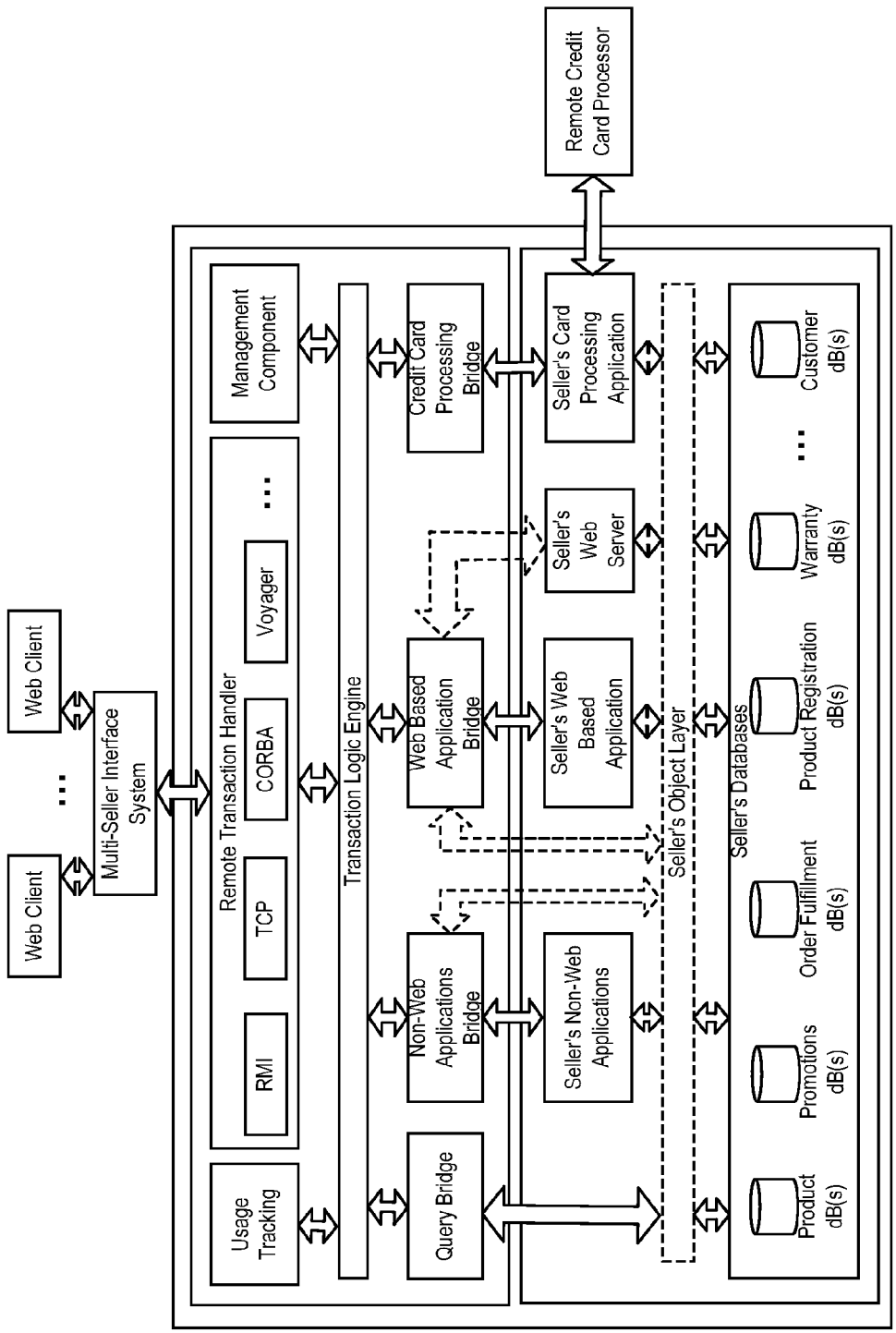
FIG. 26 is a diagram illustrating the interactions between the software and the Seller's system of the present invention.

FIGS. 25 and 26 are detailed drawings of the SalePoint and SalesBridge Software. As shown in FIG. 25, buyers use their web client software (e.g., a browser) to select and request server pages for one of a plurality of application services. A web server and server script environment responds by serving html files, server pages, and images that correspond to the selected application service. The server pages executed by the environment typically incorporate method invocations on objects stored in an object layer or object backbone and associated databases. In addition, the server pages identify transaction logic for the selected application service.

For each of the application services, transaction logic (a high level scripting language) is written to include a sequence of tasks that each manipulate data or objects, with each of the tasks executed by underlying task specific transaction logic or compiled code (hereinafter a "workflow object"), or both. Although transaction logic is specifically written for each of the application services, many of the workflow objects and underlying task specific transaction logic are shared by different application services.

Some examples of the application services contemplated by the present invention can be found with reference to FIGS. 27-33 below. The tasks executed by the transaction logic engine may include, for example, credit card related transactions, database searches, database updates, remote transactions executed on one or more seller's systems, etc.

The transaction logic engine interacts with several other web server components of the SalePoint Software, such as a query generator, scheduling component, usage tracking, management component, email component, 3rd party web server interface, credit card processing interface and a remote transaction handler. The query generator creates queries based on information provided by buyer, data retrieved from database(s), information provided via method invocations from non-web server interface, etc. The queries generated by the query generator are selectively sent to SalesBridge Software associated with remote Seller's systems to extract various kinds of sales information.

The scheduling component is used to periodically initiate various tasks, transaction logic, and activities such as reporting or re-pricing, etc. For example, a buyer or seller can schedule various activities and specify when and how frequently they should be executed through associated application services. The schedules and the activities are saved in databases by the scheduling component for subsequent retrieval and execution by the transaction logic engine.

Although usage tracking might have been implemented via transaction logic, it is implemented as a separate component to collect, process and report information regarding the use of the SalePoint Software by buyers and sellers. The usage tracking component provides information on products sold by various sellers, product sales volume, type of products being sold, inventory information, and various other sales related information. The usage tracking component provides information with different levels of granularity, as required and authorized by various buyers and sellers.

The management component is used to manage various activities, scheduled or unscheduled, for buyers and sellers. It is also used to manage initializations, application service deployment, updates, recycling, and shutdown of various resources.

The email component is used to send email to one or more buyers or buyer groups after the processing of certain events or after the execution of a scheduled or unscheduled transaction logic command. It is also used to send various information, such as, for example, buyer purchasing and query profiles, to sellers and to email promotional material such as coupons and rebates to one or more buyers.

The 3rd party web server interface is used to interact with remote web servers to retrieve or to provide various kinds of information. Using this interface, it is possible to interact with remote web servers just like web clients on those web servers.

The credit card processing component is used to interact or conduct transactions with remote credit card processing units. Such remote credit card processing units may be located at seller's environments or incorporated into a seller's system. The credit card processing component enables a buyer to selectively spread purchases over one or more credit cards owned by the buyer, and to spread a buyer's shopping cart purchase over several sellers.

The remote transaction handler provides support for interactions with SalesBridge Software installed with one or more remote seller's sales systems. It employs one or more communication mechanisms such as Remote Method Invocation (RMI), Common Object Request Broker Architecture (CORBA), TCPIIP, Voyager, etc., to communicate with remote software and retrieve information. Remote SalesBridge Software can initiate communications with the SalePoint Software in order to retrieve information, provide information, or request some service. It also supports communication with external systems such as third party credit-card systems and monitoring tools.

FIG. 26 shows the interactions between the SalesBridge Software and the Seller's system. The seller's system may have its own web server to provide an interface to web clients. The seller's system also typically incorporates seller's databases that comprise, among other things, product, promotional, order fulfillment, product registration, warranty and customer databases. An object layer on top of the database layer enables the application layer to manipulate objects.

The seller's system may also contain the seller's non-web applications, web based applications, and card processing application. The SalesBridge Software may also interact with the seller's applications to extract product, pricing, and inventory information as well as to conduct credit-card based transactions.

If the seller's system includes a web server, the SalesBridge Software may also provide a web based application bridge to assist the query bridge in extracting product, pricing and inventory information. The query bridge is responsible for mapping or translating queries sent by SalePoint Software into one or more queries executable on the seller's databases to retrieve, and possibly update, information in the seller's databases.

The SalesBridge Software also provides a non-web based application bridge to extract information from the seller's system via the seller's non-web applications interface. The non-web based application bridge IS employed via an interface supporting remote access based on CORBA, RMI, etc.

The SalesBridge Software also includes a transaction bridge that can be used to interact with the seller's card processing application to process credit card purchases. For example, a buyer's credit card and shopping cart related information may be communicated to the seller's card processing application to complete a transaction for the buyer.

Figure 27:
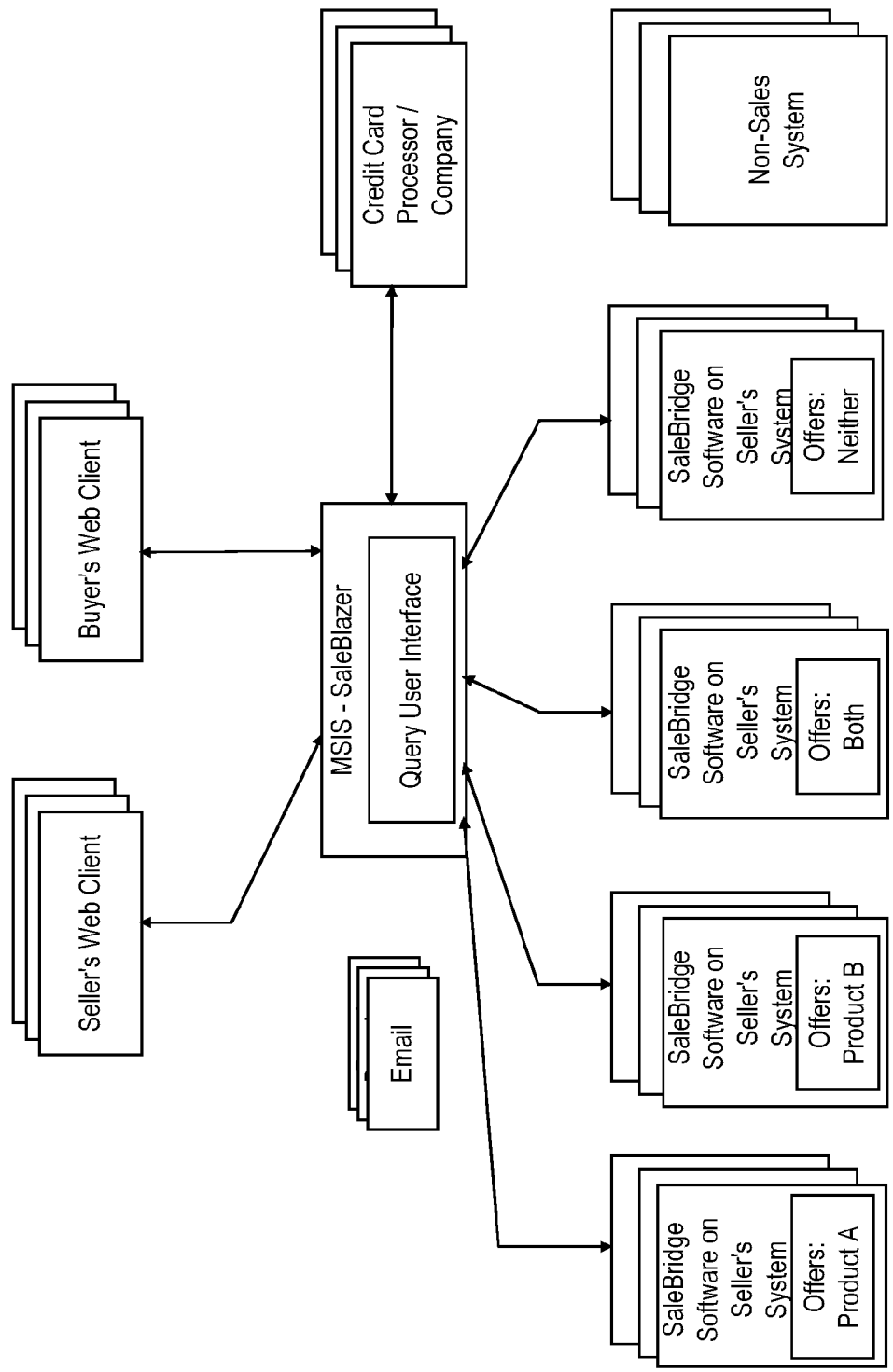
FIG. 27 is a diagram illustrating an individual buyer interface system that runs on the MSIS of the present invention.

FIG. 27 illustrates an individual buyer interface system, SaleBlazer that runs on the MSIS. The interface may also be tailored to the corporate buyer, with extended functionality supporting, for example, scheduled buying and just-in-time delivery.

To interact with the SaleBlazer service, a buyer merely uses conventional web browser software on the buyer's computer. The buyer interacts to define a query relating to one or more desired products. The SaleBlazer service via the SalePoint Software identifies those of the plurality of participating sellers that might carry such products. Once defined, the SalePoint Software simultaneously communicates the query to SalesBridge Software at each of the identified participating sellers.

Using the query and transaction bridging approach of the present invention, each SalesBridge Software component performs a search of product, pricing, inventory, etc., databases based on the query. All sales information relating to each product identified in the search is delivered to the SalePoint Software for presentation to the buyer. The buyer may review, compare and select one or more of the products returned from one or more of the participating sellers. Caching of common queries on a day to day basis will also be supported by the SaleBlazer service to minimize communication overhead.

From an individual buyer's online perspective, the SaleBlazer service will perform a single transaction (e.g., credit card) processing of multiple product selections spanning more than one seller. Based on final configuration, the underlying transaction may actually involve (1) a plurality of transaction processes between each seller and the buyer using the buyer's credit card information, and/or (2) a single credit card transaction for the total from the buyer to the MSIS along with a plurality of transaction processes with each seller involving account information of the MSIS.

As part of the sales transaction or in follow up thereto, the SaleBlazer service will perform automated registration, warranty delivery and acceptance, maintenance contract offerings and purchases, and emailed product information regarding updates and upgrades services. Stored buyer profiles will minimize buyer interaction required to carry out sales transaction and such associated services.

Figure 28:
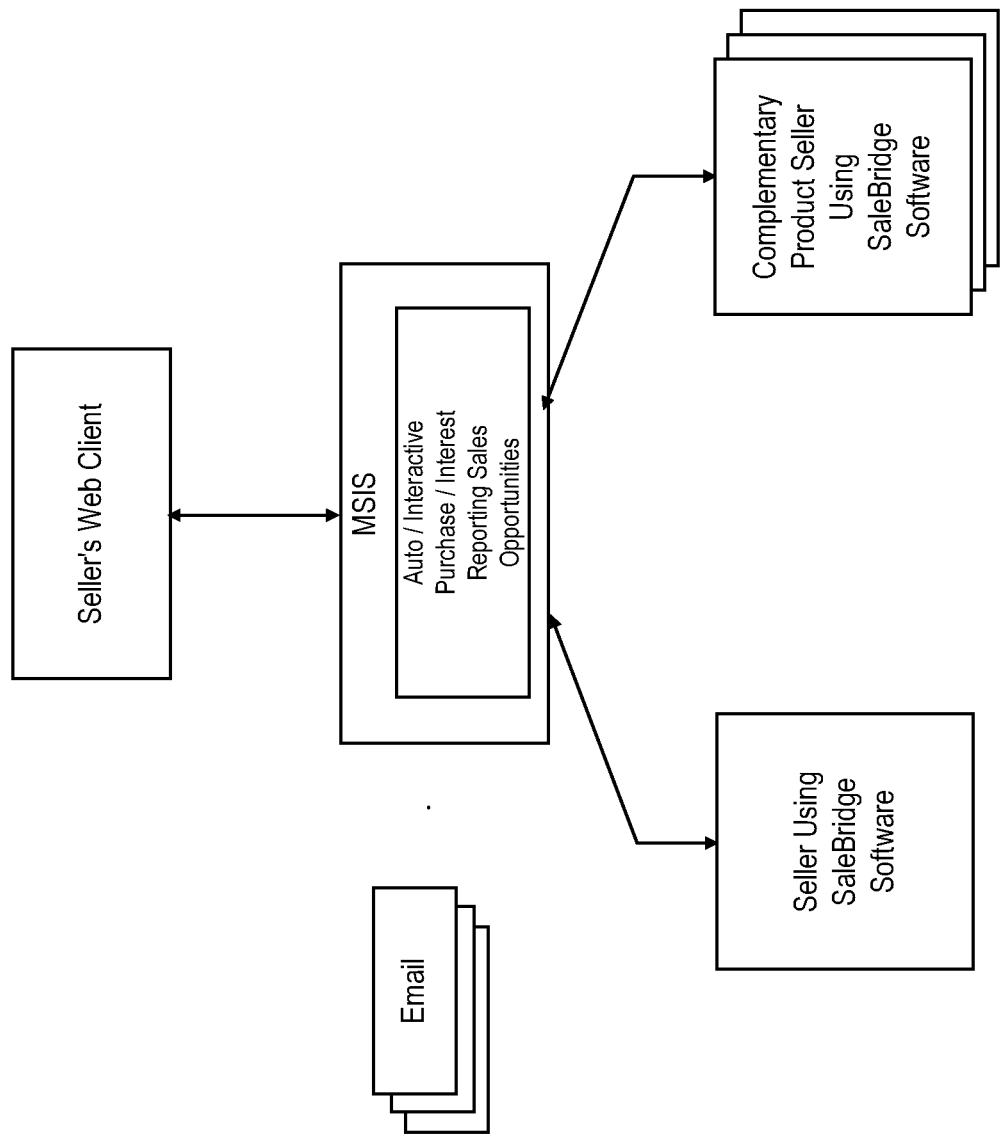
FIG. 28 is a diagram illustrating an application service that provides for up, cross and seller to seller opportunity management for automated, email-based target marketing without the need to release buyer or specific seller information to another participating seller of the present invention.

FIG. 28 illustrates an Opportunity Management application service that provides for up, cross and seller to seller opportunity management for automated, email based target marketing without the need to release buyer or specific seller information to another participating seller. For example, the Opportunity Management service will permit a first seller to contact a buyer that has completed a sales transaction for a product of a second seller. Similarly, a buyer showing interest but not buying one of a seller's products can be automatically contacted via email offering another of the seller's products. The buyer may choose to remain anonymous and still receive such email through our email forwarding functionality of the Opportunity Management service.

Figure 29:
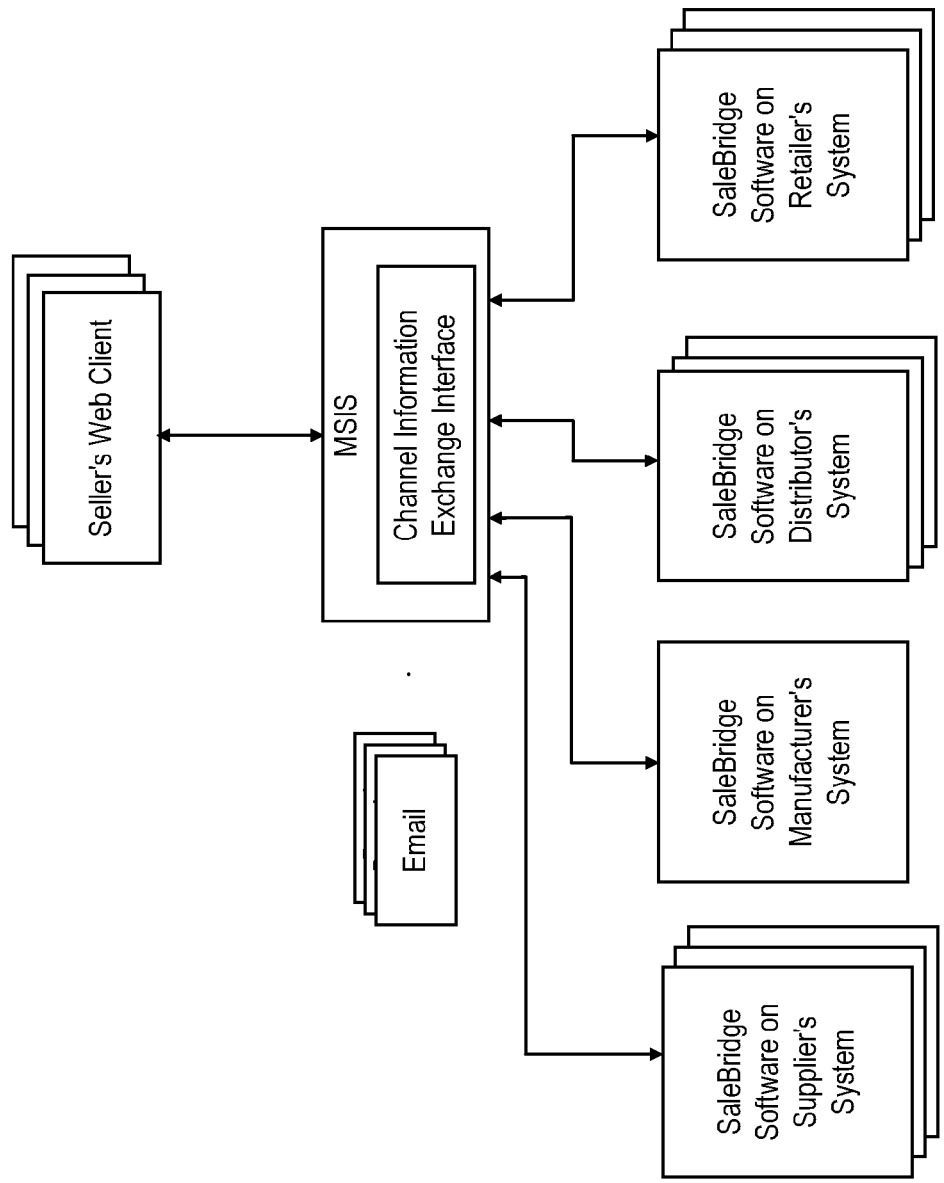
FIG. 29 is a block diagram illustrating channel services offered in accordance with the present invention.
Figure 30:
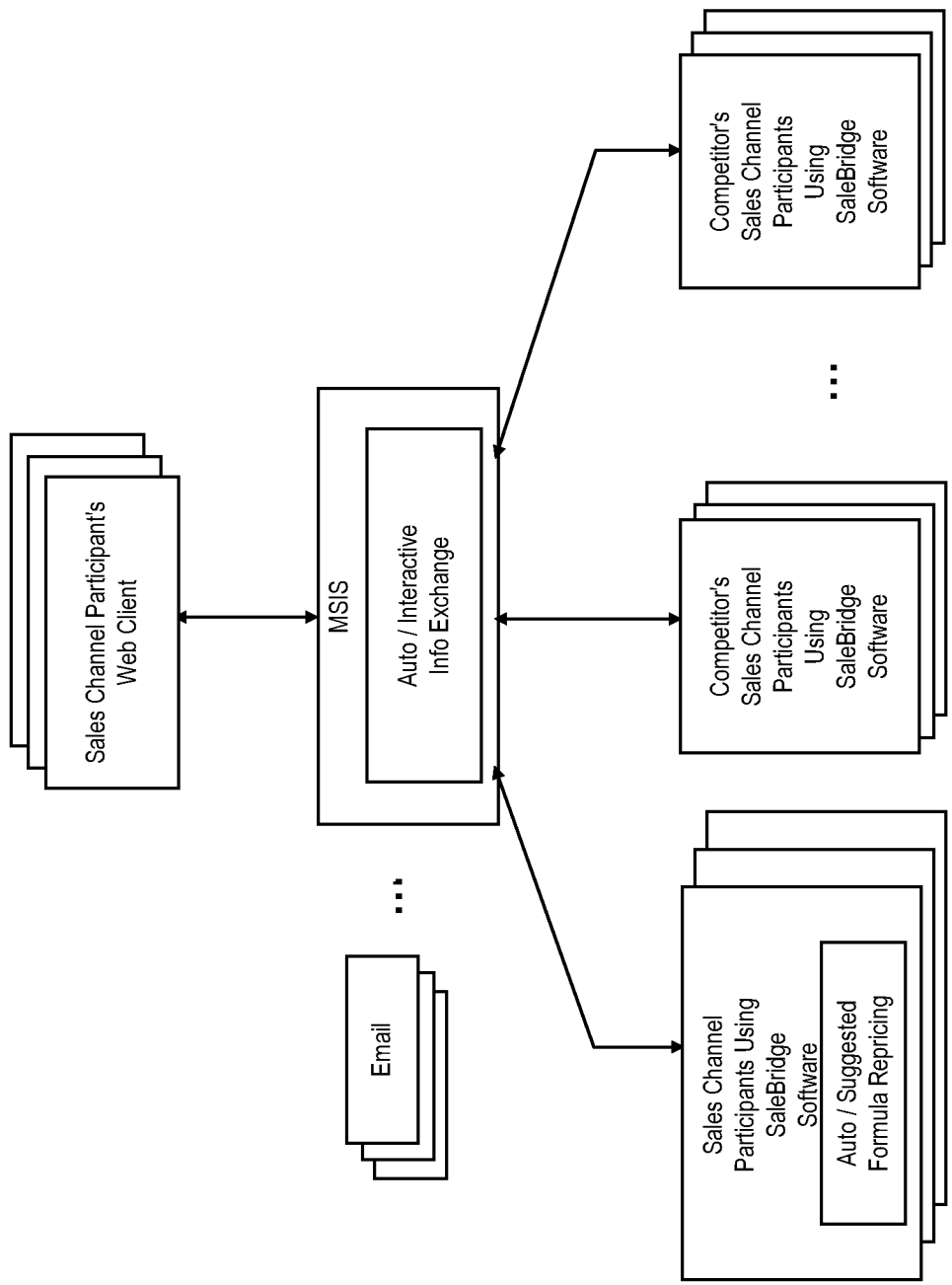
FIG. 30 is a block diagram illustrating channel services offered in accordance with the present invention.

FIGS. 29 and 30 illustrate Supply, Competition & Sales Channel Services ("Channel Services") offered in accordance with the present invention. Each seller's sales system contains complete, real time public and private sales information. The Channel Services will provide each participating seller with access to other participating seller's sales information. For example, in response to manually or automatically generated queries from a seller, the Channel Services instantly deliver public information such as pricing and product descriptions from competing participating sellers. For queries generated within a sales channel (i.e., by a manufacturer and the manufacture's distributors and retailers), private information relating to each product such as inventory, inventory projections, numbers sold, margins, etc., can be instantly exchanged. Such public and private information will also be used by SFA (Sales Force Automation), ERP (Enterprise Resource Planning), and SC (Supply Channel) tool vendors to forecasting inventory, pricing, promotional activities (e.g., instant coupons, auctioning and rebate programs), and production planning, for example.

Figure 31:
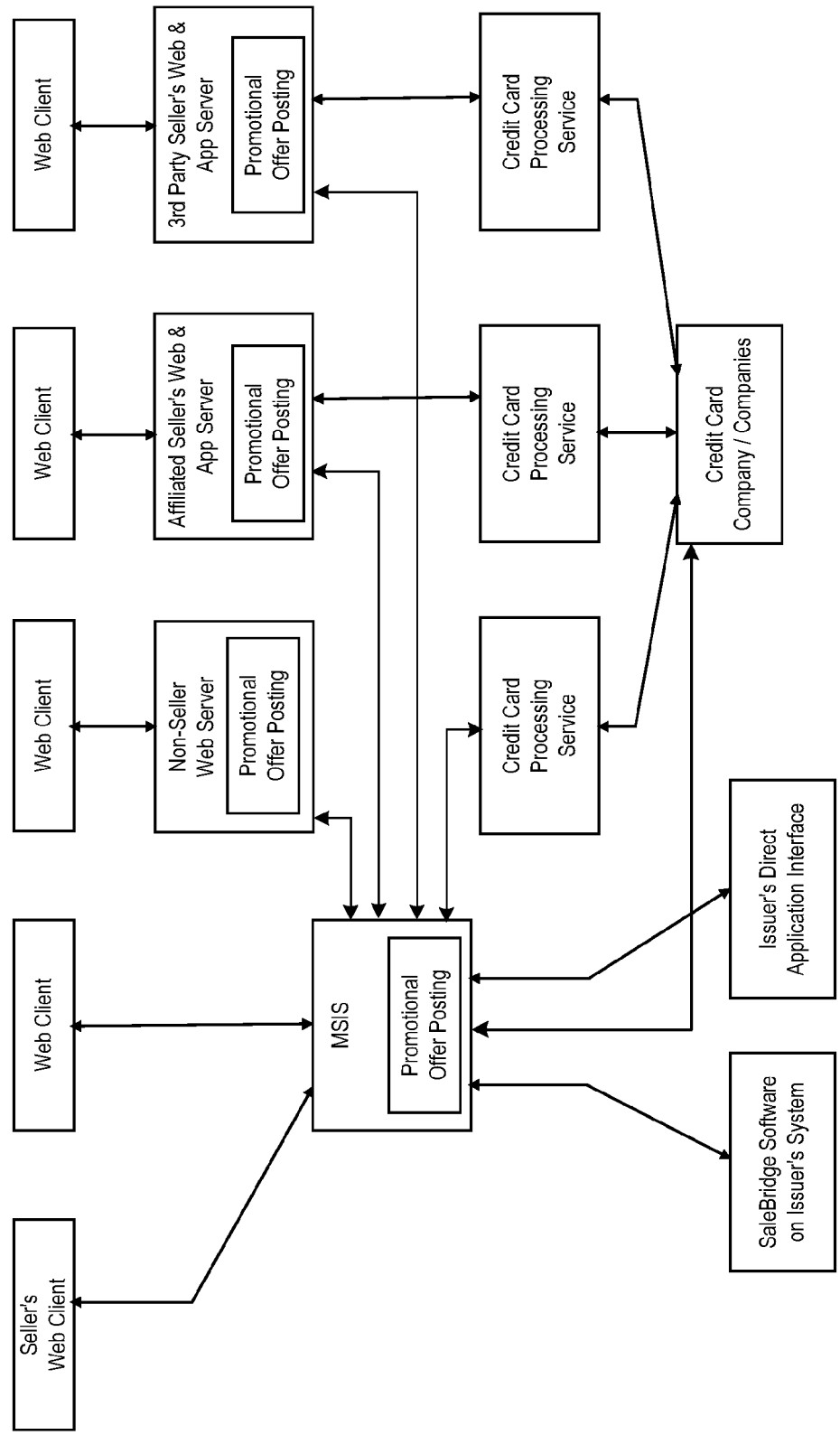
FIG. 31 is a diagram illustrating Sales Promotion Services offered in accordance with the present invention.

FIG. 31 illustrates Sales Promotion Services offered in accordance with the present invention. Using the Sales Promotion Services, a buyer can generate a query from online rebate and coupon information for true instant processing, unlike current online rebate and coupon vendors who incorrectly claim to do the same. Further, queries may be generated from advertising information, e.g., online auction descriptions, online sales brochures, etc., whether or not such information originates within the MSIS.

Figure 32:
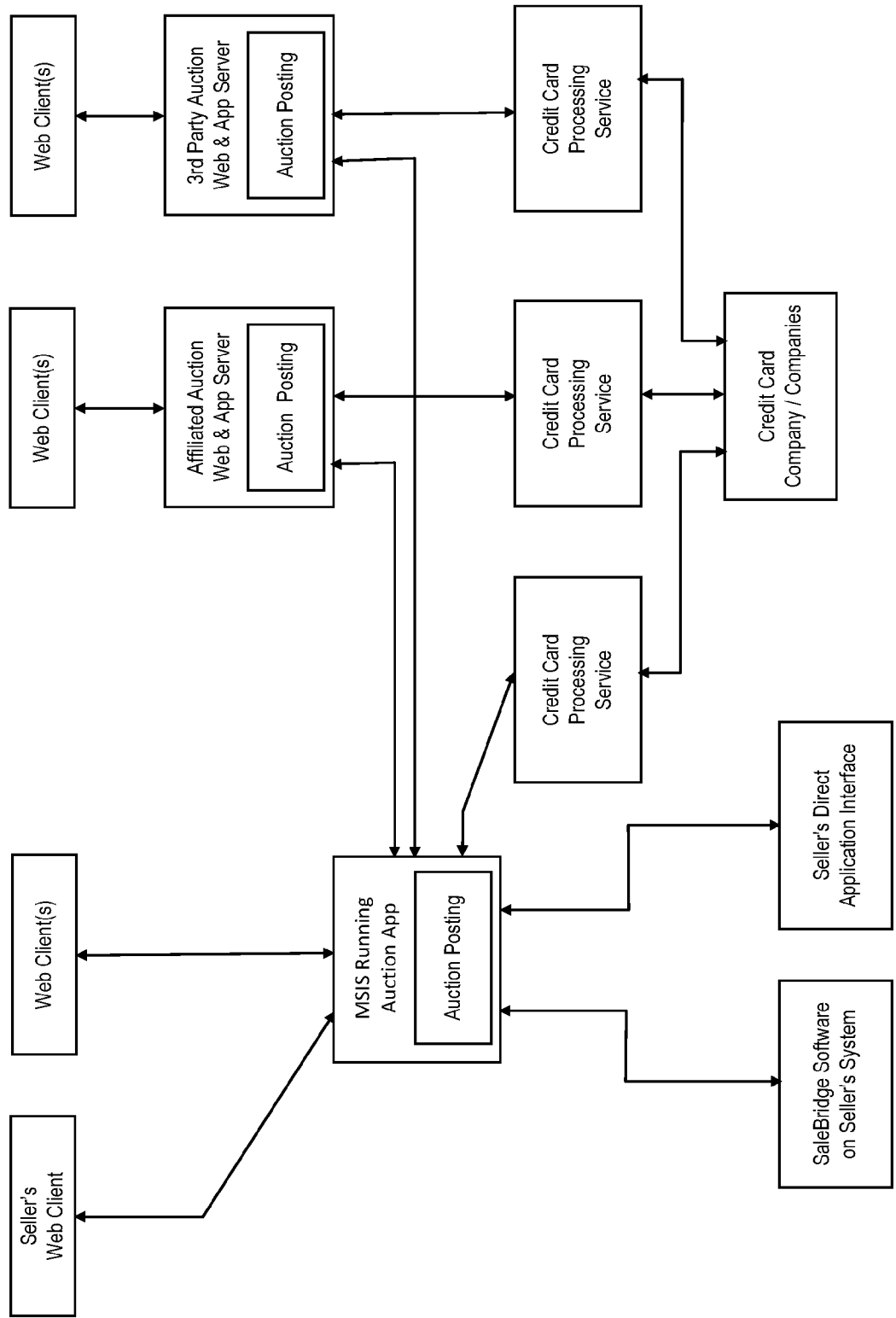
FIG. 32 is a diagram illustrating an auction function offered in accordance with the present invention.

FIG. 32 illustrates an auction function offered in accordance with the present invention. The MSIS supports auctioning of products by one or more Seller's in an environment where a Buyer using a Web Client(s) can make a bid for one or more products put up for auction by a Seller via the Seller's Web Client software. The Sellers typically employ Auction Posting to which Buyers send bids. The MSIS Running Auction Application maintains bids offered by potential Buyers for one or more Auction Postings put up for auction by Sellers. When the Seller selects one or more Buyers to consummate an auction sale, the MSIS makes it possible to execute credit-card based transactions employing the Credit Card Processing Service and one or more Credit Card Companies.

Figure 33:
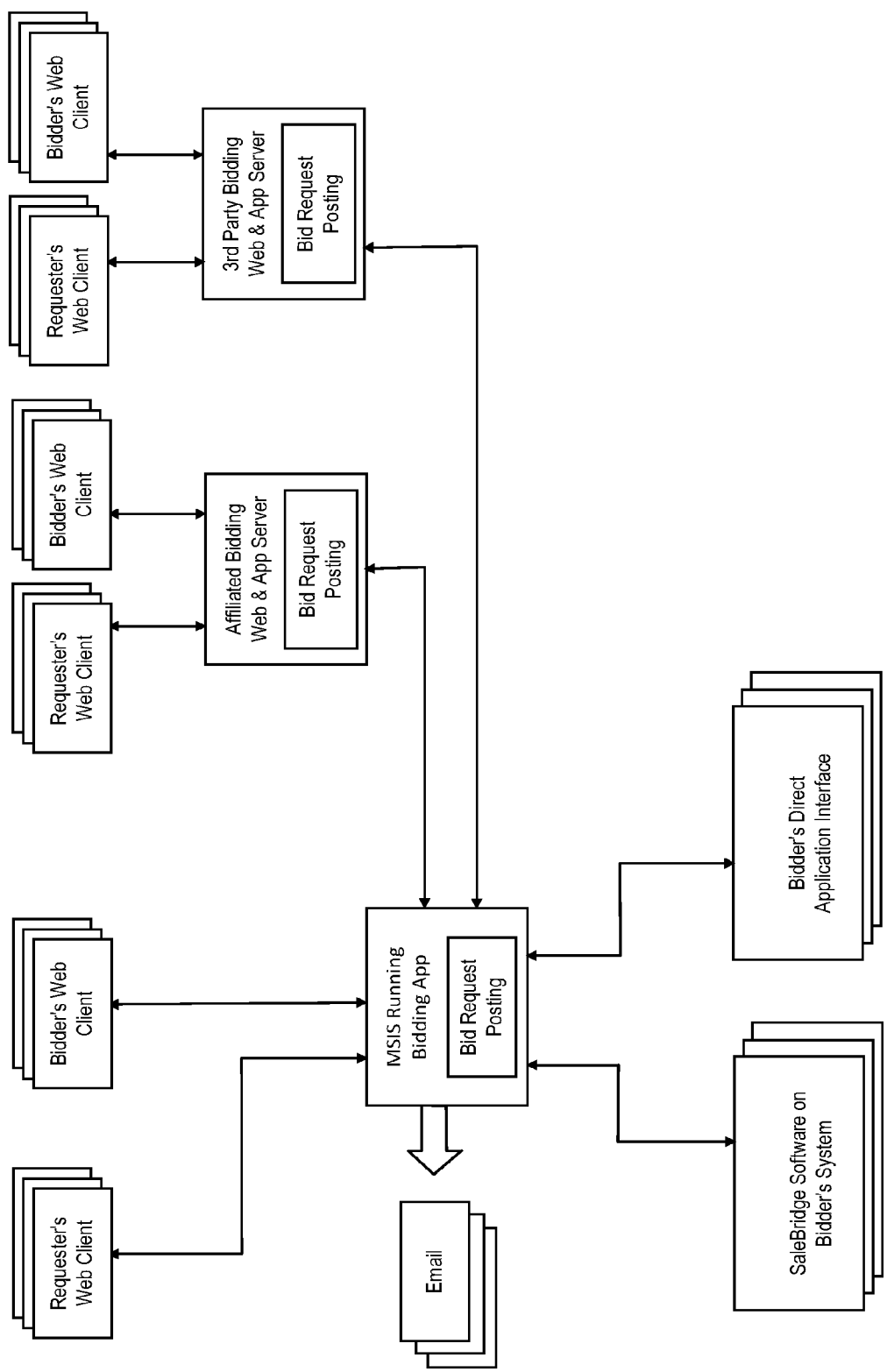
FIG. 33 is a diagram illustrating a Corporate and Government Bidding Service offered in accordance with the present invention.

FIG. 33 illustrates a Corporate and +Government Bidding Service offered in accordance with the present invention. The MSIS can be used as a bid processing system to support bidding by multiple Seller's to meet the requirements of Buyers, typically corporate buyers. The MSIS Running Bidding Application interacts with multiple Sellers who can participate in the bidding process in response to a bid request posting (BRP) from Buyers. Buyers or Requesters can access bidding information on the MSIS via the Requester's Web Client. Using the Bidder's Web Client, Bidders can review or selectively change their bids and also review the status of the BRP.

SalesBridge Software on Bidder's System is employed by the MSIS to interact with the bidder's system and periodically update information on the status on bids. In addition, the inventory of various products available on the bidder's system is selectively accessed by the MSIS via the SaleBridge.

Requesters using a Requester's Web Client and Bidders using a Bidder's Web Client may interact with the MSIS via an Affiliated Bidding Web & App Server, which selectively sends Requests or bids to the MSIS and provides information about them to Requesters and Bidders. Similarly, 3rd Party Bidding Web & App Servers employ the services of the MSIS to save bid-related information and to conduct the bid resolution activities. The various participants in the request and bidding process are periodically informed about the status of the bids via email. When bids are decided and the Requester selects a Bidder, say a lowest bidder, the MSIS facilitates the execution of the transactions to consummate the purchase of the products by the Requester.

In one embodiment, the MSIS automatically provides to the Requester a reference bid that comprises lowest bids for individual products from multiple Bidders, thereby assembling the lowest total bid to be used, whether as a reference or as an actual bid which can be used for purchase by the Requester. Multiple Sellers may be included in such a reference bid. When multiple Bidders are selected by a Requester, where each Bidder supplies part of the Request, the MSIS facilitates the completion of the purchase by the Request from multiple Bidders.

FIG. 34 is a schematic diagram of an Integrated Channel System comprising an Integrated Channel Service Manager, a manufacturer environment comprising an Inventory system, a Pricing system, a Configuration system, and an Order fulfillment system, a Reseller system for Reseller A comprising an inventory system and an order system, a Reseller system for Distributor B comprising a Seller's system, and a Retailer system for Retailer C comprising a Seller's system. In addition, a retailer sales system for Retailer C is also incorporated.

In general, the Integrated Channel Service Manager communicates with SalesBridge Software integrated with individual Seller systems. Specifically, the Integrated Channel Service Manager communicates with the SalesBridge Software installed with each of the Seller systems, namely, the manufacturer environment, Reseller A, Distributor B, and Retailer C.

More specifically, the Integrated Channel Service Manager sends queries related to order status, inventory levels, pricing and product configuration to the manufacturer environment and receives information from the manufacturer environment. It also selectively sends information related to product sales, pricing, inventory, order status, etc. retrieved from Reseller A and Distributor B to the manufacturer environment. In addition, the Integrated Channel Service Manager facilitates the selective exchange of sales, inventory, pricing, configuration, order status, etc. between the manufacturer environment, the Reseller A, Distributor B and Retailer C. Such selective exchange of information between the manufacturer environment, Reseller A and Reseller B occurs via the SalesBridge Software integrated with their respective systems, under the supervision or control of the Integrated Channel Service Manager.

As discussed above, quite often, manufacturers of products employ several distributors, resellers and retailers to sell their products. Often these distributors and retailers have their own internet sales presence and endeavor to sell the manufacturers products on the internet. One of the common problems faced by these distributors and retailers is their inability to assure Buyers of the availability of products, whether the product is coming from their own or the manufacturer's inventory. This causes problems during order fulfillment activities after a Buyer makes a purchase and delay in delivery follows. In general, manufacturers do not have the ability to determine the sales executed by their various retailers and distributors. This causes (the Seller) problems in determining production targets.

These problems are solved by integrating the sales, order fulfillment and manufacturing systems of all sellers in the channel, as shown, for example, in FIG. 34. Such integration is facilitated by the Integrated Channel service Manager and the individual SalesBridge Software incorporated in the software of each of the partners in the channel.

Specifically, in the manufacturing environment, in accordance with the present invention, the sales systems of manufacturers and their distributors is integrated with (a) the order fulfillment systems of the manufacturer and all the resellers and distributors, (b) the inventory management systems of the manufacturer, (c) the pricing systems of the manufacturer(s) and distributors (d) the promotion systems of all Sellers, and (e) the Configuration systems of the manufacturer which may be shared by all the distributors and resellers. This makes it possible to not only provide the ability to fulfill orders for an individual Buyer from multiple sellers (i.e. one or more distributors and manufacturers) but also the ability to incorporate different pricing schemes and promotional schemes in fulfilling the order. In addition, such integration makes it possible to incorporate information about the inventory levels of the manufacturer and distributors in determining the delivery date and shipping costs for the Buyer.

In an environment where a manufacturer is not directly involved, such as in a sales environment incorporating a large master reseller and their distributors and retailers, the sales systems of master resellers and their distributors and retailers is integrated with each Seller's (a) order fulfillment systems, (b) inventory management systems, (c) pricing systems, and (d) promotion systems to accrue the benefits described in the previous paragraph.

Often a Seller, such as a manufacturer, desires to determine the selling price of specific Products being offered for sale by other online Sellers, and their current inventory levels of those Products, especially if the other Sellers are the Seller's own distributors. This, however, is not easy. Such information may be gathered by visiting the online sales sites of various Sellers (distributors) and browsing or executing queries on each of those sales sites to extract pricing information. However, the integration of the sales systems and inventory management systems of the various distributors and retailers of a Product manufacturer makes it possible for the manufacturer to extract pricing and inventory information from the various distributors and retailers. It is also possible for the manufacturer to not only provide the distributors and retailers with a centrally maintained and shared set of product information and marketing collateral, but also provide forecasts of future pricing changes, delivery schedules, manufacturing schedules and inventory levels.

Another benefit of such integration is the ability to control promotions. For example, the integration of sales and inventory systems from multiple sellers such as those of a manufacturer and the manufacturer's distributors and retailers would make it possible to control the flow of promotional offerings (coupons, rebates, etc.) in an automated way that would also permit adjusting the promotional offerings dynamically to meet sales targets. In such an integrated environment, the adjustments of promotional offerings is driven by several parameters, including the volume of sales from the distributors and retailers, the product inventory levels at various shelves and warehouses maintained by the manufacturer and distributors, the shelf life of the products, etc. In the online internet based sales environment, the value of coupons and rebates dispensed to Buyers are thus easily tracked altered dynamically.

The integration of sales systems from multiple sellers, especially the integration of sales systems of manufacturers and their distributors, makes it possible to determine the sale prices for similar products from different retailers and distributors that sell the same family of products from a manufacturer.

The partners of an integrated channel can retrieve configuration related information from the Manufacturer's configuration system, via the Integrated Channel Service Manager. Such information may also be selectively cached by the Integrated Channel Service Manager. The same is true for Pricing information. Similarly, catalogs of products may be maintained by the manufacturer which are then accessed by the resellers, distributors and retailers via the Integrated Channel Service Manager, and optionally directly from the manufacturer environment in coordination with the Integrated Channel Service Manager.

The integration of sales, order fulfillment, inventory management systems, pricing systems and promotion systems from various Selling entities that form a part of a manufacturer's channel organization is achieved by (a) specifying interactions between these systems, (b) identifying information exchange (c) specifying programming interfaces (APIs) and protocols for information exchange and (d) constructing transactional systems that support such interactions based on the protocols.

The interactions between the various systems are expressed as Use-Cases and scenarios. The Use-Cases also capture details of information exchange. Information exchange is typically expressed in terms of business objects such as Quotes, Line Items, Shopping Carts, Prices, Discounts, Orders, Contracts, etc. that are exchanged between systems. The actual transfer of information is carried out in one of two ways: (1) using XML based information structures for transfer of structured data between systems or (2) exchanging references to objects that are saved or instantiated in a common data exchange layer that is accessible to all participating systems.

In one embodiment of the present invention, the Integrated Channel Service Manager is capable of interacting with Seller's systems (manufacturers, resellers, distributors and retailers) employing a SalesBridge Software that is installed on each of the Seller's systems. The SalesBridge Software is used by the Integrated Channel Service Manager to execute queries sent to the Seller's systems from the Integrated Channel Service Manager. The Seller systems of the manufacturers, resellers, distributors and retailers, in response, return shopping carts with prices back to the Integrated Channel Service Manager. In general, the SalesBridge is used by the Integrated Channel Service Manager as a remote database layer that is capable of translating queries received from the Integrated Channel Service Manager into queries and processes that retrieve the requested information, such as configuration, pricing and inventory, from the Seller's Sales and other software.

The Integrated Channel Service Manager includes one or more web server software components with which Buyers' computers interact, one or more Application server software components that provide various Sales services to Buyers accessing them over the internet, and one or more Sales databases that is used to save various kinds of information such as customer profile, saved quotes, product categories, etc.

Among other things, the Integrated Channel Service Manager also supports product category selection, search query formulation, instant coupon and rebate processing, shopping cart comparison, composite shopping cart review, shopping cart pricing and saved quote re-pricing, quote persistence and query persistence, scheduled delivery information from Buyers, customer profile auto transactions, opportunity management and sales agent support, automatic registration of products on behalf of Buyers, and Warranty management. In addition, it also includes a SalesBridge Software interface that makes it possible to interact with the Seller's systems.

The Integrated Channel Service Manager activities include identifying potential Sellers for Buyers based on the Buyer's preferences and the actual inventory levels of the Sellers in the Channel. In addition, it identifies one or more Seller systems in the Channel as potential participants in a sale. Should the Buyer decide to consummate a sale based on the recommendation of Sellers by the Integrated Channel Service Manager, the Seller systems participating in the sale are informed of their role in fulfilling the Buyer's order by the Integrated Channel Service Manager. Subsequently, the order fulfillment systems of the Sellers are queried by the Integrated Channel Service Manager to retrieve order status information on behalf of the Buyer.

The Integrated Channel Service Manager assists Buyers in generating a query for subsequent submission of those queries to Seller's systems. Queries can take the form of old saved quotes or shopping carts, coupons selected, rebates selected, query text, third party shopping carts, sales brochures, persistent queries, etc. The Integrated Channel Service Manager preprocesses Buyer specified queries and delivers them to selected Seller systems that are identified based on one or more search criteria including, in some cases, product categories, customer profiles, inventory levels, pricing information, etc.

When the Seller's systems respond with product and pricing information, for example, with priced shopping carts that include all or a subset of the Buyer's product list, the Integrated Channel Service Manager presents the information to Buyer for interaction with the Buyer. Optionally, such information is presented as a comparison of products and prices.

Typically, if a Buyer's order cannot be fulfilled by one individual Seller, the Integrated Channel Service Manager responds to Buyer's specification of product and pricing selection by interacting with one or more corresponding Seller's systems to complete the sales transactions. Subsequently, the Integrated Channel Service Manager performs post sales functions which selectively include registration, warranties, updates, maintenance contracts, opportunity management etc. Opportunity management is employed to generate additional sales or repeat sales.

In one embodiment, in order to share information in the channel, the Integrated Channel Service Manager provides an information exchange layer that is populated with relevant data extracted from each of the participants in the Integrated Channel. Such information is later accessed by other participants under the control and coordination of the Integrated Channel Service Manager. The information exchange layer is implemented using an object-oriented database, objects of information being transferred to or retrieved from the participants of an Integrated Channel as XML based structured data. In another embodiment, the information exchange layer maintained by the Integrated Channel Service Manager is an object-oriented layer of software and associated processing software implemented over a relational database.

The Integrated Channel Service Manager thus makes it possible to provide a Buyer with a quote for the set of products the Buyer desires, the quote being assembled from information extracted from one or more participants of the Integrated Channel System and including products and prices provided by one or more of such participants. When such a quote is found acceptable by the Buyer and the Buyer places an order based on the quote provided, the Integrated Channel Service Manager disassembles the quote to provide relevant portions of the quote to the actual participant selling the product to the Buyer as sub-quotes, and then forwards the sub-quotes to the participants involved. The Integrated Channel Service Manager selectively, when required, executes credit card processing to execute a single sales transaction for the Buyer that covers all of the sub-quotes, and thus stands in and executes sales transactions on behalf of all the participants. In addition, order status information is retrieved, as necessary and when required, to enable the Buyer to follow-up on the order placed.

FIG. 35 is a schematic diagram of an Integrated Channel System comprising an Integrated Channel Service Manager and a manufacturer environment. The manufacturer environment comprises a data warehouse, a data mining system, and a SalesBridge Software component, a Pricing system and an Order fulfillment system (and other Configuration and Inventory Systems not shown). The Integrated Channel System further comprises a Reseller system for Reseller A comprising an inventory system and an order system, a Reseller system for Distributor B comprising a Seller's system, and a Retailer system for Retailer C comprising a Seller's system.

In general, the Integrated Channel Service Manager communicates with SalesBridge Software integrated with individual Seller systems. Specifically, the Integrated Channel Service Manager communicates with the SalesBridge Software installed with each of the Seller systems, namely, the manufacturer environment, Reseller A, Distributor B, and Retailer C.

More specifically, the Integrated Channel Service Manager sends queries related to order status, inventory levels, pricing and product configuration to the manufacturer environment and receives information from the manufacturer environment. It also selectively sends information related to product sales, pricing, inventory, order status, etc. retrieved from Reseller A and Distributor B to the manufacturer environment. In addition, the Integrated Channel Service Manager facilitates the selective exchange of sales, inventory, pricing, configuration, order status, etc. between the manufacturer environment, the Reseller A, Distributor B and Retailer C. Such selective exchange of information between the manufacturer environment, Reseller A, Distributor B and Retailer C occurs via the SalesBridge Software integrated with their respective systems, under the supervision or control of the Integrated Channel Service Manager.

As discussed above, quite often, manufacturers of products employ several distributors, resellers and retailers to sell their products. Often these distributors and retailers have their own internet sales presence and endeavor to sell the manufacturers' products on the internet. One of the common problems faced by these distributors and retailers is their inability to assure Buyers of the availability of products, whether the product is coming from their own or the manufacturer's inventory. This causes problems during order fulfillment activities after a Buyer makes a purchase and delay in delivery follows. In general, manufacturers do not have the ability to determine the sales executed by their various retailers and distributors. This causes (the Seller) problems in determining production targets.

These problems are solved by integrating the sales, order fulfillment and manufacturing systems of all sellers in the channel, as shown, for example in FIG. 35. Such integration is facilitated by the Integrated Channel Service Manager and the individual SalesBridge Software incorporated in the software of each of the partners in the channel.

SalesBridge Software, in addition to facilitating sales transactions and providing a querying interface, also provides support for the following services:
  Mapping tool
  Data Warehousing
  Data Mining As sales software and the ERP market becomes more mature, a critical need arises for tools that allow two communicating systems to query each other and selectively exchange data. An obvious example of this is the scenario where a company is using SAP as their back-office system, and wishes to make it interact with the SalesBridge Software. An overriding concern for customers will probably be SalesBridge integration with their current system. The front office suite (e.g., Multi Seller Interface System (MSIS>> or the Integrated Channel System would need to be able to send quotes, configurations, pricing details, etc. to a seller having SAP for order fulfillment, inventory and manufacturing. The main point of integration then becomes the data exchange that needs to take place: The SalesBridge Software translates its quote object and its configuration object into the details the SAP system needs, and sends those details to the SAP database. In addition, the SalesBridge Software translates queries sent by the Integrated Channel System or MSIS into queries that can be executed on the databases or back-office systems available at the Seller (e.g., the manufacturer, reseller, distributor or retailer).

SalesBridge MapTool (or simply MapTool) is a data mapping system or tool. It consists of the three pieces mentioned above:

a) a GUI and programmatic events that allow a consultant to map SalesBridge objects to/from fields and tables in a foreign database;

b) a data transfer engine which (at run time) connects to the foreign database and allows the actual transfer of information between the two systems; and c) a report kit that provides reporting functionality.

In addition, the SalesBridge Software makes use of some of the artifacts captured by the SalesBridge MapTool to extract information, save information and to modify information, as necessary, in the database or associated software systems at the Seller's environment.

Details of the Mapping Activity

The mapping between the Seller's database or run-time systems and the SalesBridge component is performed as follows:

1 The MapTool, using JDBC or ODBC (or JDBC/ODBC) based programming api's, interacts with the foreign database (Seller's database) and retrieves schema information using Seller provided username and passwords.

2 The MapTool accesses SalesBridge metadata information from the SalesBridge Software (or retrieves them from the MSIS system) to identify mapping requirements.

3 The MapTool facilitates the creation of mapping information for mapping the SalesBridge metadata to the Seller's database.

4 It also identifies mapping necessary but not possible, so that it may be remedied Via additional tables created in the Seller's and or SalesBridge environment.

5 It also facilitates identification of metadata mapping that is to be supported by programmatically creating mapping code components.

Once the mapping is created, it is saved in the SalesBridge component at the Seller's environment.

Mapping is used, for example, for all the following types of information handled by the SalesBridge Software:

Inventory
Product Information
Configuration
Pricing
Supplier Related Information
Promotional Information
Order Fulfillment
Transaction Completion (Credit Card Info, etc.)
Order Status
Shipping
Billing
Other . . . .

While SalesBridge enables the Seller to execute sales, inventory and other related activities, it is desirable to facilitate the collection, processing and archival of such information over time in a Data Warehouse. The SalesBridge Software, via its MapTool, makes it possible to not only map sales, inventory and other related information into a Data Warehouse, but also makes it possible to populate such a Data Warehouse with relevant information at run-time. This enables the SalesBridge Software to act as an interface to the Data Warehouse for other systems on an Integrated Channel System or an MSIS system.

Thus, SalesBridge Data Warehouse capabilities include:

Providing a means of creating a mapping between sales, inventory and other related information and a data warehouse.

Providing means to save such mapping information in the SaleBridge.

Providing the means to selectively populate such a Data Warehouse at nm-time.

Providing means to retrieve information from the Data Warehouse using the SalesBridge querying interface as well as by a special Data Warehouse service. Additionally, the SalesBridge Software can be installed with its own Data Warehouse so as to provide warehousing services to the Seller.

Data Mining is supported by SalesBridge by providing an ad hoc querying interface to a Data Warehouse that is populated. Such ad hoc querying interface makes it possible for other managers of information in the Integrated Channel system or at the Seller's environment to extract information to enhance their decision making capabilities. In addition, third party decision support systems are provided an interface to interact with the Data Mining service.

The partners of an integrated channel can perform Data Mining transactions and retrieve configuration, pricing, different types of forecasts, sales, marketing, and other related information from the Manufacturer's Data Warehouse using the Data Mining tool. The access to such information is coordinated by the Integrated Channel Service Manager. Such information may also be selectively cached by the Integrated Channel Service Manager. The same is true for access to archived information maintained by the manufacturer at the Data Warehouse. Similarly, statistical information on products and sales may be maintained by the manufacturer which is then accessed by resellers, distributors and retailers via the Integrated Channel Service Manager, the SalesBridge Software and the Data Mining Tool. Optionally, a reseller or retailer can directly access such information from the manufacturer environment by interacting with the SalesBridge Software in coordination with the Integrated Channel Service Manager.

The integration of a Data Warehouse and Data Mining tool that forms a part of a manufacturer's channel organization is achieved by a) specifying interactions between these systems and the SalesBridge, b) identifying information exchange, c) specifying programming interfaces (APIs) and protocols for information exchange between these systems and the SalesBridge; and d) constructing transactional systems that support such interactions based on the protocols.

The interactions between the various systems are expressed as Use-Cases and scenarios. The Use-Cases also capture details of information exchange. Information exchange is typically expressed in terms of business objects such as Quotes, Line Items, Shopping Carts, Prices, Discounts, Orders, Contracts, etc. that are exchanged between systems. The actual transfer of information is carried out in one of several ways: a) using XML based information structures for transfer of structured data between these systems and the SalesBridge Software, b) exchanging references to objects that are saved or instantiated in a common data exchange layer that is accessible to all participating systems, c) providing a query interface on the Data warehouse and the Data Mining tool that is accessed by the SalesBridge Software, or d) providing a set of application programming interfaces using programs written to enable the SalesBridge Software to interact with the Data Warehouse and the Data Mining tool.

The SalesBridge Software is used by the Integrated Channel Service Manager to execute Data Mining queries sent to the Seller's systems from the Integrated Channel Service Manager or from other resellers and retailers in the Channel. The Seller's systems of the manufacturers, resellers, distributors and retailers, in response, return the retrieved information, if any, back to the Integrated Channel Service Manager or to the Seller that sent the query. In general, the SalesBridge Software is used by the Integrated Channel Service Manager as a remote database layer that is capable of translating queries received from the Integrated Channel Service Manager into queries and processes that retrieve the requested information from the Data Mining tool or directly from the Data Warehouse.

The SalesBridge Software is used to populate data into the Data Warehouse, either directly or via a pipeline of processing software that massages the data before entering it into the Data Warehouse.

FIG. 36 is a perspective diagram of an online buyer using a computer 3605 interacting with a server 3620, via the Internet 3610, to specify products that are to be purchased periodically, to selectively save the specification of products that are to be purchased periodically in a Script Storage and Execution Environment 3615, and to selectively retrieve previously saved specification of products from the Script Storage and Execution Environment 3615 for modification or for purchasing. The Script Storage and Execution Environment 3615 is typically associated with a web server 3620 that provides internet-based web hosting services. In addition, the Script Storage and Execution Environment 3615 is linked via appropriate connections 3645, 3655 to information systems at one or more manufacturer or merchant environments 3625, 3627. Such information systems include appropriate internet web hosting services.

In one embodiment of the present invention, customers to the web server 3620 are presented with lists of products extracted from one or more catalogs or from one or more web content providers such as manufacturers 3625, 3627. If the customer selects one or more products from the catalogs or list of products provided by the web server 3620, the customer is provided with the option of either purchasing the products selected, saving a selection of products, preferably as a script, or purchasing as well as saving the selection of products. The customer is also provided with the option of downloading the selection of products as a script that can be used to purchase those products at a future time.

If the customer chooses to save the selection of products for subsequent retrieval and purchase, the web server 3620 saves it as a script in the Script Storage and Execution Environment 3615. Subsequently, the customer can establish a new session with the web server 3620 to request execution of the saved script by the Script Storage and Execution Environment 3615 resulting in the purchase of the product. Alternatively, the customer can send an email from the customer's computer 3605 to the Script Storage and Execution Environment 3615 over the link 3647 or via the Internet 3610 requesting execution of one or more previously saved scripts. In response, the Script Storage and Execution Environment 3615 retrieves the saved scripts for the customer and executes the scripts. It also creates a report including the results from the execution of the scripts and sends it to the customer as an acknowledgement.

If the customer elects to interactively purchase the selected products from the web server 3620, the customer can consummate the purchase by using a credit card for payment or by accessing a previously established customer account. The customer is then given the option of saving the details of the online sales transactions, including the credit card information or customer account used for the sale, for a repetition of the sales transaction on another occasion. The customer can selectively retrieve saved sales transaction information in the form of scripts of structured data, and download it to the customer's computer 3605.

The web server 3620 is used by customers to create customer profiles. A customer profile includes shipping address, credit card related information, etc. Once a customer profile is created, it is used to expedite subsequent customer purchases. Customers who choose not to have a profile created for them may be required to enter their shipping address, credit card related information, etc., during each purchasing activity.

Customer profiles, typically provided by customers during a customer profile generation activity, are selectively saved by the web server 3620 so that they may be used during the execution of a saved sales transaction script. Such saved customer profiles are then used to complete sales transactions and to ship products after executing saved scripts.

Products are located for purchase either by browsing through several categories of products presented by the web server 3620 or by searching for them. In one embodiment of the present invention, a customer, using the computer 3605, and the Internet connection 3630, accesses one or more catalogs presented by the web server environment 3620 associated with, and operatively coupled to the Script Storage and Execution Environment 3615. The customer then activates a purchase button to purchase the products selected. In response, the web server 3620 creates a transaction script and communicates the transaction script to the Script Storage and Execution Environment 3615 via connection 3640. The Script Storage and Execution Environment 3615 completes a purchase order for the customer incorporating all the products selected by the customer and optionally applying all applicable rebates and coupons, based on the transaction script. Also, based on the transaction script, it performs order fulfillment operations aimed at assigning products from the inventory of one or more manufacturers 3625, 3627 (or retailers or distributors, not shown) to the customer.

In one embodiment, the inventory of some of the products purchasable from the web server 3620 are selectively maintained by the manufacturer/merchant environment 3625. For such products, to perform order fulfillment activities, the Script Storage and Execution Environment 3615 interacts with the manufacturer/merchant environment 3625, over the connection 3645, in one of two approaches. In the first approach, the manufacturer/merchant environment 3625 receives purchase orders or purchase order scripts to some products currently available in their inventory from the Script Storage and Execution Environment 3615, in order to perform order fulfillment for the customer. The manufacturer/merchant environment 3625 executes the received script or processes the purchase order to perform order fulfillment. To provide the customer profile to the manufacturer/merchant environment, the customer's profile or a subset thereof, is made visible or is sent to the manufacturer/merchant environment 3625, which then ships the products to the customer. In a second approach, the Script Storage and Execution Environment 3615 executes the script representing the customer's sales transaction in its environment and interacts with the manufacturer/merchant environment 3625 to retrieve order fulfillment information and to convey shipping information.

In addition to sales transaction scripts, customers may create order status scripts, report generation scripts, etc. and save them in the Script Storage and Execution Environment 3615. Such scripts may subsequently be executed at the web server. They may also be sent to the manufacturer environment 3625 for execution. The manufacturer environment 3625 can be made capable of executing scripts by incorporating an instance of the Script Storage and Execution Environment 3615 within its environment.

In another embodiment, the manufacturer 3625 is capable of saving and or executing saved sales transaction scripts or other scripts sent to it by the web server 3620. Such scripts are executed by the manufacturer environment 3625, and the results of the execution are selectively communicated to the web server 3620 and to the customer using the computer 3605.

Customers can create and save scripts at the Script Storage and Execution Environment 3615 specifying their preferred vendor list, product preferences, accounting preferences, payment methods, reporting preferences, etc. Such scripts are subsequently accessed by the Script Storage and Execution Environment 3615 during the execution of sales transaction scripts.

In one embodiment, the web server 3620 serves as a front end to the e-commerce sites of manufacturers and merchants wherein customers purchase products from the web server 3620 and pay for the products purchased via credit cards. The web server 3620 in turn acquires the products purchased by the customer from customer designated suppliers (via scripts) such as manufacturers, distributors or retail merchants. A supplier is selected based on customer's profile, the saved scripts indicating the customer's preferred vendor list, the product category, the inventories of products at the various suppliers, the business arrangements made by the customers or by the owners of the web server 3620 with various suppliers, and other criteria. In effect, one or more suppliers sells the products to the web server 3620 which uses the Script Storage and Execution Environment 3615 to execute the sales transactions and to save such sales transactions information.

In one embodiment, the web server 3620 sends promotional material via email to customers and attaches a script associated with the purchase of the products being promoted. The customer selectively edits the attached script and emails it back to the web server 3620. The web server 3620 selectively forwards the received script attachments to the Script Storage and Execution Environment 3615 for execution. The Script Storage and Execution Environment 3615 selectively executes the scripts and collects the results of the execution to the web server 3620 and to the customer.

In a similar embodiment, the customer sends an email to an email address associated with the web server 3620. The email includes a script that extracts product and pricing information from the web server 3620 and specifies a destination for the extracted information. The web server 3620 receives the email and the script via the associated email address, forwards the script to the Script Storage and Execution Environment 3615, and sends an acknowledgement email to the customer. The Script Storage and Execution Environment 3615 executes the script received from the customer and extracts the required information and forwards it to the destination specified by the customer in the script.

In one embodiment of the present invention, the script executed by the Script Storage and Execution Environment 3615 comprises one or more of the commands supported by the PANINI Language presented in the Appendix A. In this embodiment, customers email scripts written in the PANINI Language to the web server 3620 or directly to the Script Storage and Execution Environment 3615 for execution. In addition, the web server 3620 creates scripts in the PANINI language specifying sales transactions from online customers and sends it to the Script Storage and Execution Environment 3615 for execution.

In another embodiment of the present invention, a scripting language other than the PANINI language is employed by customers, the web server 3620 and the Script Storage and Execution Environment 3615. The Script Storage and Execution Environment may be incorporated into the web server 3620 or into a manufacturer's environment 3625, 3627.

FIG. 37 is a diagram showing the incorporation of a Script Storage and Execution Environment 3745 into both a web server 3720 and a manufacturer/merchant environment 3725. The web server 3720 downloads scripts (of different kinds) to the manufacturer/merchant environment 3725, as needed, and requests the manufacturer/merchant environment 3725 to execute them. The manufacturer/merchant environment 3725 saves the downloaded scripts in its Script Storage and Execution Environment 3745 and executes the required scripts as necessary. For example, it executes scripts under the direction of the Script Storage and Execution Environment 3745, in response to events during computation of certain services provided by the manufacturer/merchant environment 3725, or in response to requests received from the customer's computer 3725A via link 3750 or 3730. The scripts saved in the manufacturer/merchant environment 3725 can be selectively updated by the Script Storage and Execution Environment 3745 when better or newer versions of the scripts become available. Customers can send requests directly to the manufacturer/merchant environment 3725 and to the Script Storage and Execution Environment 3745 as email based scripts. In addition, they can also send requests via GUI based interactions with web servers, such as web server 3720.

FIG. 38 is a block diagram showing the different functional components of a web server environment 3800 that facilitates email and script based sales transactions. The web server environment 3800 comprises a script saving and execution engine 3805, a manufacturer/merchant interface 3810, an app server interface 3815, an email server interface 3835, an RMI interface 3820, an HTTP interface 3825, a catalog interface 3830, and a database interface 3840. Other interfaces may also be incorporated into the web server environment 3800.

The script saving and execution engine 3805 is used to execute scripts received from customers, manufacturers, merchants and those retrieved from script repository such as a database. The email server interface 3835 is used to retrieve scripts sent as email from customers, manufacturers, and merchants. It is also used to send email to customers, manufacturers, and merchants along with attachments of scripts or reports. The email server interface 3835 provides an interface that is used to communicate with mail servers such as SMTP servers, POP mail servers and IMAP servers.

FIG. 39 is a block diagram of a scripting execution environment 3900 that provides access to various resources and information via appropriate interfaces during the execution of scripts. The Scripting Execution Environment 3900 comprises a script execution engine 3920, a script saving unit 3910, an order fulfillment manager 3975, an authentication manager 3905, a catalog manager 3980, a customer profile manager 3915, a pricing manager 3970, a search engine 3985, a tracking manager 3925, a statistics reporting manager 3935, and other related functionality 3930. The various managers provide a mechanism to access associated services during the execution of scripts by the script execution engine 3920 within the scripting execution environment 3900.

Online customers 3950 interact with the scripting execution environment 3900 via communication links 3955. Online customers 3950 can download scripts from the scripting execution environment 3900. They can also communicate scripts to the scripting execution environment 3900 for execution. Similarly, manufacturers and online merchant environments 3960 interact with the scripting execution environment 3900 via communication links 3965.

FIG. 40 is a perspective diagram of an online customer using a computer 4005 interacting with an online sales and pricing system 4015, via the Internet 4010, to conduct online purchases during which the pricing computation employs, among other things, the customer's schedule of product delivery, the forecasts of product prices provided by online futures trading systems and the projected needs of the customer. The online sales and pricing system 4015 is typically associated with a web server 4020 that provides internet-based web hosting services. In addition, the online sales and pricing system 4015 is linked via appropriate connections 4045 to information systems at one or more online futures trading system 4025. Such information systems include appropriate internet web hosting services.

Customers are presented with a catalog of products to choose from by the web server 4020 associates with the online sales and pricing system 4015, when they visit the online sales and pricing system 4015. If the customer selects one or more products from the catalog or list of products available at the online sales and pricing system 4015, they are provided with the option of purchasing the products.

If the customer elects to purchase the selected products from the online sales and pricing system 4015, all applicable rebates and coupons are applied to the customer's purchases by the online sales and pricing system 4015 in the determination of a final purchase price for the customer. The customer can consummate the purchase by using a credit card for payment. The online sales and pricing system 4015 processes customer's credit cards for sales processing. Corporate customers are allowed to open an account with the online sales and pricing system 4015 that will permit them to purchase products online and settle their accounts periodically.

Customer profiles, typically provided by customers during a customer profile generation activity, is selectively used by the online sales and pricing system 4015 to complete sales transactions and to ship products. Customer profile includes shipping address, credit card related information, etc. Once a customer profile is created, it is used to expedite subsequent customer purchases. Customers who choose not to have a profile created for them may be required to enter their shipping address, credit card related information, etc. during each purchasing activity.

In one embodiment of the present invention, a customer, using the computer 4005, and the Internet connection 4030, accesses one or more catalogs presented by a server environment 4020 associated with and connectively coupled to, the online sales and pricing system 4015. In this embodiment, the customer would optionally retrieve product information on one or more products that the customer plans to purchase by browsing through several categories of products presented by the online sales and pricing system 4015. The customer then activates a purchase button to purchase the products selected. The online sales and pricing system 4015 completes a quote containing a price for the customer incorporating all the products selected by the customer and optionally applying all applicable rebates and coupons. If the customer agrees to the quote, the quote is converted into a purchase order for the customer.

The quote and the purchase order would therefore include prices that are determined by incorporating the schedule of delivery optionally provided by the customer. The computation of the prices for the products would also involve information on the forecasted prices for the products acquired from one or more online futures trading systems. For some products, such forecasted pricing information is accessed from the manufacturers.

In one embodiment, forecasted pricing information for both the short-term and the long-term of some of the products purchasable from the online sales and pricing system 4015 are selectively maintained by the online futures trading system 4025. For such products, to perform pricing activities, the online sales and pricing system 4015 interacts with the online futures trading system 4025, over the connection 4045, in one of two approaches. In the first approach, the online futures trading system 4025 receives a list of products from the online sales and pricing system 4015 in order to provide futures related forecasted prices. The online futures trading system 4025 then returns the forecasted prices to the online sales and pricing system 4015. The returned forecasted prices are used by online sales and pricing system 4015 in determining the prices for the products purchased by the customer.

In the second approach, the online sales and pricing system 4015 requests live data (or periodically delivered data) on various products from one or more futures trading systems and processes such received futures related information in order to calculate the product prices for the quotes and purchase orders of online customers.

The determination of the total purchase order price involves identification of delivery schedules for each of the products on the purchase order and the calculation of prices for those products using the forecasted prices derived from futures information provided by the online futures trading systems. In forecasting the price of a product in the future, sources of information other than online future trading systems may also be selectively employed.

In one embodiment, the online sales and pricing system 4015 serves as a front end to the e-commerce sites of manufacturers and merchants wherein customers purchase products from the online sales and pricing system 4015 and reimburse it, say via credit cards, for the products purchased online. The online sales and pricing system 4015 in turn acquires the products purchased by the customer from designated suppliers such as manufacturers, distributors or retail merchants. A supplier is selected based on the product category, the inventories of products at the various suppliers, the business arrangements made with various suppliers and other criteria. In effect, the supplier sells the products to the online sales and pricing system 4015 which ensures the pricing of products in a customer's purchase order based on their delivery schedules and the forecasted prices for the various products. The online sales and pricing system 4015 selectively charges the suppliers a transaction fee for generating their business. The customer is also selectively made to pay a service charge to the online sales and pricing system 4015 for its services.

To submit online information on forecasted prices of products to the online sales and pricing system 4015 so that they can be used to determine purchase prices for customers, one or more online futures trading systems 4025 establish connections 4055 with the online sales and pricing system 4015. In some embodiments, the connection 4055 is the internet.

FIG. 41 is a diagram showing the various inputs and outputs of the online sales and pricing system 4015. The online sales and pricing system 4015 receives Shopping Cart and Delivery Schedule 4105 and, in response, returns a Quote 4110 containing the prices for various products. In addition, it optionally receives Customer's Schedule Changes 4115 from customers subsequent to a sale and, in response, it returns Pricing Updates to Quote 4120. It also receives scheduled and unscheduled Forecasted Prices 4125 from various sources such as future trading systems and market research firms. Future trading systems typically provide information on various commodities markets and forecasts of prices of various products from those markets. Market research firms such as Gartner Group, Forester Research, etc. provide periodic research reports on various technologies and products. In order to selectively provide automatic refunds to customers when the actual costs of products previously purchased by customers is considerably below the purchasing price paid for by the customer via an initial quote, the online sales and pricing system 4015 returns selective Refunds to Customers 4130.

FIG. 42 shows various forms of product price forecasting information received by the online sales and pricing system 4015 from pricing forecasting systems such as futures trading systems, commodity trading organizations, market research institutions, manufacturers, etc. Price forecasting information may be received as a table of forecasted product prices 4205, as a graph 4215 showing quarterly variation in product prices, or as a graph showing trends 4210 such as the graph depicting an exemplary technology adoption process.

The online sales and pricing system 4015 of FIG. 40 may receive pricing forecasts categorized by geographic region where they apply. Some of the pricing forecast information presented to the online sales and pricing system 4015 from information providers such as the online futures trading system 4025 may selectively be encrypted for subsequent decryption and processing by the online sales and pricing system 4015.

In general, pricing quotes for products purchase and the price forecasts that they are based on may be selectively saved by customers for subsequent processing. The online futures trading system 4025 may choose not to honor coupons that have expired.

In another embodiment, the pricing and forecasting information dispensed by information providers such as the online futures trading system 4025 and received by the online sales and pricing system 4015 is generated in eXentisible Manipulation Language (XML) format. Such XML formatted forecasting information sent by the online futures trading system 4025 is processed by the online sales and pricing system 4015.

FIG. 43 is a block diagram showing exemplary components of the online sales and pricing system 4015 of FIG. 40. The online sales and pricing system 4015 includes a browsable catalog 4380 through which customers can select one or more products for purchasing, a search engine 4385 for searching for specific products based on one or more criteria, an Authentication Manager 4305 for verifying the authenticity of customer account information, and a Delivery Manager 4310 which manages the delivery of products to the customer based on the customer's schedule of delivery, and a Quote Generator 4320 that generates quotes for the customer employing product prices generated by a Pricing Manager 4370. It also includes a Customer Profile Manager 4315 which is used to gather profile information of customers and an optional Tracking Manager 4325 that is used to track user buying patterns over a long term. An optional Statistics Reporting Unit 4335 selectively provides various statistical information and pricing related forecast information to customers periodically or on-demand.

When customers decide to purchase products from the online sales and pricing system 4015, the pricing manager 4370 provides pricing functionality that incorporates calculation of prices based on several factors including the customer's schedule of product delivery and the forecast of prices provided by pricing forecast providers 4360. The pricing manager 4370 also includes a credit card processing unit that processes customer sales that are based on credit cards, and a pricer database employed to store pricing related data. An order fulfillment manager 4375 provides information on available inventory of products. If a product purchased by a customer is not in stock or not stored locally at the online sales and pricing system 4015, the order fulfillment manager 4375 makes it possible to purchase that product from the manufacturer, distributors or merchants. Such purchases are done in one of two ways—seamlessly where the customer does not realize that the product is being acquired from a manufacturer or merchant, or explicitly where the customer is aware of the participation of a manufacturer or merchant in the fulfillment of his purchase order.

Online Customers 4350 access the online sales and pricing system 4015 over the connection 4355. They can browse through the online browsable catalog of products and services 4380 or search for a specific product or service based on criteria such as product category, geographical region, brand names, etc. Pricing forecast providers 4360 access the online sales and pricing system 4015 over the connection 4395.

In a similar embodiment of the present invention, quote generation is performed by the electronic commerce software of a manufacturer or online merchant to which a customer migrates to from the browsable indexed coupon selection software, along with a shopping cart with one or more selected products, a delivery schedule for the products, and forecasted prices for the products corresponding with their delivery schedule. This implies that a customer can consummate. a purchase of a product at a merchant or manufacturer's e-commerce site following the selection of products from the online sales and pricing system 4015 and subsequent vectoring with pricing forecasts and delivery schedule to the e-commerce site.

Quotes created by the online sales and pricing system 4015 may be printed by customers for tracking of the delivery of the products. The printing is facilitated by a print engine that is either available at the customer's computer or can be easily downloaded to the customer's computer.

In one embodiment, the online sales and pricing system 4015 provides insurance to customers, via an insurance company, for optionally insurance against losses occurring from an overestimated quote which, by the time of delivery per the customer's schedule, is worth substantially less than the purchasing price of the quote. In another embodiment, the online sales and pricing system 4015 dispenses refunds or coupons for subsequent purchases to those customers based on the price difference between the actual sales price taking into account the actual prices of the purchased products at delivery time and the quoted sales price for the products. The coupons may be redeemed by the customers during subsequent online purchases at the online sales and pricing system 4015.

To facilitate location of products by a customer, in one embodiment, the online sales and pricing system 4015 provides a web interface where products are categorized into different product categories. A customer browses, using a web browser, through categories and sub-categories of products to locate and purchase one or more products. The online sales and pricing system 4015 also categorizes products by manufacturers and merchants. If a customer purchases one or more products on the online sales and pricing system 4015, the rebates and coupons, if any, are automatically applied to the final price for the customer.

Internet portals, such as Yahoo, and internet web services, such as internet service providers (ISPs), can provide an automatic connection to the online sales and pricing system 4015, so as to provide their readers information on available products, including forecasted prices for the short or long term, associated with one or more products on the currently displayed web page. Alternatively, these portals can route web browsers automatically to the online sales and pricing system 4015 to retrieve associated pricing information if necessary, say in a pop-up screen (or frame) automatically created by the currently visible web-page provided by the portal. Thus, readers of web content provided by web page hosts and portals can retrieve forecasted prices (for short term and/or long term) while they browse product information.

The online sales and pricing system 4015 makes it possible to integrate purchasing with software registration and product surveys. Customers who buy and install software are often reluctant to register them with the vendor. This situation is true for other types of products, too. In order to provide an incentive for registration of products, the manufacturers or vendors of such products can integrate the online sales and pricing system 4015 with the registration process so that customers might be enticed with coupons for their next purchases.

FIG. 44 shows the operation of the pricing logic based on unit prices of the products as determined by forecasted pricing information obtained from pricing forecast providers and the delivery schedule provided by the customer. The customer's delivery schedule 4405 provides information on when the customer plans to use or consume the products being purchased. The forecasted prices 4410 provides pricing forecasts obtained from one or more pricing forecast, providers for one or more products being purchased by the customer, for the entire duration of the delivery schedule. The online sales and pricing system 4015 of FIG. 40 generates an online quote 4415 for the customer using the delivery schedule 4405 and forecasted pricing 4410. The online sales and pricing system 4015 provides support for applying various types of discounts to the quote of the customer and generates a total price for the customer. Subsequently, the purchase order is selectively updated by the application of rebates and coupons that may become available before the delivery of the products to the customer, thereby automatically providing savings to the customer.

In general, delivery schedules are provided by the customer to determine pricing based on proposed consumption rate, consumption schedule or deployment plans of the products. Refunds or coupons are optionally provided to customers if the quoted price is significantly greater than the actual selling price.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams.

We claim:

1. A network infrastructure supporting advertising interactions with a plurality of user devices via Internet, the network infrastructure comprising:
   a promotion capture service that provides first interface data to a first software application of a first promoter system, the first interface data including first data from which the first software application produces a visual promotion capture interface on the first promoter system;
   a promotion database;
   the promotion capture service storing first promotion data received via the visual promotion capture interface of the first promoter system, the first promotion data having first web page link data, a first price reduction offer, and a first identifier code;
   a promotion access service that provides second interface data to a second software application of a first of the plurality of user devices of a first user, the second interface data including second data from which the second software application produces a visual promotion review interface on the first of the plurality of user devices, the visual promotion review interface interacts with the database to provide a visual promotion element that includes the first identifier code;
   an email service that delivers a first email addressed to the first user, the first email being constructed at least in part using the promotion database; and
   a redemption support service, coupled to the promotion database, that delivers dispensing data to assist in consummating redemption.

2. The network infrastructure of claim 1, wherein the dispensing data delivered includes the first identifier code.

3. The network infrastructure of claim 1, wherein the first promotion data also includes a first limitation, and wherein the dispensing service considers the first limitation in generating the dispensing data.

4. The network infrastructure of claim 1, further comprising a consummation service that participates in consummating redemption by a user of the first of the plurality of user devices.

5. The network infrastructure of claim 4, further comprising an accounting service that collects payment for activity related to the first promotion data.

6. A network infrastructure supporting advertising interactions with a plurality of user devices via Internet, the network infrastructure comprising:
   a promotion capture service that supports a first interface to a first software application;
   a promotion database;
   the promotion capture service storing first promotion data received via the first interface, the first promotion data having first web page link data, a first price reduction offer, and a first identifier code;
   a promotion access service that selectively retrieves promotion information from the promotion database, the promotion information including at least a first portion of the first promotion data;
   the promotion access service delivers via the Internet the promotion information to support a visual presentation to a first user of a first of the plurality of user devices;
   an email service that delivers a first email addressed to the first user, the first email being constructed at least in part using the promotion database; and
   a redemption support service that delivers to a merchant, dispensing data to assist the merchant in consummating redemption.

7. The network infrastructure of claim 6, wherein the delivery by the promotion access service comprising coordinating with a web server system to integrate at least part of the first promotion data and web page data, and the visual presentation comprising a web page constructed based on the integration.

8. The network infrastructure of claim 7, wherein the web server system is a third party web server system.

9. The network infrastructure of claim 6, wherein the first email comprises a promotion offer.

10. The network infrastructure of claim 6, further comprising an accounting system that establishes billing based on a number of times the first promotion data is accessed.

11. The network infrastructure of claim 9, wherein the first user is selected to receive the promotion offer based on a first consideration of first information relating to the first user.

12. The network infrastructure of claim 6, wherein the first interface comprises a hypertext interface.

13. The network infrastructure of claim 6, wherein the at least the portion of the first promotion data includes the first identifier code.

14. The network infrastructure of claim 6, wherein the redemption support service generates the dispensing data at least in part by accessing the promotion database.

15. The network infrastructure of claim 14, wherein the first promotion data also includes a first limitation, and wherein the redemption support service considers the first limitation in the generation of the dispensing data.

16. The network infrastructure of claim 6, wherein the redemption support service participates in consummating redemption by the first user of the first of the plurality of user devices.

17. A network infrastructure supporting advertising interactions with a plurality of user devices via Internet, the network infrastructure comprising:
   a promotion database;
   a promotion capture service storing in the promotion database first promotion data received from a first promoter and second promotion data received from a second promoter, the first promotion data including first price reduction data and first geographical data, the second promotion data including second price reduction data and second geographical data;
   a promotion access service that gathers and stores first information relating to a first user, the first information including a first geographical element;
   the promotion access service considers the first geographical data, the second geographical data and the first geographical element in a process of identifying first web page data to be delivered to a first user device of the first user;
   the promotion access service responds to first user input received from the first user device by performing dispensing activity relating to the first promotion data; and
   an email promotion service that delivers a first email addressed to the first user, the first email being based at least in part the second promotion data.

18. The network infrastructure of claim 17, further comprising a posting service that delivers third party web site posting data for combination with third party web page data, the third party web site posting data being based at least in part on the first promotion data.

19. The network infrastructure of claim 17, further comprising an accounting system that establishes billing based on a number of times the first promotion data is accessed.

20. The network infrastructure of claim 17, further comprising an accounting system that charges a transaction fee.

21. The network infrastructure of claim 17, wherein the promotion capture service comprises a hypertext interface.

22. The network infrastructure of claim 17, wherein the first user is selected for receiving the first email based on the stored first information.

23. The network infrastructure of claim 17, wherein the first user is selected for receiving the first email based on a geographical consideration.

* * * * *

UNITED STATES PATENT AND TRADEMARK OFFICE
CERTIFICATE OF CORRECTION

| | | |
|---|---|---|
| PATENT NO. | : 8,463,851 B2 | |
| APPLICATION NO. | : 13/449980 | |
| DATED | : June 11, 2013 | |
| INVENTOR(S) | : James D. Bennett et al. | |

It is certified that error appears in the above-identified patent and that said Letters Patent is hereby corrected as shown below:

In the Claims

Col. 60, line 17, in claim 17: after "least in part" insert --on--

Signed and Sealed this
Fourth Day of March, 2014

Michelle K. Lee
*Deputy Director of the United States Patent and Trademark Office*